(12) United States Patent
Taniguchi

(10) Patent No.: US 7,336,936 B2
(45) Date of Patent: Feb. 26, 2008

(54) RADIO SIGNAL RECEIVING APPARATUS AND RADIO SIGNAL RECEIVING METHOD

(75) Inventor: Shohei Taniguchi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 415 days.

(21) Appl. No.: 10/452,443

(22) Filed: Jun. 2, 2003

(65) Prior Publication Data

US 2003/0228851 A1    Dec. 11, 2003

(30) Foreign Application Priority Data

Jun. 3, 2002 (JP) ............................. 2002-162028

(51) Int. Cl.
 *H04B 3/033* (2006.01)
(52) U.S. Cl. .......................... 455/130; 455/39; 455/73
(58) Field of Classification Search ................ 455/130, 455/136, 39, 73
See application file for complete search history.

(56) References Cited

U.S. PATENT DOCUMENTS

| | | | |
|---|---|---|---|
| 4,604,745 A * | 8/1986 | Takasaki et al. ............ 714/713 |
| 4,953,197 A | 8/1990 | Kaewell et al. | |
| 5,535,440 A | 7/1996 | Clappier | |
| 5,640,695 A | 6/1997 | Fitzgerald | |
| 6,016,422 A * | 1/2000 | Bartusiak ...................... 455/76 |
| 6,078,795 A * | 6/2000 | Miyazaki .................. 455/226.2 |
| 6,198,934 B1 * | 3/2001 | Ohtsuki .................... 455/456.2 |
| 6,731,704 B1 * | 5/2004 | Kiyanagi .................... 375/346 |
| 2002/0016177 A1 * | 2/2002 | Miya et al. .................. 455/522 |
| 2002/0114355 A1 * | 8/2002 | Kim et al. ................... 370/503 |
| 2002/0142745 A1 * | 10/2002 | Kang et al. ............... 455/232.1 |
| 2003/0083031 A1 * | 5/2003 | Eriksson et al. .......... 455/250.1 |
| 2004/0229580 A1 * | 11/2004 | Chen .......................... 455/130 |

FOREIGN PATENT DOCUMENTS

| | | |
|---|---|---|
| DE | 196 44 965 | 4/1998 |
| EP | 1 162 762 | 12/2001 |
| JP | 04010723 | 1/1992 |
| JP | 04111621 | 4/1992 |
| JP | 08088619 | 4/1996 |
| JP | 2000068907 | 3/2000 |
| JP | 2000188566 | 7/2000 |

* cited by examiner

*Primary Examiner*—Lester G. Kincaid
*Assistant Examiner*—Fred Casca
(74) *Attorney, Agent, or Firm*—Pearne & Gordon LLP

(57) ABSTRACT

Herein disclosed is a radio signal receiving apparatus for receiving radio signals each having a base band signal component, comprising: radio signal amplifying means for amplifying the radio signals each having a signal level; base band signal producing means for producing base band signals respectively indicative of the base band signal components of the radio signals amplified by the radio signal amplifying means, the base band signals each having a signal level; controlling means for controlling the radio signal amplifying means to have the radio signal amplifying means amplify the radio signals in response to the signal level of each of the base band signals to be produced by the base band signal producing means; base band signal selecting means for periodically selecting one of the base band signals from among the base band signals produced by the base band signal producing means in response to the signal level of each of the radio signals; and base band signal outputting means for outputting the base band signal periodically selected by the base band signal selecting means to an exterior device.

3 Claims, 20 Drawing Sheets

Signal level of Radio Signal    Gain Control Value

Level Diagram

RADIO SIGNAL RECEIVING APPARATUS AND RADIO SIGNAL RECEIVING METHOD

BACKGROUND OF THE INVENTION

1. Field of the Invention

The present invention relates to a radio signal receiving apparatus and a radio signal receiving method, and more particularly to a radio signal receiving apparatus for and a radio signal receiving method of receiving a plurality of radio signals respectively having base band signal components through a plurality of antennas, and selectively outputting base band signals indicative of the base band signal components.

2. Description of the Related Art

Up until now, there have been proposed a wide variety of conventional radio signal receiving apparatus available for various kinds of wireless communications appliance such as for example a mobile phone for the purpose of ensuring reliable communications between a far-end terminal and a near-end terminal.

One typical example of the conventional radio signal receiving apparatus of this type is shown in FIG. 20. The conventional radio signal receiving apparatus 500 is shown in FIG. 20 as comprising first and second radio signal receiving circuits 501 and 502 for respectively receiving radio signals through antennas, and producing base band signals respectively indicative of the base band signal components of the radio signals, a base band signal selecting circuit 570 for selecting one of the base band signals from among the base band signals respectively produced by the first and second radio signal receiving circuits 501 and 502, and a base band signal outputting circuit 580 for outputting the base band signal selected by the base band signal selecting circuit 570 to an exterior device, not shown. The base band signal component is constituted by two different signal components consisting of I-axis and Q-axis signal components which are orthogonal with each other.

The first radio signal receiving circuit 501 includes a radio signal amplifier 511 for amplifying the radio signal, an analog-to-digital converter, hereinlater simply referred to as "AD converter", 512 for converting the amplified radio signal received from the radio signal amplifier 511 into a digital radio signal, a demodulating and Nyquist filtering circuit 513 for demodulating the digital radio signal received from the AD converter 512 to produce an I-axis signal indicative of the I-axis signal component of the base band signal and a Q-axis signal indicative of the Q-axis signal component of the base band signal, a publicly-known Auto Gain Control circuit, hereinlater simply referred to as "AGC circuit", 530 for controlling the radio signal amplifier 511 to have the radio signal amplifier 511 amplify the radio signal in response to the signal level of the base band signal to be produced by the demodulating and Nyquist filtering circuit 513, a base band signal producing circuit 551 for decoding the base band signal, and producing a base band signal having the base band signal component of the radio signal received from the demodulating and Nyquist filtering section 513, and a synchronization circuit 552 for controlling the base band signal producing circuit 551 to allow the base band signal produced by the base band signal producing circuit 551 to be synchronized with the base band signal produced by a base band signal producing circuit 561 forming part of the second radio signal receiving circuit 502. The constitutional elements of the first radio signal receiving circuit 502 are the same in construction as those of the second radio signal receiving circuit 501 as shown in FIG. 20.

The AGC circuit 530 is adapted to calculate a signal level value indicative of the signal level of the received radio signal to be amplified by the radio signal amplifier 511. The base band signal selecting circuit 570 is operative to select one radio signal receiving circuit from among the radio signal receiving circuits 501 and 502 after judging whether or not the signal level value calculated by the AGC circuit 530 is grater than the signal level value calculated by the AGC circuit 540. If it is judged that the signal level value calculated by the AGC circuit 530 is higher than the signal level value calculated by the AGC circuit 540, the base band signal selecting circuit 570 selects the radio signal receiving circuit 530 as the selected radio signal receiving circuit. The base band signal outputting circuit 580 is operative to receive the base band signal from the selected radio signal receiving circuit and output the base band signal thus received as the selected base band signal.

In the conventional radio signal receiving apparatus 500, the AGC circuit 530 is operated in accordance with a time constant inherent in the AGC circuit 530. This means that the AGC circuits 530 and 540 are designed to calculate and update the signal level values of the radio signals received from the radio signal receiving circuits 501 and 502 at time intervals defined by the time constant. This leads to the fact that the AGC circuit 530 of the radio signal receiving circuit 501, for example, calculating a signal level value higher than a signal level value calculated by the AGC circuit 540 of the radio signal receiving circuit 502 and being selected by the base band signal selecting circuit 570 at a time point tends to calculate a signal level value much lower than a signal level value calculated by the AGC circuit 540 of the radio signal receiving circuit 502 at a subsequent time point when the radio signal receiving circuit 501 thus selected actually outputs the base band signal to the base band signal outputting circuit 580.

The conventional radio signal receiving apparatus, in which the radio signal selecting circuit 570 is operative to select one radio signal receiving circuit from among the radio signal receiving circuits 501 and 502 in response to the signal level values calculated by the AGC circuits 530 and 540 at a time point, encounters a drawback that the conventional radio signal receiving apparatus tends to select the radio signal receiving circuit outputting the base band signals respectively having signal levels, which are monotonously decreased along a time axis, thereby aggravating the quality of communications between a far-end speaker and a near-end speaker.

Furthermore, the radio signals are subject to interferences such as, for example, a fading interference, and a multi-path interference, depending on an environment in which the radio signals propagate. The radio signal receiving circuits 501 and 502 tend to receive the radio signals deteriorated in quality due to the interference. The conventional radio signal receiving apparatus, in which the base band signal selecting circuit 570 is operative to select one radio signal receiving circuit from among the radio signal receiving circuits 501 and 502 in response to the signal level values calculated by the AGC sections 530 and 540 of the radio signal receiving circuits 501 and 502, encounters another drawback that the conventional radio signal receiving apparatus 500 may select the radio signal receiving circuit outputting the base band signal having errors caused by the interferences.

SUMMARY OF THE INVENTION

It is therefore an object of the present invention to provide a radio signal receiving apparatus and a radio signal receiving method which can selectively receive radio signals each including a base band signal component through the antennas, produce a plurality of base band signals each indicative of the base band signal component, and periodically select one base band signal highest in quality from among the base band signals with the aim of consistently outputting the selected base band signals respectively having signal levels, which are not monotonously decreased along the time axis, thereby ensuring reliable communications between a far-end speaker and a near-end speaker.

It is another object of the present invention to provide a radio signal receiving apparatus and a radio signal receiving method which can selectively receive radio signals each including a base band signal component through the antennas, produce a plurality of base band signals each indicative of the base band signal component, and periodically select one base band signal highest in quality from among the base band signals with the aim of consistently outputting the selected base band signals respectively having low error rates, thereby ensuring reliable communications between a far-end speaker and a near-end speaker.

According to the first aspect of the present invention, there is provided a radio signal receiving apparatus for receiving radio signals each having a base band signal component, comprising: radio signal amplifying means for amplifying the radio signals each having a signal level, controlling means for controlling the radio signal amplifying means to have the radio signal amplifying means amplify the radio signals in response to the signal level of each of the radio signals, base band signal producing means for producing base band signals respectively indicative of the base band signal components of the radio signals amplified by the radio signal amplifying means, the base band signals each having a signal level, base band signal selecting means for periodically selecting one of the base band signals from among the base band signals produced by the base band signal producing means in response to the signal level of each of the radio signals, and base band signal outputting means for outputting the base band signal periodically selected by the base band signal selecting means to an exterior device.

The controlling means may include a signal level calculating unit for calculating a signal level value indicative of the signal level of each of the base band signals to be produced by the base band signal producing means, and a signal level difference calculating unit for calculating a signal level difference between the signal level value of each of the base band signals calculated by the signal level calculating unit and a target value before calculating a gain control value indicative of an absolute value of the signal level difference between the signal level value of each of the base band signals and the target value; the controlling means is operative to control the radio signal amplifying means to have the radio signal amplifying means amplify the radio signals in response to the gain control value calculated by the signal level difference calculating unit.

In the aforesaid radio signal receiving apparatus, the base band signals including first and second base band signals respectively having first and second signal levels, the gain control values including first and second gain control values respectively indicative of the absolute value of the signal level difference between the first signal level of the first base band signal and the predetermined target signal level and the absolute value of the signal level difference between the second signal level of the second base band signals and the predetermined target signal level, the first and second gain control values varied in response to a time axis, and respectively having first and second fluctuations, the first and second gain control values respectively in association with the first and second base band signals, the base band signal selecting means includes: signal selecting means for selecting the first and second base band signals from among the base band signals produced by the base band signal producing means after deciding that the first gain control value is smaller than the gain control value in association with each of the base band signals, and the second gain control value in association with the second base band signal is smaller than the gain control value in association with each of the base band signals except for the first base band signal; gain control value difference calculating means for calculating a gain control value difference between the first gain control value in association with the first base band signal selected by the signal selecting means and the second gain control value in association with the second base band signal selected by the signal selecting means; first judging means for judging whether or not the gain control value difference between the first gain control value and the second gain control value calculated by the gain control value difference calculating means is larger than a predetermined threshold value; and second judging means for judging whether or not the fluctuation of the first gain control value in association with the first base band signal is larger than the fluctuation of the second gain control value in association with the second base band signal; the base band signal selecting means is operative to periodically select the first base band signal from among the base band signals produced by the base band signal producing means when the judgment is made by the first judging means as the gain control value difference between the first gain control value and the second gain control value calculated by the gain control value difference calculating means being larger than a predetermined threshold value, and select one of the first and second base band signals from among the base band signals produced by the base band signal producing means based on results judged by the second judging means when the judgment is made by the first judging means as the gain control value difference between the first gain control value and the second gain control value calculated by the gain control value difference calculating means being equal to or smaller than a predetermined threshold value.

In accordance with a second aspect of the present invention, the aforesaid radio signal receiving apparatus may further comprise error detecting means for detecting error in each of the base band signals produced by the base band signal producing means, and in which the base band signal selecting means includes an error signal judging unit for judging whether or not the error is detected by the error detecting means in each of the base band signals produced by the base band signal producing means; and the base band signal selecting unit is operative to select one of the base band signals from among the base band signals produced by the base band signal producing means based on results judged by the error signal judging unit.

In accordance with a third aspect of the present invention, in the aforesaid radio signal receiving apparatus, the base band signals each having a synchronization component; the base band signal selecting means includes a synchronization component detecting unit for detecting the synchronization component of each of the base band signals produced by the base band signal producing means; a synchronization information judging unit for judging whether or not the synchronization component of each of the base band signals produced by the base band signal producing means is detected by the synchronization component detecting unit; and the base band signal selecting means is operative to select one of the base band signals from among the base band signals produced by the base band signal producing means based on results judged by the synchronization information judging unit.

In accordance with a fourth aspect of the present invention, there is provided a radio signal receiving method of receiving radio signals each having a base band signal component, comprising the steps of: a) amplifying the radio signals each having a signal level; b) producing base band signals respectively indicative of the base band signal components of the radio signals amplified in the step (a), the base band signals each having a signal level; c) controlling the step (a) to have the step (a) amplify the radio signals in response to the signal level of each of the base band signals to be produced in the step (b); d) periodically selecting one of the base band signals from among the base band signals produced in the step (b) in response to the signal level of each of the radio signals; and e) outputting the base band signal periodically selected in the step (d) to an exterior device. The aforesaid radio signal receiving method may further comprise the step of (f) detecting an error in each of the base band signals produced in the step (b), and in which the step (d) has the step of (d1) judging whether or not the error is detected in the step (f) in each of the base band signals produced in the step (b); and the step (d) has a step of selecting one of the base band signals from among the base band signals produced in the step (b) based on results judged in the step (d1).

BRIEF DESCRIPTION OF THE DRAWINGS

The features and advantages of a radio signal receiving apparatus according to the present invention will be more clearly understood from the following description taken in conjunction with the accompanying drawings in which:

FIG. 4(*b*) is a block diagram showing a base band signal selecting circuit forming part of a third embodiment of the radio signal receiving apparatus according to the present invention;

FIG. 4(*c*) is a block diagram showing a base band signal selecting circuit forming part of a fourth embodiment of the radio signal receiving apparatus according to the present invention;

FIG. 4(*d*) is a block diagram showing a base band signal selecting circuit forming part of a fifth embodiment of the radio signal receiving apparatus according to the present invention;

DESCRIPTION OF THE EMBODIMENTS

Figure 1:
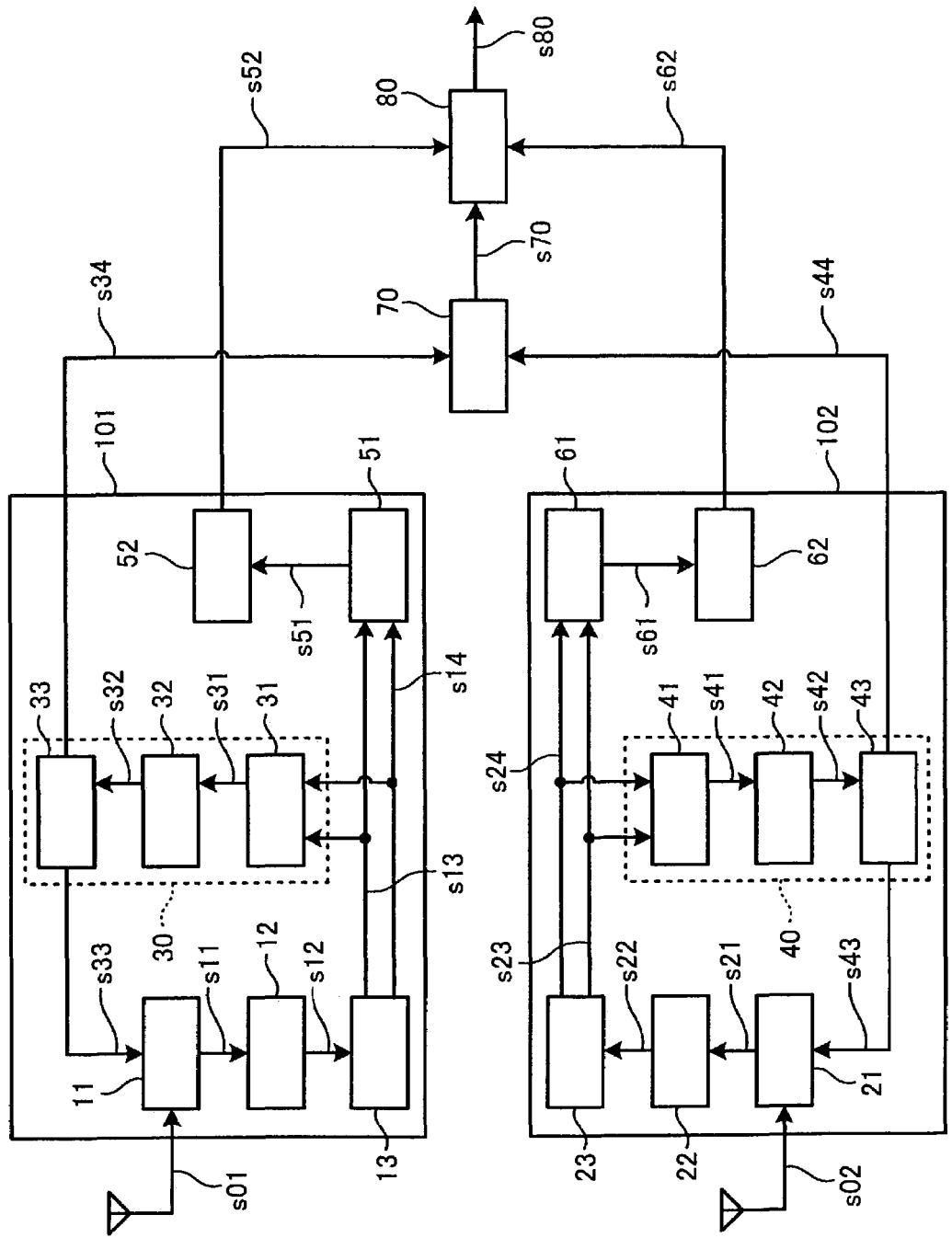
FIG. 1 is a block diagram of a first embodiment of the radio signal receiving apparatus according to the present invention.

The preferred embodiments of the radio signal receiving apparatus according to the present invention will now be described in detail hereinafter with reference to FIGS. 1 to 19. Throughout the following detailed description, similar reference characters and numbers refer to respective similar elements in all Figures of the drawings.

The radio signal receiving apparatus 100 is shown in FIG. 1 as comprising first and second radio signal receiving circuits 101 and 102 for respectively receiving radio signals s01 and s02 each having a base band signal component through antennas before producing base band signals respectively indicative of the base band signal components of the radio signals s01 and s02, the radio signals and base band signals each having a signal level, a base band signal selecting circuit 70 for periodically selecting one of the base band signals from among the base band signals produced by the first and second radio signal receiving circuits 101 and 102 in response to the signal level of each of the radio signals s01 and s20, and a base band signal outputting circuit 80 for outputting the base band signal periodically selected by the base band signal selecting circuit 70 to an exterior device, not shown.

The first radio signal receiving circuit 101 includes a radio signal amplifier 11 for amplifying the radio signal s01, having a signal level, an analog-to-digital converter, hereinlater simply referred to as "AD converter", 12 for converting the amplified radio signal S11 received from the radio signal amplifier 11, a demodulating and Nyquist filtering circuit 13 for demodulating the converted radio signal s12 received from the AD converter 12, and producing a demodulated radio signal having a signal level, an AGC circuit 30 for periodically controlling the radio signal amplifier 11 to have the radio signal amplifier 11 amplify the radio signal s01 in response to the signal level of each of the demodulated radio signals demodulated by the demodulating and Nyquist filtering circuit 13, a base band signal producing circuit 51 for producing a base band signal s51 indicative of the base band signal component of the radio signal received from the demodulating and Nyquist filtering circuit 13, and a synchronizing circuit 52 for synchronizing the base band signal s51 produced by the base band signal producing circuit 51 with the base band signal s61 produced by a base band signal producing circuit 61 of the second radio signal receiving circuit 102. The base band signal producing circuit 51 is operative to produce the base band signal s51 from the demodulated radio signals demodulated by the demodulating and Nyquist filtering circuit 13. This means that the AGC circuit 30 is operative to periodically control the radio signal amplifier 11 to have the radio signal amplifier 11 amplify the radio signal s01 in response to the signal level of each of the demodulated radio signals demodulated by the demodulating and Nyquist filtering circuit 13, i.e., the signal level of each of the base band signals to be produced by the base band signal producing circuit 51.

The AGC circuit 30 includes a signal level calculator 31, a smoothing filter 32, and a gain control calculator 33. The signal level calculator 31 is operative to receive the demodulated radio signal from the demodulating and Nyquist filtering circuit 13, calculate a signal level value indicative of the signal level of the demodulated radio signal, i.e., the signal level of the base band signal to be produced by the base band signal producing circuit 51, and produce a signal level value signal. The smoothing filter 32 is operative to filter the signal level value signal indicative of the signal level value. The gain control value calculator 33 is operative to calculate a signal level difference between the signal level value of each of the base band signals calculated by the signal level calculator 31 and a target value before calculating a gain control value indicative of the absolute value of the signal level difference between the signal level value of each of the base band signals and the target value.

The second radio signal receiving circuit 102 includes a radio signal amplifier 21 for amplifying the radio signal s02, an analog-to-digital converting circuit, hereinlater simply referred to as "AD converter", 22 for converting the amplified radio signal S21 received from the radio signal amplifier 21, a demodulating and Nyquist filtering circuit 23 for demodulating the converted radio signal s22 received from the AD converter 22 into the demodulated radio signal having a signal level, an AGC circuit 40 for controlling the radio signal amplifier 21 to have the radio signal amplifier 21 amplify the radio signal in response to the signal level of the radio signal demodulated by the demodulating and Nyquist filtering circuit 23, a base band signal producing circuit 61 for producing a base band signal s61 respectively indicative of the base band signal component of the radio signal received from the demodulating and Nyquist filtering circuit 23, and a synchronizing circuit 62 for synchronizing the base band signal s61 produced by the base band signal producing circuit 61 with the base band signal s51 produced by the base band signal producing circuit 51. The constitutional elements of the second radio signal receiving circuit 102 are the same as those of the first radio signal receiving circuit 101 as shown in FIG. 1. The base band signal producing circuit 61 is operative to produce the base band signal s61 from the demodulated radio signals demodulated by the demodulating and Nyquist filtering circuit 23. This means that the AGC circuit 40 is operative to periodically control the radio signal amplifier 21 to have the radio signal amplifier 21 amplify the radio signal s02 in response to the signal level of each of the demodulated radio signals demodulated by the demodulating and Nyquist filtering circuit 23, i.e., the signal level of each of the base band signals to be produced by the base band signal producing circuit 61.

The AGC circuit 40 is the same in construction as the AGC circuit 30. The AGC circuit 40 includes a signal level calculator 41, a smoothing filter 42, and a gain control value calculator 43. The constitutional elements of the AGC circuit 40 are the same as those of the AGC circuit 30 as shown in FIG. 1. The radio signal amplifiers 11 and 21 collectively constitute the radio signal amplifying means according to the present invention. The base band signal producing circuits 51 and 61 collectively constitute the base band signal producing means according to the present invention. The AGC circuits 30 and 40 collectively constitute the controlling means according to the present invention. The base band signal selecting circuit 70 constitutes the base band signal selecting means according to the present invention. The base band signal outputting circuit 80 constitutes the base band signal outputting means according to the present invention.

The radio signal amplifier 11 is operative to receive the radio signal s01 through the antenna, while the AGC circuit 30 is operative to periodically calculate a signal level value indicative of the signal level of each of the base band signals to be produced by the base band signal producing circuit 51, and to control the radio signal amplifier 11 to have the radio signal amplifier 11 amplify the radio signal in response to the signal level value. The AGC circuit 30 includes a signal level calculator 31 for calculating a signal level value indicative of the signal level of each of the base band signals to be produced by the base band signal producing circuit 51. The AGC circuit 30 is operative to control the radio signal amplifier 11 to have the radio signal amplifying circuit 11 amplify the radio signals in response to the signal level value calculated by the signal level calculator 31. The signal level calculator 31 partially constitutes the signal level calculating unit according to the present invention.

The AD converter 12 is operative to receive the amplified radio signal S11 from the radio signal amplifier 11, to quantize and digitalize the amplified radio signal S11 received from the radio signal amplifier 11, and to output the quantized and digitalized radio signal s12 to the demodulating and Nyquist filtering circuit 13.

The digitized radio signal s12 has two different components including I-axis and Q-axis components being orthogonal with each other. The demodulating and Nyquist filtering circuit 13 is operative to receive the digitized radio signal s12 from the AD converter 12, demodulate the digitized radio signal s12 to produce I-axis and Q-axis signals respectively indicative of the I-axis and Q-axis components, the I-axis and Q-axis signals each having a frequency range, and filter the I-axis and Q-axis signals to produce band-limited I-axis and Q-axis signals, and output the band-limited I-axis and Q-axis signals s13 and s14 to the signal level calculator 31 and the decoding circuit, i.e., base band signal producing circuit 51. The band-limited I-axis and Q-axis signals s13 and s14 have band-limited I-axis and Q-axis components.

The signal level calculator 31 is operative to receive the band-limited I-axis and Q-axis signals s13 and s14 from the demodulating and Nyquist filtering circuit 13, to calculate an I-axis value indicative of the band-limited I-axis component of the band-limited I-axis signal and a Q-axis value indicative of the band-limited Q-axis component of the band-limited Q-axis signal, to calculate the square root of an addition of the square of the I-axis value and the square of the Q-axis value, to produce a composed signal indicative of the square root of the addition of the square of the I-axis value and the square of the Q-axis value, and to output the composed signal to the smoothing filter 32.

The smoothing filter 32 is operative to receive the composed signal having noises from the signal level calculator 31, to reduce the noises of the composed signal, and to output the smoothed signal to the gain control value calculator 33. The smoothed signal s32 indicates a signal level value indicative of the signal level of the demodulated radio signal, i.e., the signal level of the base band signal to be produced by the base band signal producing circuit 51.

As described earlier, the gain control value calculator 33 is operative to calculate a gain control value. The gain control value calculator 33 is operative to calculate a signal level difference between the signal level value of each of the base band signals calculated by the signal level calculator 31 and a target value before calculating the gain control value indicative of an absolute value of the signal level difference between the signal level value of each of the base band signals and the target value. The AGC circuit 30 is operative to control the radio signal amplifier 11 to have the radio signal amplifier 11 amplify the radio signals in response to the gain control value calculated by the gain control value calculator 33.

More specifically, the gain control value calculator 33 is operative to receive the smoothed signal s32 from the smoothing filter 32 to calculate a logarithmic value of the signal level, hereinlater referred to as "Va". The gain control value calculator 33 is operative to calculate a gain control value, i.e., an absolute value |Vta−Va| indicative of the difference between the predetermined signal level, hereinlater referred to as "Vta" and the logarithmic value "Va" in association with the signal level of the smoothed signal s32, to produce a control signal s33, i.e., a gain control value, in association with the first absolute value |Vta−Va|, to produce a gain information signal s34, i.e., a signal lvel, in association with the logarithmic value "Va" to output the control signal s33 to the radio signal amplifier 11, and to output the gain information signal s34 to the base band signal selecting circuit 70. The radio signal amplifier 11 is operative to amplify the radio signals in response to the control signal s33 received from the gain control value calculator 33. The gain control value calculator 33 partially constitutes the signal level difference calculating unit according to the present invention.

The base band signal producing circuit 51 is operative to receive the I-axis and Q-axis signals from the demodulating and Nyquist filtering circuit 13, to produce a base band signal s51 indicative of the base band signal component of the radio signal s01 in response to the I-axis and Q-axis signals s13 and s14 received from the demodulating and Nyquist filtering circuit 13, to produce a clock signal in response to the I-axis and Q-axis signals received from the demodulating and Nyquist filtering circuit 13, and to output the base band signal s51 having a synchronization component. The synchronization component is indicative of a unique word signal.

The synchronizing circuit 52 is operative to receive the base band signal s51 having the synchronization component from the base band signal producing circuit 51, to synchronize the base band signal s51 received from the decoded section 51 with the base band signal s61 produced by the base band signal producing circuit 61 forming part of the second radio signal receiving circuit 102 in accordance with the unique word signals indicated by the synchronization components in the base band signals s51 and s61.

The base band signal selecting circuit 70 is operative to receive the gain signals s33 and s34 from the gain control value calculator 33 and the signals s43 and s44 from the gain control value calculator 43, judge whether or not the first absolute value |Vta−Va| of the gain information signal s34 is smaller than the second absolute value |Vtb−Vb| of the gain information signal s44, to have the base band signal outputting circuit 80 output the base band signal s52 outputted by the first radio signal receiving circuit 101 to the exterior device under the condition that the first absolute value |Vta−Va| is smaller than the second absolute value |Vtb−Vb|, and to have the base band signal outputting circuit 80 output the base band signal s62 outputted by the second radio signal receiving circuit 102 to the exterior device under the condition that the first absolute value |Vta−Va| is not smaller than the second absolute value |Vtb−Vb|.

The base band signal selecting circuit 70 is operative to select the base band signal the same as the base band signal outputted by the base band signal outputting circuit 80 to the exterior device in a preceding frame prior to the current frame under the condition that the first absolute value |Vta−Va| of the gain information signal s34 is equal to the second absolute value |Vtb−Vb| of the gain information signal s44.

The base band signal outputting circuit 80 is operative to receive the switching signal s70 from the base band signal selecting circuit 70, the synchronized base band signal s52 from the first radio signal receiving circuit 101, and the synchronized base band signal s62 from the second radio signal receiving circuit 102, to selectively output the synchronized base band signals s52 and s62 respectively received from the first and second radio signal receiving circuits 101 and 102 to the exterior device in response to the switching signal s70 received from the base band signal selecting circuit 70.

Figure 2:
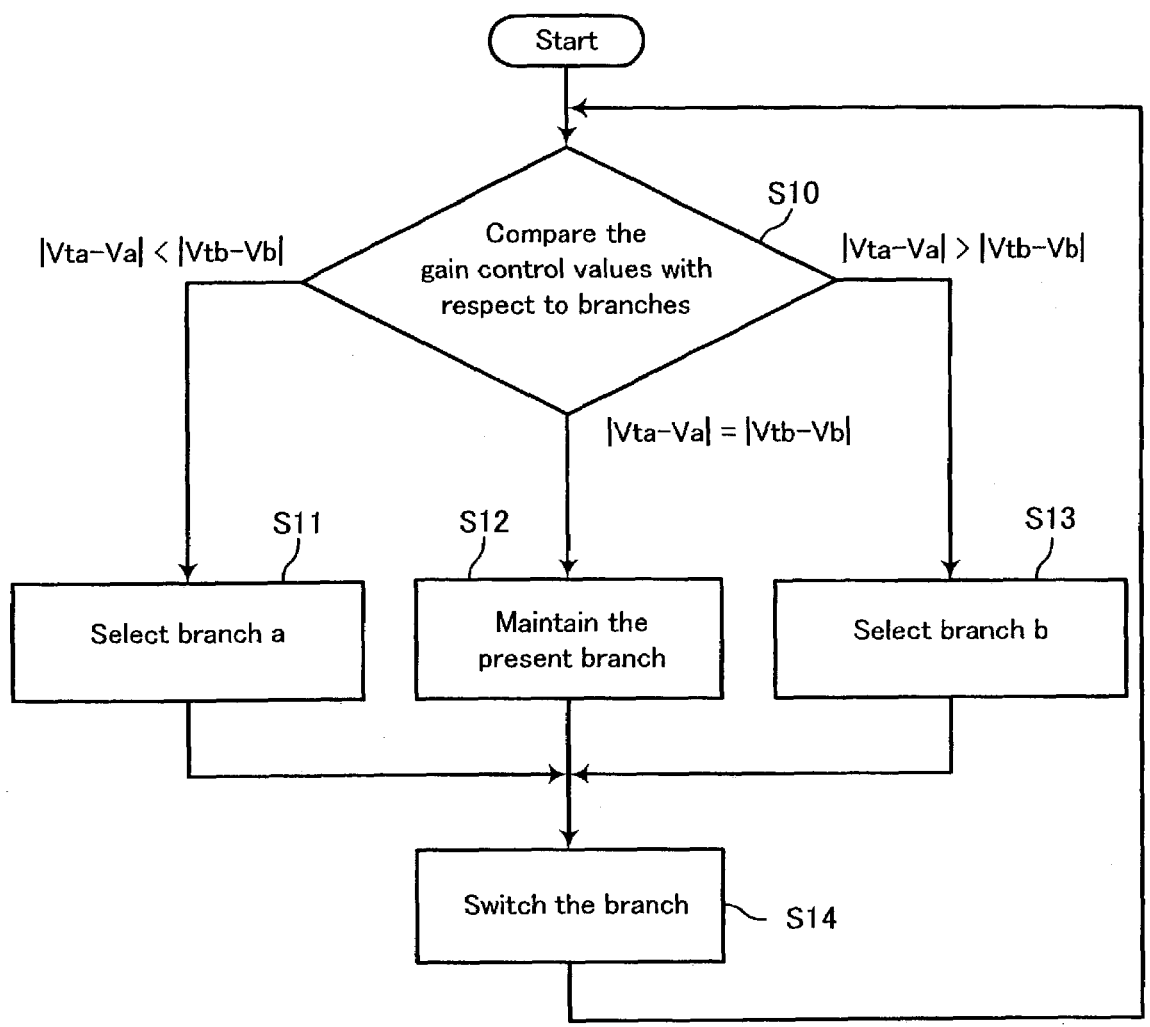
FIG. 2 is a flow chart showing a process to be performed by the first embodiment of the radio signal receiving apparatus according to the present invention.

The following description will now be directed to the process to be performed by the first embodiment of the radio signal receiving apparatus 100 according to the present invention with reference to the flowchart shown in FIG. 2. The term "branches a and b" is intended to indicate the first and second radio signal receiving circuits 101 and 102.

The first absolute value |Vta−Va| of the difference between the predetermined signal level "Vta" and the logarithmic value "Va" in association with the signal level of the smoothed signal s32 is periodically calculated by the signal level calculator 33 forming part of the first radio signal receiving circuit 101 in the step S10.

The second absolute value |Vtb−Vb| of the difference between the predetermined signal level "Vtb" and the logarithmic value "Vb" in association with the signal level of the signal s43 is periodically calculated by the signal level calculator 43 forming part of the second radio signal receiving circuit 102 in the step S10.

The judgment is then made by the base band signal selecting circuit 70 whether or not the first absolute value |Vta−Va| is larger than the second absolute value |Vtb−Vb| in the step S10. When the first absolute value |Vta−Va| is smaller than the second absolute value |Vtb−Vb|, the step S10 proceeds to the step S11. When the first absolute value |Vta−Va| is equal to the second absolute value |Vtb−Vb|, the step S10 proceeds to the step S12. When the first absolute value |Vta−Va| is larger than the second absolute value |Vtb−Vb|, the step S10 proceeds to the step S13.

The base band signal s52 outputted by the first radio signal receiving circuit 101 is selected by the base band signal selecting circuit 70 as the output signal s80 to be outputted to the exterior device in the step S11.

The base band signal s52 is selected by the base band signal selecting circuit 70 when the base band signal outputting circuit 80 is outputting the base band signal s52 to the exterior device at the current time point in the step S12. The base band signal s62 is, on the other hand, selected by the base band signal selecting circuit 70 when the base band signal outputting circuit 80 is outputting the base band signal s62 to the exterior device in the step S12.

The base band signal s62 outputted by the second radio signal receiving circuit 102 is selected by the base band signal selecting circuit 70 as the output signal s80 to be outputted to the exterior device in the step S13.

The base band signal selected by the base band signal selecting circuit 70 in the step S11, S12, or S13 is outputted by the base band signal outputting circuit 80 in the step S14.

Although the radio signal receiving apparatus 100 comprises first and second radio signal receiving circuits 101 and 102 for respectively receiving radio signals s01 and s02 each having a base band signal component for simplicity and better understanding, the radio signal receiving apparatus according to the present invention may comprise three or more radio signal receiving circuits for respectively receiving a plurality of radio signals each having a base band signal component.

From the above detail description, it will be understood that the radio signal receiving apparatus according to the first embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having signal levels, which are not monotonously decreased along the time axis, thereby ensuring reliable communications between a far-end speaker and a near-end speaker.

Although there has been described in the above about the first embodiment of the radio signal receiving apparatus according to the present invention, this embodiment may be replaced by the second to ninth embodiments of the radio signal receiving apparatus according to the present invention in order to attain the objects of the present invention. The second to ninth embodiments of the radio signal receiving apparatus will then be described in detail hereinafter.

The constitutional elements of the second embodiment of the radio signal receiving apparatus according to the present invention are the same as those of the first embodiment of the radio signal receiving apparatus 100 according to the present invention, however, the operation of the base band signal selecting circuit 172 forming part of the second embodiment of the radio signal receiving apparatus according to the present invention is different from the operation of the base band signal selecting circuit 70 forming part of the first embodiment of the radio signal receiving apparatus 100 according to the present invention.

Therefore, only the constitutional elements and the steps of the second embodiment of the radio signal receiving apparatus different from those of the first embodiment of the radio signal receiving apparatus 100 will be described in detail hereinafter with reference to the drawings shown in FIGS. 1, 3, and 4(a). The constitutional elements and the steps of the second embodiment of the radio signal receiving apparatus entirely the same as those of the first embodiment of the radio signal receiving apparatus 100 will not be described but bear the same reference numerals and legends as those of the first embodiment of the radio signal receiving apparatus 100 shown in FIG. 1 to avoid tedious repetition.

The base band signal selecting circuit 172 is operative to receive the gain information signals s33 and s34 from the gain control value calculator 33 forming part of the first radio signal receiving circuit 101, and signals s43 and s44 from the gain control value calculator 43 forming part of the second radio signal receiving circuit 102. The base band signal selecting circuit 172 is operative to classify the first and second radio signal receiving circuits 101 and 102 into groups in association with the signal level of the radio signal to be amplified by the radio signal amplifiers 11 and 21. The groups include at least two different groups consisting of first and second groups.

Figure 3:
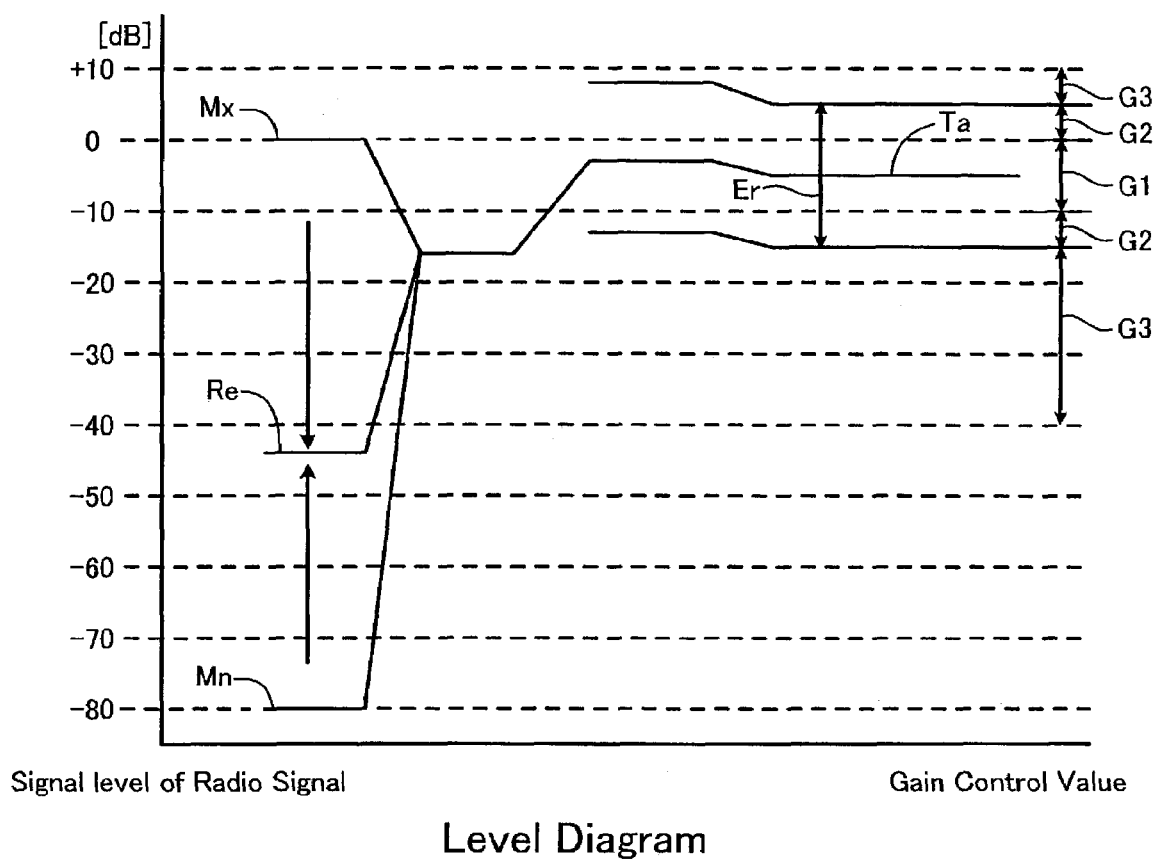
FIG. 3 shows the schematic view of the groups in association with the signal level of the radio signal to be received by each of the first and second radio signal receiving circuits forming part of the radio signal receiving apparatus according to the present invention.

An example of the groups are shown in FIG. 3, the groups are partially constituted by at least three different groups consisting of first to third groups G1, G2 and G3 into which the radio signal receiving circuits are classified on the basis of the gain control value, i.e., the absolute value of the difference between the predetermined signal level and the logarithmic value in association with the signal level of the smoothed signal. The signal level range of radio signals to be received by the radio signal receiving circuits is specified by the minimum signal level and the maximum signal level. The minimum signal level, the maximum signal level and the reference signal level of the radio signal to be received by the radio signal receiving circuits are designated by the legends "Mx", "Mn", and "Re".

The base band signal selecting circuit 172 is operative to classify the radio signal receiving circuit into the first group G1 under the condition that the gain control value is within the range shown by the arrow pointed out by the legend G1. The base band signal selecting circuit 172 is operative to classify the radio signal receiving circuit into the second group G2 under the condition that the gain control value is beyond the range shown by the arrow pointed out by the legend G1 but within the range shown by the arrow pointed out by the legend .G2. The base band signal selecting circuit 172 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups G1, G2, and G3 in association with the signal level of the radio signal to be received by each of the first and second radio signal receiving circuits 101 and 102, the groups may be partially constituted by at least two different groups consisting of first and second groups G1 and G2.

The base band signal selecting circuit 172 is operative to select one of the first and second radio signal receiving circuits 101 and 102 classified into the first group from among the first and second radio signal receiving circuits 101 and 102 under the condition that both of the first and second radio signal receiving circuits 101 and 102 are classified in the first group.

The base band signal selecting circuit 172 is operative to select one of the first and second radio signal receiving circuits 101 and 102 classified into the first group from among the first and second radio signal receiving circuits 101 and 102 under the condition that one of the first and second radio signal receiving circuits 101 and 102 is classified in the first group, and the other of the first and second radio signal receiving circuits 101 and 102 is classified in the second group.

The base band signal selecting circuit 172 is operative to select one of the first and second radio signal receiving circuits 101 and 102 classified into the second group from among the first and second radio signal receiving circuits 101 and 102 under the condition that none of the first and second radio signal receiving circuits 101 and 102 is classified in the first group, but both of the first and second radio signal receiving circuits 101 and 102 are classified in the second group. The base band signal selecting circuit 172 is operative to produce a switching signal s70 in association with the selected radio signal receiving circuit, and output the switching signal s70 to the base band signal outputting circuit 80.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits. The signal level range of the base band signals specified by the minimum and maximum signal levels defining the first and second groups G1 and G2 will be referred to "error free range". In FIG. 3, the legends "Ta" and "Er" are respectively intended to indicate the target level and the error free range. The base band signal selecting circuit 172 has a storage section, not shown, having signal level range information storage therein. The signal level range information shows relationship between signal level values or gain control values with signal ranges respectively associated with groups. Preferably, the base band signal selecting circuit 172 may have an operator input the signal level range information therein.

The base band signal selecting circuit 172 is operative to classify the first and second radio signal receiving circuits 101 and 102 into the groups based on the signals s33 and s34 received from the gain control value calculator 33 forming part of the first radio signal receiving circuit 101, and the signals s43 and s44 received from the gain control value calculator 43 forming part of the second radio signal receiving circuit 102, before selecting at least one of the classified groups from among the classified groups.

The base band signal selecting circuit 172 is operative to select one of the radio signal receiving circuits from among the radio signal receiving circuits classified into the first group under the condition that at least two radio signal receiving circuits are classified into the first group. The base band signal selecting circuit 172 may select one of the radio signal receiving circuits from among the radio signal receiving circuits classified into the first group and the radio signal receiving circuit classified into the second group from among the radio signal receiving circuits under the condition that only one radio signal receiving circuit is classified into the first group.

The base band signal selecting circuit 172 is operative to produce a switching signal s70 in association with the selected radio signal receiving circuit, and to output the switching signal to the base band signal outputting circuit 80.

The base band signal selecting circuit 172 is operative to judge whether or not the difference between the first absolute value |Vta−Va| and the second absolute value |Vtb−Vb| is larger than a predetermined value such as for example 6 [dB] under the condition that one of the first and second radio signal receiving circuits 101 and 102 is classified into the first group, and the other of the first and second radio signal receiving circuits 101 and 102 is classified into the second group. The base band signal selecting circuit 172 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 172 is operative to judge whether or not the fluctuation of the first absolute value |Vta−Va| in association with the first base band signal is larger than the fluctuation of the second absolute value |Vtb−Vb| in association with the second base band signal. This means that the base band signal selecting circuit 172 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 172 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 172 is operative to have the base band signal outputting circuit 80 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 172 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 172 is operative to have the base band signal outputting circuit 80 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Figure 4A:
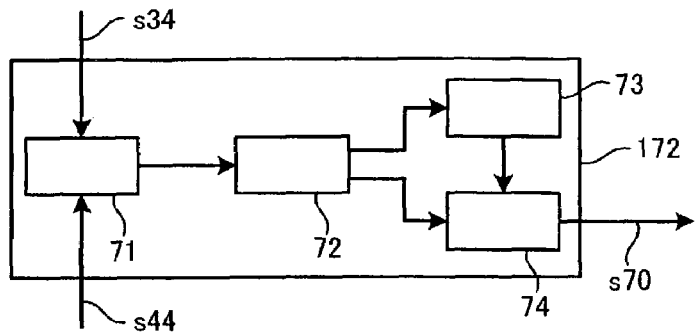
FIG. 4(*a*) is a block diagram showing a base band signal selecting circuit forming part of a second embodiment of the radio signal receiving apparatus according to the present invention.

The following description will now be directed to the base band signal selecting circuit 172 forming part of the second embodiment of the radio signal receiving apparatus according to the present invention with reference to the drawings shown in FIG. 4(a).

The base band signal selecting circuit 172 includes: a signal level judging section 71, a candidate signal selecting section 72, a signal level difference calculating section 73, and a first judging section 74.

The signal level judging section 71 is adapted to judge whether or not each of the gain control values calculated by the gain control calculators in association with each of the base band signals is smaller than a predetermined signal level.

The radio signal receiving apparatus according to the present invention may comprise three or more radio signal receiving circuits for respectively receiving radio signals each having a base band signal component. The base band signal selecting circuit 172 is operative to select one of the base band signal from among the base band signals produced by the two or more radio signal receiving circuits.

It is hereinlater assumed for simplicity and better understanding that the base band signals produced by the base band signal producing circuits of the radio signal receiving circuits include first and second base band signals respectively having first and second signal levels. The gain control values calculated by the gain control calculators of the radio signal receiving circuits include first and second gain control values respectively indicative of the absolute value of the signal level difference between the first signal level of the. first base band signal and the predetermined target signal level and the absolute value of the signal level difference between the second signal level of the second base band signals and the predetermined target signal level. The first gain control value in association with the first base band signal is smaller than the gain control value in association with each of the base band signals, and the second gain control value in association with the second base band signal is smaller than the gain control value in association with each of the base band signals except for the first base band signal at a time point when the candidate signal selecting section 72 selects them. The first and second gain control values are varied in response to a time axis, and respectively having first and second fluctuations. The first and second gain control values respectively in association with the first and second base band signals.

The candidate signal selecting section 72 is adapted to select the first and second base band signals from among the base band signals produced by two or more base band signal producing circuits after selecting and deciding that the first gain control value in association with the first base band signal is smaller than the gain control value in association with each of the base band signals, and the second gain control value in association with the second base band signal is smaller than the gain control value in association with each of the base band signals except for the first base band signal.

The gain control value difference calculating section 73 is adapted to calculate a gain control value difference between the first gain control value in association with the first base band signal selected by the candidate signal selecting section 72 and the second gain control value in association with the second base band signal selected by the candidate signal selecting section 72.

The first judging section 74 is adapted to judge whether or not the gain control value difference between the first gain control value and the second gain control value calculated by the gain control value difference calculating section 73 is larger than a predetermined threshold value.

Figure 5:
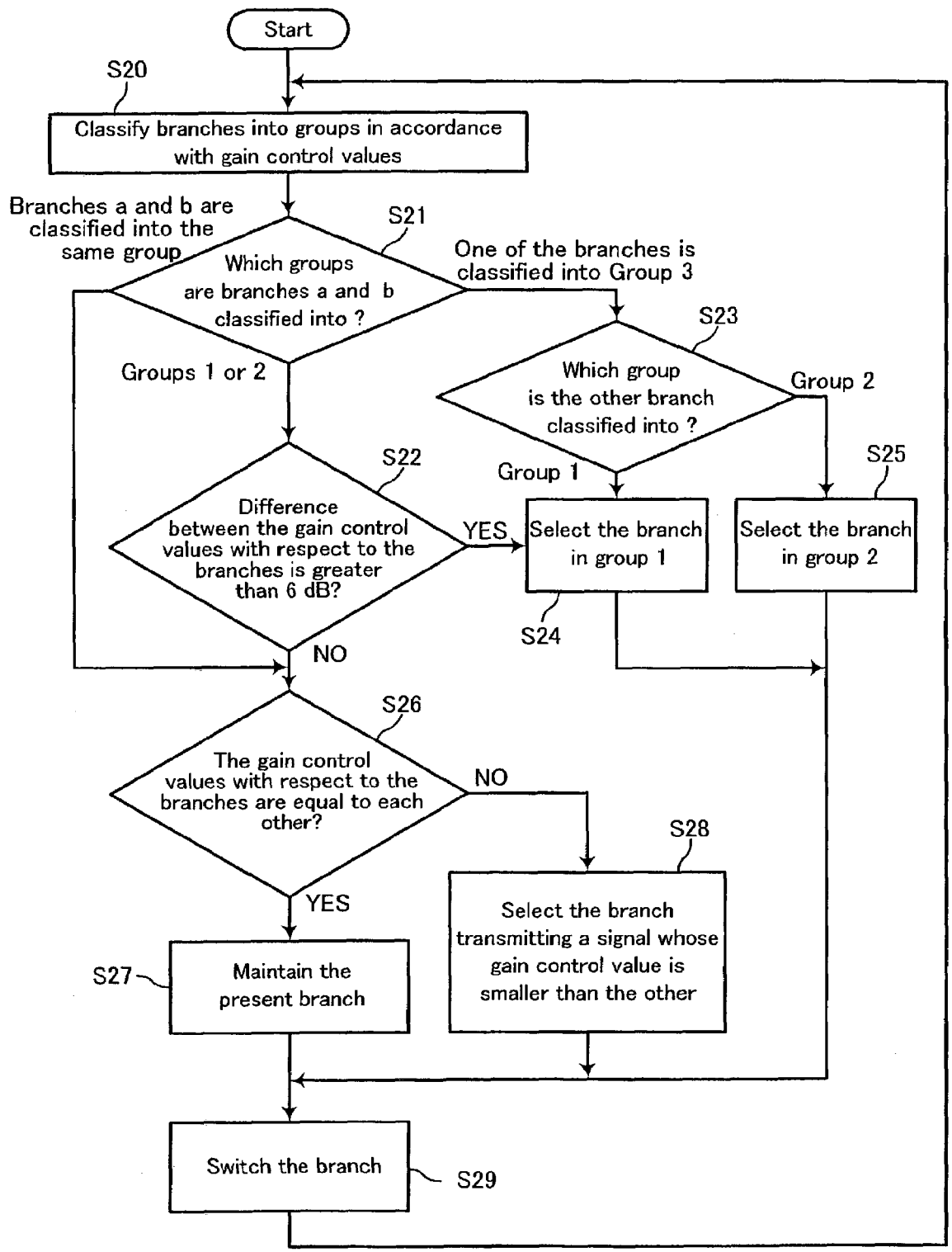
FIG. 5 is a flow chart showing a process to be performed by the second embodiment of the radio signal receiving apparatus according to the present invention.

The following description will now be directed to the process to be performed by the second embodiment of the radio signal receiving apparatus according to the present invention with reference to the flowchart shown in FIG. 5.

The first and second radio signal receiving circuits 101 and 102 are periodically classified by the base band signal selecting circuit 172 into the groups based on the first absolute value |Vta−Va| of the difference between the predetermined signal level "Vta" and the logarithmic value "Va" in association with the signal level of the smoothened signal s31. The first and second groups are selected by the base band signal selecting circuit 172 from among the groups in the step S20. The judgment is then made by the base band signal selecting circuit 172 on whether or not both the first and second radio signal receiving circuits 101 and 102 are classified into any one of the groups in the step S21.

In the steps S20 and S21, it is judged by the signal level judging section 71 whether or not each of the gain control values calculated by the gain control calculators in association with each of the base band signals is smaller than a predetermined signal level, which specifies the minimum and maximum signal level of the signal range corresponding to the first and second groups G1 and G2 (see FIG. 3). The first and second base band signals are then selected by the candidate signal selecting section 72 from among the base band signals produced by two or more base band signal producing circuits after selecting and deciding that the first gain control value in association with the first base band signal is smaller than the gain control value in association with each of the base band signals, and the second gain control value in association with the second base band signal is smaller than the gain control value in association with each of the base band signals except for the first base band signal.

When the answer in the step S21 is in the affirmative "YES", i.e., both the first and second radio signal receiving circuits 101 and 102 are classified into one of the groups, the step S21 proceeds to the step S22. When, on the other hand, the answer in the step S21 is in the negative "NO", i.e., both the first and second radio signal receiving circuits 101 and 102 are not classified into any one of the groups, the judgment is made by the base band signal selecting circuit 172 on whether or not the first and second radio signal receiving circuits 101 and 102 are separately classified into the first and second groups in the step S21. When the answer is in the affirmative "YES", i.e., the first and second radio signal receiving circuits 101 and 102 are separately classified into the first and second groups, the step S21 proceeds to the step S22. When, on the other hand, the answer is in the negative "NO", i.e., one of the first and second radio signal receiving circuits 101 and 102 is classified into the third group, the step S21 proceeds to the step S23.

The judgment is then made by the base band signal selecting circuit 172 whether or not the difference between the first absolute value |Vta−Va| and the second absolute value |Vtb−Vb| is larger than 6 [dB] in the step S22.

In the step S22, the gain control value difference calculating section 73 is operated to calculate a gain control value difference between the first gain control value in association with the first base band signal selected by the candidate signal selecting section 72 and the second gain control value in association with the second base band signal selected by the candidate signal selecting section 72, i.e., the difference between the first absolute value |Vta−Va| and the second absolute value |Vtb−Vb|. The first judging section 74 is operated to judge whether or not the gain control value difference between the first gain control value and the second gain control value calculated by the gain control value difference calculating section 73, i.e., the difference between the first absolute value |Vta−Va| and the second absolute value |Vtb−Vb|, is larger than a predetermined threshold value, i.e., 6 [dB].

When the answer in the step S22 is in the affirmative "YES", i.e., the difference between the first absolute value |Vta−Va| and the second absolute value |Vtb−Vb| is larger than 6 [dB], the step S22 proceeds to the step S24. When, on the other hand, the answer in the step S22 is in the negative "NO", i.e., the difference between the first absolute value |Vta−Va| and the second absolute value |Vtb−Vb| is not larger than 6 [dB], the step S22 proceeds to the step S26.

The judgment is then made by the base band signal selecting circuit 172 whether or not one of the first and second radio signal receiving circuits 101 and 102 except for the other classified into the third group is classified into the first group in the step S23. When the answer in the step S23 is in the affirmative "YES", i.e., one of the first and second radio signal receiving circuits 101 and 102 except for the other classified into the third group is classified into the first group, the step S23 proceeds to the step S24. When, on the other hand, the answer in the step S23 is in the negative "NO", i.e., one of the first and second radio signal receiving circuits 101 and 102 except for the other classified into the third group is classified into the second group, the step S23 proceeds to the step S25.

The base band signal outputted by the radio signal receiving circuit classified into the first group is selected by the base band signal selecting circuit 172 as the output signal s80 to be outputted to the exterior device in the step S24.

The base band signal outputted by the radio signal receiving circuit classified into the second group is selected by the base band signal selecting circuit 172 as the output signal s80 to be outputted to the exterior device in the step S25.

The first absolute value |Vta−Va| of the difference between the predetermined signal level "Vta" and the logarithmic value "Va" in association with the signal level of the smoothed signal is periodically calculated by the signal level calculator 33 forming part of the first radio signal receiving circuit 101. The second absolute value |Vtb−Vb| of the difference between the predetermined signal level "Vtb" and the logarithmic value "Vb" in association with the signal level of the smoothed signal s42 is periodically calculated by the signal level calculator 43 forming part of the second radio signal receiving circuit 102.

The judgment is then made by the base band signal selecting circuit 172 whether or not the first absolute value |Vta−Va| is equal to the second absolute value |Vtb−Vb| in the step S26. When the first absolute value |Vta−Va| is equal to the second absolute value |Vtb−Vb|, the step S26 proceeds to the step S27. When the first absolute value |Vta−Va| is not equal to the second absolute value |Vtb−Vb|, the step S26 proceeds to the step S28.

The base band signal s52 outputted by the first radio signal receiving circuit 101 is selected by the base band signal selecting circuit 172 as the output signal s80 to be outputted to the exterior device under the condition that the base band signal s52 outputted by the first radio signal receiving circuit 101 is outputted to the exterior device. The base band signal s62 outputted by the second radio signal receiving circuit 102 is, on the other hand, selected by the base band signal selecting circuit 172 as the output signal s80 to be outputted to the exterior device under the condition that the base band signal s62 outputted by the second radio signal receiving circuit 102 is outputted to the exterior device in the step S27.

When the first absolute value |Vta−Va| is smaller than the second absolute value |Vta−Va|, the base band signal s52 outputted by the first radio signal receiving circuit 101 is selected by the base band signal selecting circuit 172 as the output signal s80 to be outputted to the exterior device in the step S28. When the first absolute value |Vta−Va| is, on the other hand, larger than the second absolute value |Vtb−Vb|, the base band signal s62 outputted by the second radio signal receiving circuit 102 is selected by the base band signal selecting circuit 172 as the output signal s80 to be outputted to the exterior apparatus in the step S28.

The base band signal selected by the base band signal selecting circuit 172 in the step S24, S25, S27, or S28 is outputted by the base band signal outputting circuit 80 in the step S29.

While it has been described in the above that the base band signal selecting circuit is operative to classify the base band signals into the groups based on the gain control value, the base band signal selecting circuit forming part of the radio signal receiving apparatus according to the present invention may classify the base band signals into the groups based on the signals levels of the base band signals to be produced. In the case, the base band signal selecting circuit 172 includes a signal level judging section 71*b* for judging whether or not the signal level of each of the base band signals calculated by the signal level calculators is lager than a predetermined signal level, and the base band signal selecting circuit 172 is operative to select one of the base band signals from among the base band signals produced by the base band signal producing circuits after judging whether or not the signal level of one of the base band signals is larger than the signal level of each of the others of the base band signals based on results judged by the signal level judging section71*b*.

From the above detail description, it will be understood that the radio signal receiving apparatus according to the second embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having signal levels, which are not monotonously decreased along the time axis, thereby ensuring reliable communications between a far-end speaker and a near-end speaker. Furthermore, the radio signal receiving apparatus according to the second embodiment of the present invention can selectively receive radio signals each including a base band signal component through the antennas, produce a plurality of base band signals each indicative of the base band signal component, and periodically select one base band signal highest in quality from among the base band signals with the aim of consistently outputting the selected base band signals respectively having low error rates, thereby ensuring reliable communications between a far-end speaker and a near-end speaker.

The following description will now be directed to the third embodiment of the radio signal receiving apparatus according to the present invention.

The constitutional elements of the third embodiment of the radio signal receiving apparatus according to the present invention is the same as those of the first embodiment of the radio signal receiving apparatus 100 according to the present invention, therefore the constitution of the third embodiment of the radio signal receiving apparatus according to the present invention will be firstly described hereinafter with reference to FIG. 1.

The constitutional elements of the third embodiment of the radio signal receiving apparatus according to the present invention are the same as those of the first embodiment of the radio signal receiving apparatus 100 according to the present invention, however, the operation of the base band signal selecting circuit 173 forming part of the third embodiment of the radio signal receiving apparatus according to the present invention is different from the operation of the base band signal selecting circuit 70 forming part of the first embodiment of the radio signal receiving apparatus 100 according to the present invention.

Therefore, only the constitutional elements and the steps of the third embodiment of the radio signal receiving apparatus different from those of the first embodiment of the radio signal receiving apparatus 100 will be described in detail hereinafter with reference to the drawings shown in FIGS. 1, 3, and 4(b). The constitutional elements and the steps of the third embodiment of the radio signal receiving apparatus entirely the same as those of the first embodiment of the radio signal receiving apparatus 100 will not be described but bear the same reference numerals and legends as those of the first embodiment of the radio signal receiving apparatus 100 shown in FIG. 1 to avoid tedious repetition.

The gain control value calculator 33 is operative to receive the smoothed signal from the smoothing filter, to calculate a first absolute value |Vta−Va| of the difference between the predetermined signal level "Vta" and the logarithmic value "Va" in association with the signal level of the smoothed signal, to produce a control signal s33 in association with the first absolute value |Vta−Va|, to produce a gain information signal 34 in association with the logarithmic value "Va", to output the control signal to the radio signal amplifier 11, and to output the gain information signal 34 to the base band signal selecting circuit 173.

The base band signal selecting circuit 173 is operative to receive the control signal s33 and the gain information signal s34 from the gain control value calculator 33 and the control signal s33 and gain information signal s44 from the gain control value calculator 43, to judge whether or not the signal level of the base band signal s52 outputted by the first radio signal receiving circuit 101 and the signal level of the base band signal s62 outputted by the second radio signal receiving circuit 102 are within the error-free range (see FIG. 3) based on the gain information signal s34 received from the gain control value calculator 33 and the gain information signal s44 received from the gain control value calculator 43, and to have the base band signal outputting circuit 80 selectively output the base band signal s52 outputted by the first radio signal receiving circuit 101 and the base band signal s62 outputted by the second radio signal receiving circuit 102 to the exterior device. The base band signal selecting circuit 173 has a storage section, not shown, having signal level range information storage therein. The signal level range information shows relationship between signal level values or gain control values with signal ranges respectively associated with groups. Preferably, the base band signal selecting circuit 173 may have an operator input the signal level range information therein.

The base band signal selecting circuit 173 is operative to have the base band signal outputting circuit 80 output one of the base band signal s52 outputted by the first radio signal receiving circuit 101 and the base band signal s62 outputted by the second radio signal receiving circuit 102 to the exterior device under the condition that the signal level of the one of the base band signal s52 outputted by the first radio signal receiving circuit 101 and the base band signal s62 outputted by the second radio signal receiving circuit 102 is within the error-free range, and the signal level of the other of the base band signal s52 outputted by the first radio signal receiving circuit 101 and the base band signal s62 outputted by the second radio signal receiving circuit 102 is not within the error-free range.

The base band signal selecting circuit 173 is operative to judge whether or not each of the first absolute value |Vta−Va| of the gain information signal s34 and the second absolute value |Vtb−Vb| of the gain information signal s44 is decreased or increased along the time axis before having the base band signal outputting circuit 80 selectively output the base band signal s52 outputted by the first radio signal receiving circuit 101 and the base band signal s62 outputted by the second radio signal receiving circuit 102 to the exterior device based on judged results under the condition that both of signal level of the base band signal s52 outputted by the first radio signal receiving circuit 101 and the signal level of the base band signal s62 outputted by the second radio signal receiving circuit 102 are within the error-free range, or that both of the signal levels of the base band signal s52 outputted by the first radio signal receiving circuit 101 and the signal level of the base band signal s62 outputted by the second radio signal receiving circuit 102 are not within the error-free range.

The base band signal selecting circuit 173 is operative to judge as the each of the first absolute value |Vta−Va| of the gain information signal s34 and the second absolute value |Vtb−Vb| of the gain information signal s44 being continuously decreased along the time axis for n times under the condition that each of the first absolute value |Vta−Va| of the gain information signal s34 and the second absolute value |Vtb−Vb| of the gain information signal s44 periodically calculated by each of the gain control value calculators 33 and 43 in a specific period is monotonously decreased along the time axis. On the other hand, the base band signal selecting circuit 173 is operative to judge as the each of the first absolute value |Vta−Va| of the gain information signal s34 and the second absolute value |Vtb−Vb| of the gain information signal s44 being continuously increased along the time axis for n times under the condition that each of the first absolute value |Vta−Va| of the gain information signal s34 and the second absolute value |Vtb−Vb| of the gain information signal s44 periodically calculated by each of the gain control value calculators 33 and 43 in a specific period is monotonously increased along the time axis.

The base band signal selecting circuit 173 is operative to select the base band signal the same as the base band signal outputted by the base band signal outputting circuit 80 to the exterior device in the preceding frame prior to the current frame after judging as both of the first absolute value |Vta−Va| and the second absolute value |Vtb−Vb| being decreased or increased along the time axis.

Figure 6:
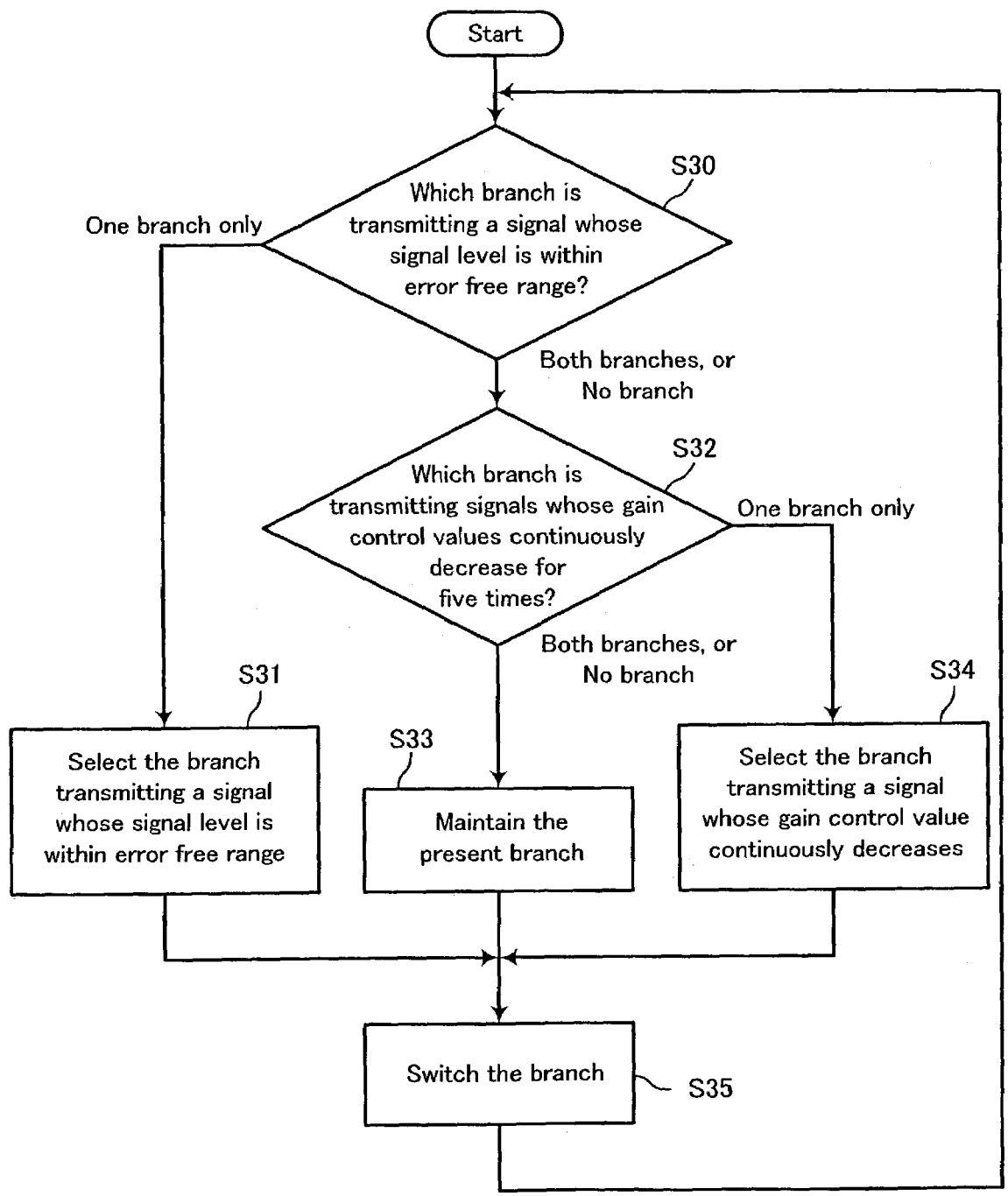
FIG. 6 is a flow chart showing a process to be performed by the third embodiment of the radio signal receiving apparatus according to the present invention.

The following description will now be directed to the process to be performed by the third embodiment of the radio signal receiving apparatus according to the present invention with reference to the flowchart shown in FIG. 6. The term "branches" are intended to indicate the radio signal receiving circuits.

The judgment is then made by the base band signal selecting circuit 173 on whether or not both of the signal levels of the base band signals s52 and s62 are within the error-free range based on each of the gain information signal s34 received from the gain control value calculator 33 forming part of the first radio signal receiving circuit 101 and the gain information signal s44 received from the gain control value calculator 43 forming part of the second radio signal receiving circuit 102 in the step S30.

When the answer in the step S30 is in the affirmative "YES", i.e., both of the signal levels of the base band signals s52 and s62 are within the error-free range, the step S30 proceeds to the step S32. When, on the other hand, the answer in the step S30 is in the negative "NO", i.e., both of the signal levels of the base band signal s52 and the base band signal s62 are not in the error-free range, the judgment is made by the base band signal selecting circuit 173 on whether or not one of the base band signals s52 and s62 is within the error-free range based on each of the gain information signal s34 received from the gain control value calculator 33 forming part of the first radio signal receiving circuit 101 and the gain information signal s44 received from the gain control value calculator 43 forming part of the second radio signal receiving circuit 102 in the step S30. When the answer in the step S30 is in the negative "NO", i.e., only one of the base band signals s52 and s62 is within the error-free range, the step S30 proceeds to the step S31. On the other hand, when the answer in the step S30 is in the negative "NO", i.e., the signal level of base band signals s52 nor s62 is within the error-free range, the step S30 proceeds to the step S32.

The base band signal s52 outputted by the first radio signal receiving circuit 101 is selected by the base band signal selecting circuit 173 as the output signal s80 to be outputted to the exterior device under the condition that the signal level of the base band signal s52 outputted by the first radio signal receiving circuit 101 is within the error-free range, and the signal level of the base band signal s62 outputted by the second radio signal receiving circuit 102 is not within the error-free range in the step S31. The base band signal s62 outputted by the second radio signal receiving circuit 102 is, on the other hand, selected by the base band signal selecting circuit 173 as the output signal s80 to be outputted to the exterior device under the condition that the signal level of the base band signal s52 outputted by the first radio signal receiving circuit 101 is not within the error-free range, and the signal level of the base band signal s62 outputted by the second radio signal receiving circuit 102 is within the error-free range in the step S31.

The judgment is made by the base band signal selecting circuit 173 on whether or not both of the first absolute value |Vta−Va| and the second absolute value |Vtb−Vb| are continuously decreased or increased based on results periodically calculated by each of the gain control value calculators 33 and 43 in the step S32. When the answer in the step S32 is in the affirmative "YES", i.e., both of the first absolute value |Vta−Va| and the second absolute value |Vtb−Vb| are continuously decreased or increased, the step S32 proceeds to the step S33. When, on the other hand, the answer in the step S32 is in the negative "NO", i.e., one of the first absolute value |Vta−Va| and the second absolute value |Vtb−Vb| is continuously decreased, and the other of the first absolute value |Vta−Va| and the second absolute value |Vtb−Vb| is not continuously decreased, the step S32 proceeds to the step S34.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 173 on whether each of the first absolute value |Vta−Va| and the second absolute value |Vtb−Vb| is continuously decreased or increased based on results periodically calculated by each of the gain control value calculators 33 and 43.

The base band signal s52 outputted by the first radio signal receiving circuit 101 is selected by the base band signal selecting circuit 173 as the output signal s80 to be outputted to the exterior device under the condition that the base band signal s52 outputted by the first radio signal receiving circuit 101 is outputted to the exterior device in the step S33. The base band signal s62 outputted by the second radio signal receiving circuit 102 is, on the other hand, selected by the base band signal selecting circuit 173 as the output signal s80 to be outputted to the exterior device under the condition that the base band signal s62 outputted by the second radio signal receiving circuit 102 is outputted to the exterior device in the step S33.

The base band signal s52 outputted by the first radio signal receiving circuit 101 is selected by the base band signal selecting circuit 173 as the output signal s80 to be outputted to the exterior device under the condition that the judgment is made by the base band signal selecting circuit 173 on that the first absolute value |Vta−Va| is continuously decreased based on results periodically calculated by the gain control value calculator 33 in the step S34. The base band signal s62 outputted by the second radio signal receiving circuit 102 is, on the other hand, selected by the base band signal selecting circuit 173 as the output signal s80 to be outputted to the exterior device under the condition that the judgment is made by the base band signal selecting circuit 173 on that the second absolute value |Vtb−Vb| is continuously decreased based on results periodically calculated by the gain control value calculator 43 in the step S34.

The base band signal selected by the base band signal outputting circuit 80 in any one of the step S31, the step S33, and the step S34 is outputted to the exterior device as an output signal s80 in the step S35.

Figure 4B:
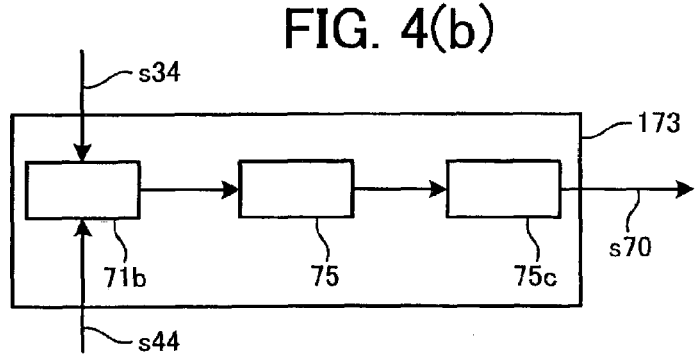
Figure 4C:
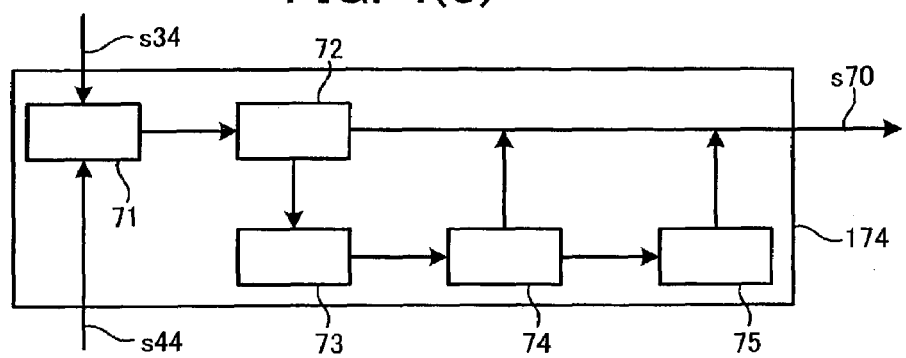

The following description will now be directed to the base band signal selecting circuit 173 forming part of the third embodiment of the radio signal receiving apparatus according to the present invention with reference to the drawings shown in FIG. 4(b).

The base band signal selecting circuit 173 comprises a signal level judging section 71b for judging whether or not the signal level of each of the base band signals calculated by the signal level calculators 31 and 41 is lager than a predetermined signal level, a second judging section 75 for judging whether or not the fluctuation of the first gain control value in association with the first base band signal is larger than the fluctuation of the second gain control value in association with the second base band signal, and a fourth judging section 75c for judging whether or not the gain control value calculated by the signal level difference calculators in association with the base band signal is decreased after judging whether or not the gain control values periodically calculated by the signal level difference calculators in association with the base band signal are decreased at predetermined time intervals for a predetermined time period.

The second judging section 75 is operative to judge whether or not the fluctuation of the first gain control value in association with the first base band signal is larger than the fluctuation of the second gain control value in association with the second base band signal after judging the fluctuation of the first gain control values periodically calculated by the gain control calculator in association with the first base band signal and the fluctuation of the second gain control values periodically calculated by the gain control calculator in association with the second base band signal at predetermined time intervals for a predetermined time period.

In the step S30, the signal level judging section 71*b* is operated to judge whether or not the signal level of each of the base band signals calculated by the signal level calculators 31 and 41 is lager than a predetermined signal level, which specifies the minimum and maximum signal level of the error-free range, and judge whether or not the signal level of each of the base band signals s52 and s62 is within the error-free range based on each of the gain information signal s34 received from the gain control value calculator 33 forming part of the first radio signal receiving circuit 101 and the gain information signal s44 received from the gain control value calculator 43 forming part of the second radio signal receiving circuit 102.

In the step S32, the second judging section 75 is operated to judge whether or not the fluctuation of the first gain control value in association with the first base band signal is larger than the fluctuation of the second gain control value in association with the second base band signal, i.e., whether or not each of the first absolute value |Vta−Va| and the second absolute value |Vtb−Vb| are continuously decreased or increased based on results periodically calculated by each of the gain control value calculators 33 and 43. More specifically, the second judging section 75 is operative to judge whether or not the fluctuation of the first gain control value in association with the first base band signal is larger than the fluctuation of the second gain control value in association with the second base band signal after judging the fluctuation of the first gain control values periodically calculated by the gain control calculator in association with the first base band signal and the fluctuation of the second gain control values periodically calculated by the gain control calculator in association with the second base band signal at predetermined time intervals for a predetermined time period, i.e., whether or not each of the first absolute value |Vta−Va| and the second absolute value |Vtb−Vb| are continuously decreased or increased based on results periodically calculated by each of the gain control value calculators 33 and 43 along a time axis for n times at a predetermined time intervals.

In the step S34, the fourth judging section 75*c* is operated to judge whether or not the gain control value calculated by the signal level difference calculator 33 or 43 in association with the base band signal is decreased after judging whether or not the gain control values periodically calculated by the signal level difference calculator 33 or 43 in association with the base band signal are decreased at predetermined time intervals for a predetermined time period. The base band signal selecting circuit 173 is operated to select one of the base band signals from among the base band signals produced by the base band signal producing circuits based on results judged by the fourth judging section 75*c*.

Although the radio signal receiving apparatus comprises first and second radio signal receiving circuits 101 and 102 for respectively receiving radio signals s01 and s02 each having a base band signal component, the radio signal receiving apparatus according to the present invention may comprise three or more radio signal receiving circuits for respectively receiving radio signals each having a base band signal component.

From the above detail description, it will be understood that the radio signal receiving apparatus according to the third embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having low error rates, thereby ensuring reliable communications between a far-end speaker and a near-end speaker.

The following description will now be directed to the fourth embodiment of the radio signal receiving apparatus according to the present invention.

The constitutional elements of the fourth embodiment of the radio signal receiving apparatus according to the present invention are the same as those of the first embodiment of the radio signal receiving apparatus 100 according to the present invention, therefore the constitution of the fourth embodiment of the radio signal receiving apparatus according to the present invention will be firstly described hereinafter with reference to FIG. 1.

The constitutional elements of the fourth embodiment of the radio signal receiving apparatus according to the present invention are the same as those of the first embodiment of the radio signal receiving apparatus 100 according to the present invention, however, the operation of the base band signal selecting circuit 174 forming part of the fourth embodiment of the radio signal receiving apparatus according to the present invention is different from the operation of the base band signal selecting circuit 70 forming part of the first embodiment of the radio signal receiving apparatus 100 according to the present invention.

Therefore, only the constitutional elements and the steps of the fourth embodiment of the radio signal receiving apparatus different from those of the first embodiment of the radio signal receiving apparatus 100 will be described in detail hereinafter with the drawings shown in FIGS. 1, 3, and 4(*c*). The constitutional elements and the steps of the fourth embodiment of the radio signal receiving apparatus entirely the same as those of the first embodiment of the radio signal receiving apparatus 100 will not be described but bear the same reference numerals and legends as those of the first embodiment of the radio signal receiving apparatus 100 shown in FIG. 1 to avoid tedious repetition.

The gain control value calculator 33 is operative to receive the smoothed signal from the smoothing filter, to calculate a first absolute value |Vta−Va| of the difference between the predetermined signal level "Vta" and the logarithmic value "Va" in association with the signal level of the smoothed signal, to produce a control signal s33 in association with the first absolute value |Vta−Va|, to produce a gain information signal in association with the logarithmic value "Va", to output the control signal to the radio signal amplifier 11, and to output the gain information signal to the base band signal selecting circuit 174.

The base band signal selecting circuit 174 is operative to receive the control signal s33 and the gain information signal s34 from the gain control value calculator 33 forming part of the first radio signal receiving circuit 101, and the control signal s43 and the gain information signal s44 from the gain control value calculator 43 forming part of the second radio signal receiving circuit 102.

The base band signal selecting circuit 174 is operative to classify the first and second radio signal receiving circuits 101 and 102 into groups in association with the signal level of the radio signal to be amplified by the radio signal amplifier 11, the groups including at least two different groups consisting of first and second groups.

The base band signal selecting circuit 174 is operative to select one of the first and second radio signal receiving circuits 101 and 102 classified into the first group from among the first and second radio signal receiving circuits 101 and 102 under the condition that both the first and second radio signal receiving circuits 101 and 102 are classified in the first group.

The base band signal selecting circuit 174 is operative to select one of the first and second radio signal receiving circuits 101 and 102 classified into the first group from among the first and second radio signal receiving circuits 101 and 102 under the condition that one of the first and second radio signal receiving circuits 101 and 102 is classified in the first group, and the other of the first and second radio signal receiving circuits 101 and 102 is classified in the second group.

The base band signal selecting circuit 174 is operative to select one of the first and second radio signal receiving circuits 101 and 102 classified into the second group from among the first and second radio signal receiving circuits 101 and 102 under the condition that none of the first and second radio signal receiving circuits 101 and 102 is classified in the first group, but both the first and second radio signal receiving circuits 101 and 102 are classified in the second group. The. base band signal selecting circuit 174 is operative to produce a switching signal s70 in association with the selected radio signal receiving circuit, and output the switching signal s70 to the base band signal outputting circuit 80.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal. The base band signal selecting circuit 174 has a storage section, not shown, having signal level range information storage therein. The signal level range information shows relationship between signal level values or gain control values with signal ranges respectively associated with groups. Preferably, the base band signal selecting circuit 174 may have an operator input the signal level range information therein.

The base band signal selecting circuit 174 is operative to classify the radio signal receiving circuit into the first group G1 under the condition that the gain control value is within the range shown by the arrow pointed out by the legend G1. The base band signal selecting circuit 174 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 174 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 174 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 174 is operative to select the radio signal receiving circuit classified into the first group from among the radio signal receiving circuits under the condition that at least two radio signal receiving circuits are classified into the first group. On the other hand, the base band signal selecting circuit 174 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 174 is operative to produce a switching signal s70 in association with the selected radio signal receiving circuit, and output the switching signal s70 to the base band signal outputting circuit 80.

The base band signal selecting circuit 174 is operative to judge whether or not the difference between the first absolute value |Vta−Va| and the second absolute value |Vtb−Vb| is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 174 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 174 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 174 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 174 is operative to have the base band signal outputting circuit 80 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 174 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 174 is operative to have the base band signal outputting circuit 80 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Here, the base band signal selecting circuit 174 is operative to judge as the first absolute value |Vta−Va| being decreased along the time axis after judging as the first absolute value |Vta−Va| periodically calculated by the gain control value calculator in a specific period being monotonously decreased along the time axis.

The base band signal selecting circuit 174 is operative to select the base band signal the same as the base band signal outputted by the base band signal outputting circuit 80 to the exterior device in the preceding frame prior to the current flame after judging as both of the first absolute value |Vta−Va| and the second absolute value |Vtb−Vb| being decreased or increased along the time axis.

Figure 7:
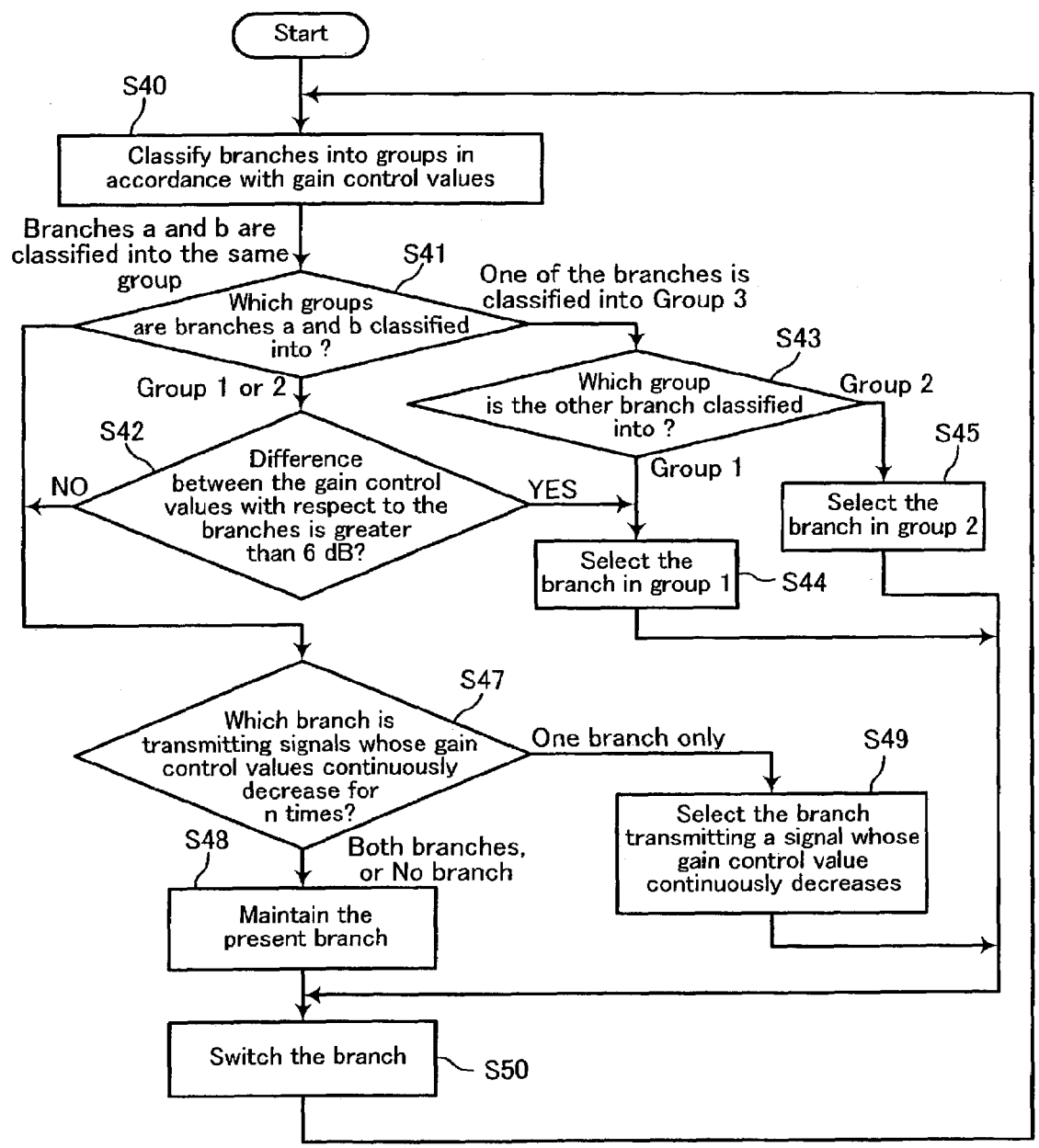
FIG. 7 is a flow chart showing a process to be performed by the fourth embodiment of the radio signal receiving apparatus according to the present invention.

The following description will now be directed to the process to be performed by the fourth embodiment of the radio signal receiving apparatus according to the present invention with reference to the flowchart shown in FIG. 7. The term "branches" is intended to indicate the radio signal receiving circuits.

The first and second radio signal receiving circuits 101 and 102 are periodically classified by the base band signal selecting circuit 174 into the groups based on the first absolute value |Vta−Va| of the difference between the predetermined signal level "Vta" and the logarithmic value "Va" in association with the signal level of the smoothened signal s31. The first and second groups are selected by the base band signal selecting circuit 174 from among the groups in the step S40.

The judgment is then made by the base band signal selecting circuit 174 on whether or not both the first and second radio signal receiving circuits 101 and 102 are classified into any one of the groups in the step S41. When the answer in the step S41 is in the affirmative "YES", i.e., both the first and second radio signal receiving circuits 101 and 102 are classified into one of the groups, the step S41 proceeds to the step S47. When, on the other hand, the answer in the step S41 is in the negative "NO", i.e., both the first and second radio signal receiving circuits 101 and 102 are not classified into any one of the groups, the judgment is made by the base band signal selecting circuit 174 on whether or not the first and second radio signal receiving circuits 101 and 102 are separately classified into the first and second groups in the step S41. When the answer in the step S41 is in the affirmative "YES", i.e., the first and second radio signal receiving circuits 101 and 102 are separately classified into respective first and second groups, the step S41 proceeds to the step S42. When, on the other hand, the answer in the step S41 is in the negative "NO", i.e., one of the first and second radio signal receiving circuits 101 and 102 is classified into the third group, the step S41 proceeds to the step S43.

The judgment is then made by the base band signal selecting circuit 174 whether or not the difference between the first absolute value |Vta−Va| and the second absolute value |Vtb−Vb| is larger than 6 [dB] in the step S42. When the answer in the step S42 is in the affirmative "YES", i.e., the difference between the first absolute value |Vta−Va| and the second absolute value |Vtb−Vb| is larger than 6 [dB], the step S42 proceeds to the step S44. When, on the other hand, the answer in the step S42 is in the negative "NO", i.e., the difference between the first absolute value |Vta−Va| and the second absolute value |Vtb−Vb| is not larger than 6 [dB], the step S42 proceeds to the step S47.

The judgment is then made by the base band signal selecting circuit 174 whether or not one of the first and second radio signal receiving circuits 101 and 102 except for the other classified into the third group is classified into the first group in the step S43. When the answer in the step S43 is in the affirmative "YES", i.e., the one of the first and second radio signal receiving circuits 101 and 102 except for the other classified into the third group is classified into the first group, the step S43 proceeds to the step S44. When, on the other hand, the answer in the step S43 is in the negative "NO", i.e., the one of the first and second radio signal receiving circuits 101 and 102 except for the other classified into the third group is classified into the second group, the step S43 proceeds to the step S45.

The base band signal outputted by the radio signal receiving circuit classified into the first group selected by the base band signal selecting circuit 174 as the output signal s80 to be outputted to the exterior device in the step S44.

The base band signal outputted by the radio signal receiving circuit classified into the second group selected by the base band signal selecting circuit 174 as the output signal s80 to be outputted to the exterior device in the step S45.

The judgment is then made by the base band signal selecting circuit 174 whether or not each of the first absolute value |Vta−Va| and the second absolute value |Vtb−Vb| is decreased in the predetermined period in the step S47. When the answer in the step S47 is in the affirmative "YES", i.e., each of the first absolute value |Vta−Va| and the second absolute value |Vtb−Vb| is decreased in the predetermined period, the step S47 proceeds to the step S48. When, on the other hand, the answer in the step S47 is in the negative "NO", i.e., each of the first absolute value |Vta−Va| and the second absolute value |Vtb−Vb| is not decreased in the predetermined period, the judgment is then made by the base band signal selecting circuit 174 whether or not each of the first absolute value |Vta−Va| and the second absolute value |Vtb−Vb| is increased in the predetermined period in the step S47. When the answer in the step S47 is in the affirmative "YES", i.e., each of the first absolute value |Vta−Va| and the second absolute value |Vtb−Vb| is increased in the predetermined period, the step S47 proceeds to the step S48. When, on the other hand, the answer in the step S47 is in the negative "NO", i.e., only one of the first absolute value |Vta−Va| and the second absolute value |Vtb−Vb| is decreased in the predetermined period, the step S47 proceeds to the step S49.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 174 on whether each of the first absolute value |Vta−Va| and the second absolute value |Vtb−Vb| is continuously decreased or increased based on result periodically calculated by each of the gain control value calculators 33 and 43.

The base band signal s52 outputted by the first radio signal receiving circuit 101 is selected by the base band signal selecting circuit 174 as the output signal s80 to be outputted to the exterior device under the condition that the base band signal s52 outputted by the first radio signal receiving circuit 101 is outputted to the exterior device in the step S48. The base band signal s62 outputted by the second radio signal receiving circuit 102 is, on the other hand, selected by the base band signal selecting circuit 174 as the output signal s80 to be outputted to the exterior device under the condition that the base band signal s62 outputted by the second radio signal receiving circuit 102 is outputted to the exterior device in the step S48.

The base band signal s52 outputted by the first radio signal receiving circuit 101 is selected by the base band signal selecting circuit 174 as the output signal s80 to be outputted to the exterior device under the condition that the judgment is made by the base band signal selecting circuit 174 on that the first absolute value |Vta−Va| is continuously decreased based on results periodically calculated by the gain control value calculator 33 in the step S49. The base band signal s62 outputted by the second radio signal receiving circuit 102 is, on the other hand, selected by the base band signal selecting circuit 174 as the output signal s80 to be outputted to the exterior device under the condition that the judgment is made by the base band signal selecting circuit 174 on that the second absolute value |Vtb−Vb| is continuously decreased based on results periodically calculated by the gain control value calculator 43 in the step S49.

The base band signal selected by the base band signal outputting circuit 80 in any one of the step S44, the step S45, the step S48, and the step S49 is outputted to the exterior device as an output signal s80 in the step 50.

The following description will now be directed to the base band signal selecting circuit 174 forming part of the fourth embodiment of the radio signal receiving apparatus according to the present invention with reference to the drawings shown in FIG. 4(*c*).

The base band signal selecting circuit 174 includes: a signal level judging section 71, a candidate signal selecting section 72, a signal level difference calculating section 73, a first judging section 74, and a second judging section 75.

In the step S40, the signal level judging section 71 is operated to judge whether or not each of the gain control values calculated by the gain control calculators 33 and 43 in association with each of the base band signals is smaller than a predetermined signal level, which specifies the minimum and maximum signal level of the signal range corresponding to the first and second groups.

The base band signals include first and second base band signals respectively having first and second signal levels. The gain control values include first and second gain control values respectively indicative of the absolute value of the signal level difference between the first signal level of the first base band signal and the predetermined target signal level and the absolute value of the signal level difference between the second signal level of the second base band signals and the predetermined target signal level. It is hereinlater assumed that the first gain control value is smaller than the gain control value in association with each of the base band signals, and the second gain control value in association with the second base band signal is smaller than the gain control value in association with each of the base band signals except for the first base band signal at a time point when the candidate signal selecting section 72 selects them. The first and second gain control values are varied in response to a time axis, and respectively having first and second fluctuations. The first and second gain control values respectively in association with the first and second base band signals.

In the step S20, the candidate signal selecting section 72 is operated to select the first and second base band signals from among the base band signals produced by two or more base band signal producing circuits after selecting and deciding that the first gain control value is smaller than the gain control value in association with each of the base band signals, and the second gain control value in association with the second base band signal is smaller than the gain control value in association with each of the base band signals except for the first base band signal.

The gain control value difference calculating section 73 is operated to calculate a gain control value difference between the first gain control value in association with the first base band signal selected by the candidate signal selecting section 72 and the second gain control value in association with the second base band signal selected by the candidate signal selecting section 72. The first judging section 74 is operated to judge whether or not the gain control value difference between the first gain control value and the second gain control value calculated by the gain control value difference calculating section 73 is larger than a predetermined threshold value, i.e., 6 dB in the step S42.

The second judging section 75 is adapted to judge whether or not the fluctuation of the first gain control value in association with the first base band signal is larger than the fluctuation of the second gain control value in association with the second base band signal. In the step S47, the second judging section 75 is operated to judge whether or not the fluctuation of the first gain control value in association with the first base band signal is larger than the fluctuation of the second gain control value in association with the second base band signal. More specifically, the second judging section 75 is operated to judge whether or not the fluctuation of the first gain control value in association with the first base band signal is larger than the fluctuation of the second gain control value in association with the second base band signal after judging the fluctuation of the first gain control values periodically calculated by the gain control calculator in association with the first base band signal and the fluctuation of the second gain control values periodically calculated by the gain control calculator in association with the second base band signal at predetermined time intervals for a predetermined time period.

The base band signal selecting circuit 174 is operative to select the first base band signal from among the base band signals produced by the base band signal producing circuits when the judgment is made by the first judging section 74 as the gain control value difference between the first gain control value and the second gain control value calculated by the gain control value difference calculating section 73 being larger than a predetermined threshold value in the step S42.

The base band signal selecting circuit 174 is operative to select one of the first and second base band signals from among the base band signals produced by the base band signal producing circuits 51 and 61 based on results judged by the second judging section 75 in step S47 when the judgment is made by the first judging section 74 as the gain control value difference between the first gain control value and the second gain control value calculated by the gain control value difference calculating section 73 being equal to or smaller than a predetermined threshold value in the step S42.

From the above detail description, it will be understood that the radio signal receiving apparatus according to the fourth embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having low error rates, thereby ensuring reliable communications between a far-end speaker and a near-end speaker.

The following description will now be directed to the fifth embodiment of the radio signal receiving apparatus according to the present invention.

The constitutional elements of the fifth embodiment of the radio signal receiving apparatus according to the present invention are the same as those of the first embodiment of the radio signal receiving apparatus 100 according to the present invention, therefore the constitution of the fifth embodiment of the radio signal receiving apparatus according to the present invention will be firstly described hereinafter with reference to FIG. 1.

The constitutional elements of the fifth embodiment of the radio signal receiving apparatus according to the present invention are the same as those of the first embodiment of the radio signal receiving apparatus 100 according to the present invention, however, the operation of the base band signal selecting circuit 175 forming part of the fifth embodiment of the radio signal receiving apparatus according to the present invention is different from the operation of the base band signal selecting circuit 70 forming part of the first embodiment of the radio signal receiving apparatus 100 according to the present invention.

Therefore, only the constitutional elements and the steps of the fifth embodiment of the radio signal receiving apparatus different from those of the first embodiment of the radio signal receiving apparatus 100 will be described in detail hereinafter with reference to the drawings shown in FIG. 1, 3, and 4(*d*). The constitutional elements and the steps of the fifth embodiment of the radio signal receiving apparatus entirely the same as those of the first embodiment of the radio signal receiving apparatus 100 will not be described but bear the same reference numerals and legends as those of the first embodiment of the radio signal receiving apparatus 100 shown in FIG. 1 to avoid tedious repetition.

The gain control value calculator 33 is operative to receive the smoothed signal from the smoothing filter, to calculate a first absolute value |Vta−Va| of the difference between the predetermined signal level "Vta" and the logarithmic value "Va" in association with the signal level of the smoothed signal, to produce a control signal s33 in association with the first absolute value |Vta−Va|, to produce a gain information signal in association with the logarithmic value "Va", to output the control signal to the radio signal amplifier 11, and to output the gain information signal to the base band signal selecting circuit 175.

The base band signal selecting circuit 175 is operative to receive the control signal s33 and the gain information signal s34 from the gain control value calculator 33 forming part of the first radio signal receiving circuit 101, and the control signal s43 and the gain information signal s44 from the gain control value calculator 43 forming part of the second radio signal receiving circuit 102. The base band signal selecting circuit 175 has a storage section, not shown, having signal level range information storage therein. The signal level range information shows relationship between signal level values or gain control values with signal ranges respectively associated with groups. Preferably, the base band signal selecting circuit 175 may have an operator input the signal level range information therein.

The base band signal selecting circuit 175 is operative to classify the first and second radio signal receiving circuits 101 and 102 into groups in association with the signal level of the radio signal to be amplified by the radio signal amplifier 11. The groups include at least two different groups consisting of first and second groups. The base band signal selecting circuit 175 is operative to select one of the first and second radio signal receiving circuits 101 and 102 classified into the first group from among the first and second radio signal receiving circuits 101 and 102 under the condition that both of the first and second radio signal receiving circuits 101 and 102 are classified in the first group. The base band signal selecting circuit 175 is operative to select one of the first and second radio signal receiving circuits 101 and 102 classified into the first group from among the first and second radio signal receiving circuits 101 and 102 under the condition that one of the first and second radio signal receiving circuits 101 and 102 is classified in the first group, and the other of the first and second radio signal receiving circuits 101 and 102 is classified in the second group. The base band signal selecting circuit 175 is operative to select one of the first and second radio signal receiving circuits 101 and 102 classified into the second group from among the first and second radio signal receiving circuits 101 and 102 under the condition that none of the first and second radio signal receiving circuits 101 and 102 is classified in the first group, but both of the first and second radio signal receiving circuits 101 and 102 are classified in the second group. The base band signal selecting circuit 175 is operative to produce a switching signal s70 in association with the selected radio signal receiving circuit, and output the switching signal s70 to the base band signal outputting circuit 80.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal.

The base band signal selecting circuit 175 is operative to classify the radio signal receiving circuit into the first group G1 under the condition that the gain control value is within the range shown by the arrow pointed out by the legend G1. The base band signal selecting circuit 175 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 175 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 175 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 175 is operative to select the radio signal receiving circuit classified into the first group from among the radio signal receiving circuits under the condition that at least two radio signal receiving circuits are classified into the first group. On the other hand, the base band signal selecting circuit 175 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 175 is operative to produce a switching signal s70 in association with the selected radio signal receiving circuit, and output the switching signal s70 to the base band signal outputting circuit 80.

The base band signal selecting circuit 175 is operative to judge whether or not the difference between the first absolute value |Vta−Va| and the second absolute value |Vtb−Vb| is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 175 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 175 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 175 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 175 is operative to have the base band signal outputting circuit 80 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 175 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 175 is operative to have the base band signal outputting circuit 80 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 175 on whether each of the first absolute value |Vta−Va| and the second absolute value |Vtb−Vb| is continuously decreased or increased based on results periodically calculated by each of the gain control value calculators 33 and 43.

The base band signal selecting circuit 175 is operative to select the base band signal the same as the base band signal outputted by the base band signal outputting circuit 80 to the exterior device in the preceding frame prior to the current frame after judging as each of the first absolute value |Vta−Va| and the second absolute value |Vtb−Vb| being decreased along the time axis.

Figure 8:
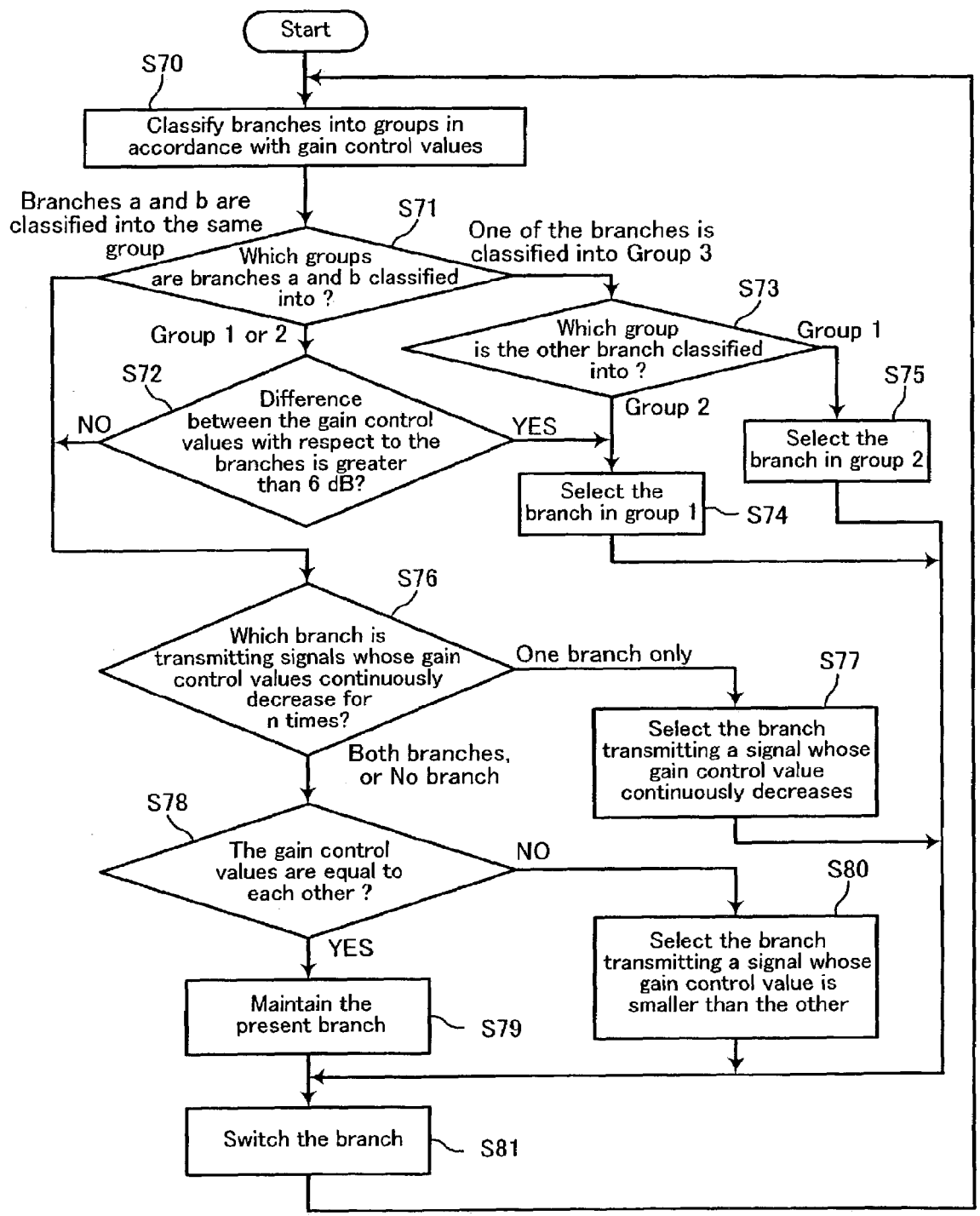
FIG. 8 is a flow chart showing a process to be performed by the fifth embodiment of the radio signal receiving apparatus according to the present invention.

The following description will now be directed to the process to be performed by the fifth embodiment of the radio signal receiving apparatus according to the present invention with reference to the flowchart shown in FIG. 8. The term "branches" is intended to indicate the radio signal receiving circuits.

The first and second radio signal receiving circuits 101 and 102 are periodically classified by the base band signal selecting circuit 175 into the groups based on the first absolute value |Vta−Va| of the difference between the predetermined signal level "Vta" and the logarithmic value "Va" in association with the signal level of the smoothened signal s31. The first and second groups are selected by the base band signal selecting circuit 175 from among the groups in the step S70.

The judgment is then made by the base band signal selecting circuit 175 on whether or not both the first and second radio signal receiving circuits 101 and 102 are classified into any one of the groups in the step S71. When the answer in the step S71 is in the affirmative "YES", i.e., both the first and second radio signal receiving circuits 101 and 102 are classified into any one of the groups, the step S71 proceeds to the step S76. When, on the other hand, the answer in the step S71 is in the negative "NO", i.e., both the first and second radio signal receiving circuits 101 and 102 are not classified into any one of the groups, the judgment is made by the base band signal selecting circuit 175 on whether or not the first and second radio signal receiving circuits 101 and 102 are separately classified into the first and second groups in the step S71. When the answer in the step S71 is in the affirmative "YES", i.e., the first and second radio signal receiving circuits 101 and 102 are separately classified into respective first and second groups, the step S71 proceeds to the step S72. When, on the other hand, the answer in the step S71 is in the negative "NO", i.e., one of the first and second radio signal receiving circuits 101 and 102 is classified into the third group, the step S71 proceeds to the step S73.

The judgment is then made by the base band signal selecting circuit 175 whether or not the difference between the first absolute value |Vta−Va| and the second absolute value |Vtb−Vb| is larger than 6 [dB] in the step S72. When the answer in the step S72 is in the affirmative "YES", i.e., the difference between the first absolute value |Vta−Va| and the second absolute value |Vtb−Vb| is larger than 6 [dB], the step S72 proceeds to the step S74. When, on the other hand, the answer in the step S72 is in the negative "NO", i.e., the difference between the first absolute value |Vta−Va| and the second absolute value |Vtb−Vb| is not larger than 6 [dB], the step S72 proceeds to the step S76.

The judgment is then made by the base band signal selecting circuit 175 whether or not one of the first and second radio signal receiving circuits 101 and 102 except for the other classified into the third group is classified into the first group in the step 73. When the answer in the step S73 is in the affirmative "YES", i.e., one of the first and second radio signal receiving circuits 101 and 102 except for the other classified into the third group is classified into the first group, the step S73 proceeds to the step S74. When, on the other hand, the answer in the step S73 is in the negative "NO", i.e., one of the first and second radio signal receiving circuits 101 and 102 except for the other classified into the third group is classified into the second group, the step S73 proceeds to the step S75.

The base band signal outputted by the radio signal receiving circuit classified into the first group selected by the base band signal selecting circuit 175 as the output signal s80 to be outputted to the exterior device in the step S74.

The base band signal outputted by the radio signal receiving circuit classified into the second group selected by the base band signal selecting circuit 175 as the output signal s80 to be outputted to the exterior device in the step S75.

The judgment is then made by the base band signal selecting circuit 175 whether or not each of the first absolute value |Vta−Va| and the second absolute value |Vtb−Vb| is decreased in the predetermined period in the step S76. When the answer in the step S76 is in the affirmative "YES", i.e., each of the first absolute value |Vta−Va| and the second absolute value |Vtb−Vb| is decreased in the predetermined period, the step S76 proceeds to the step S78. When, on the other hand, the answer in the step S76 is in the negative "NO", i.e., each of the first absolute value |Vta−Va| and the second absolute value |Vtb−Vb| is not decreased in the predetermined period, the judgment is then made by the base band signal selecting circuit 175 whether or not each of the first absolute value |Vta−Va| and the second absolute value |Vtb−Vb| is increased in the predetermined period in the step S76. When the answer in the step S76 is in the affirmative "YES", i.e., each of the first absolute value |Vta−Va| and the second absolute value |Vtb−Vb| is increased in the predetermined period, the step S76 proceeds to the step S78. When, on the other hand, the answer in the step S76 is in the negative "NO", i.e., each of the first absolute value |Vta−Va| and the second absolute value |Vtb−Vb| is not increased in the predetermined period, the step S76 proceeds to the step S80.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 175 on whether each of the first absolute value |Vta−Va| and the second absolute value |Vtb−Vb| is continuously decreased or increased based on result periodically calculated by each of the gain control value calculators 33 and 43.

The base band signal s52 outputted by the first radio signal receiving circuit 101 is selected by the base band signal selecting circuit 175 as the output signal s80 to be outputted to the exterior device under the condition that the judgment is made by the base band signal selecting circuit 175 on that the first absolute value |Vta−Va| is continuously decreased based on results periodically calculated by the gain control value calculator 33 in the step S77. The base band signal s62 outputted by the second radio signal receiving circuit 102 is, on the other hand, selected by the base band signal selecting circuit 175 as the output signal s80 to be outputted to the exterior device under the condition that the judgment is made by the base band signal selecting circuit 175 on that the second absolute value |Vtb−Vb| is continuously decreased based on results periodically calculated by the gain control value calculator 43 in the step S77.

The first absolute value |Vta−Va| of the difference between the predetermined signal level "Vta" and the logarithmic value "Va" in association with the signal level of the smoothed signal is periodically calculated by the signal level calculator 33 forming part of the first radio signal receiving circuit 101. The second absolute value |Vtb−Vb| of the difference between the predetermined signal level "Vta" and the logarithmic value "Vb" in association with the signal level of the smoothed signal s42 is periodically calculated by the signal level calculator 43 forming part of the second radio signal receiving circuit 102 in the step S78.

The judgment is then made by the base band signal selecting circuit 175 whether or not the first absolute value |Vta−Va| is equal to the second absolute value |Vta−Va|. When the first absolute value |Vta−Va| is equal to the second absolute value |Vtb−Vb|, the step S78 proceeds to the step S79. When the first absolute value |Vta−Va| is not equal to the second absolute value |Vtb−Vb|, the step S78 proceeds to the step S80.

The base band signal s52 outputted by the first radio signal receiving circuit 101 is selected by the base band signal selecting circuit 175 as the output signal s80 to be outputted to the exterior device under the condition that the base band signal s52 outputted by the first radio signal receiving circuit 101 is outputted to the exterior device in the step S79. The base band signal s62 outputted by the second radio signal receiving circuit 102 is, on the other hand, selected by the base band signal selecting circuit 175 as the output signal s80 to be outputted to the exterior device under the condition that the base band signal s62 outputted by the second radio signal receiving circuit 102 is outputted to the exterior device in the step S79.

When the first absolute value |Vta−Va| is smaller than the second absolute value |Vta−Va|, the base band signal s52 outputted by the first radio signal receiving circuit 101 is selected by the base band signal selecting circuit 175 as the output signal s80 to be outputted to the exterior device in the step S80. When the first absolute value |Vta−Va| is, on the other hand, larger than the second absolute value |Vtb−Vb|, the base band signal s62 outputted by the second radio signal receiving circuit 102 is selected by the base band signal selecting circuit 175 as the output signal s80 to be outputted to the exterior device in the step S80.

The base band signal selected by the base band signal selecting circuit 175 in any one of the steps S74, S75, S79, and S80 is outputted by the base band signal outputting circuit 80 in the step S81.

Figure 4D:
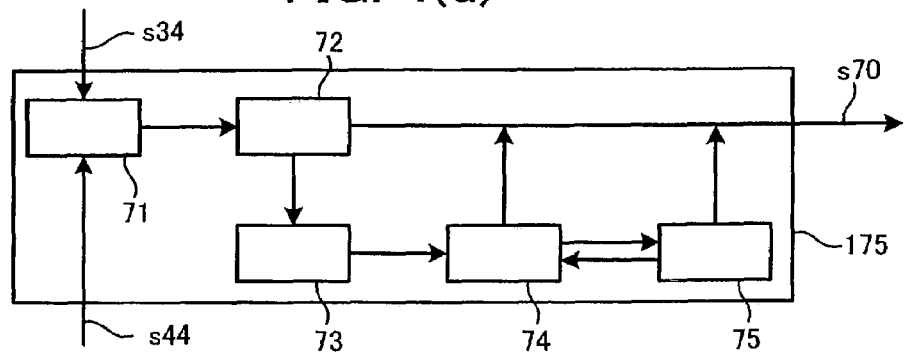

The following description will now be directed to the base band signal selecting circuit 175 forming part of the fifth embodiment of the radio signal receiving apparatus according to the present invention with reference to the drawings shown in FIG. 4(d).

The base band signal selecting circuit 175 includes: a signal level judging section 71, a candidate signal selecting section 72, a signal level difference calculating section 73, a first judging section 74, and a second judging section 75.

In the step S70, the signal level judging section 71 is operated to judge whether or not each of the gain control values calculated by the gain control calculators 33 and 43 in association with each of the base band signals is smaller than a predetermined signal level, which specifies the minimum and maximum signal level of the signal range corresponding to the first and second groups.

The base band signals include first and second base band signals respectively having first and second signal levels. The gain control values include first and second gain control values respectively indicative of the absolute value of the signal level difference between the first signal level of the first base band signal and the predetermined target signal level and the absolute value of the signal level difference between the second signal level of the second base band signals and the predetermined target signal level. It is hereinlater assumed that the first gain control value is smaller than the gain control value in association with each of the base band signals, and the second gain control value in association with the second base band signal is smaller than the gain control value in association with each of the base band signals except for the first base band signal at a time point when the candidate signal selecting section 72 selects them. The first and second gain control values are varied in response to a time axis, and respectively having first and second fluctuations. The first and second gain control values respectively in association with the first and second base band signals.

In the step S70, the candidate signal selecting section 72 is operated to select the first and second base band signals from among the base band signals produced by two or more base band signal producing circuits after selecting and deciding that the first gain control value is smaller than the gain control value in association with each of the base band signals, and the second gain control value in association with the second base band signal is smaller than the gain control value in association with each of the base band signals except for the first base band signal.

The gain control value difference calculating section 73 is operated to calculate a gain control value difference between the first gain control value in association with the first base band signal selected by the candidate signal selecting section 72 and the second gain control value in association with the second base band signal selected by the candidate signal selecting section 72 in the step S72. The first judging section 74 is then operated to judge whether or not the gain control value difference between the first gain control value and the second gain control value calculated by the gain control value difference calculating section 73 is larger than a predetermined threshold value, i.e., 6 dB in the step S72.

In the step S76, the second judging section 75 is operated to judge whether or not the fluctuation of the first gain control value in association with the first base band signal is larger than the fluctuation of the second gain control value in association with the second base band signal. This means that the second judging section 75 is operated to judge whether or not the fluctuation of the first gain control value in association with the first base band signal is larger than the fluctuation of the second gain control value in association with the second base band signal after judging the fluctuation of the first gain control values periodically calculated by the gain control calculator in association with the first base band signal and the fluctuation of the second gain control values periodically calculated by the gain control calculator in association with the second base band signal at predetermined time intervals for a predetermined time period.

The base band signal selecting circuit 175 is operated to select the first base band signal from among the base band signals produced by the base band signal producing circuits when the judgment is made by the first judging section 74 as the gain control value difference between the first gain control value and the second gain control value calculated by the gain control value difference calculating section 73 being larger than a predetermined threshold value in the step S72.

The base band signal selecting circuit 175 is operated to select one of the first and second base band signals from among the base band signals produced by the base band signal producing circuits based on results judged by the second judging section 75 in step S76 when the judgment is made by the first judging section 74 as the gain control value difference between the first gain control value and the second gain control value calculated by the gain control value difference calculating section 73 being equal to or smaller than a predetermined threshold value in the step S72.

From the above detail description, it will be understood that the radio signal receiving apparatus according to the fifth embodiment of the present invention selectively receive radio signals each including a base band signal component through the antennas, produce a plurality of base band signals each indicative of the base band signal component, and output one base band signal highest in quality from among the base band signals wherein the selected base band signal does not monotonously decrease, thereby ensuring reliable communications between a far-end speaker and a near-end speaker.

The constitution of the sixth embodiment of the radio signal receiving apparatus 200 according to the present invention will be described hereinafter with reference to FIGS. 9, 10, and 11.

Figure 9:
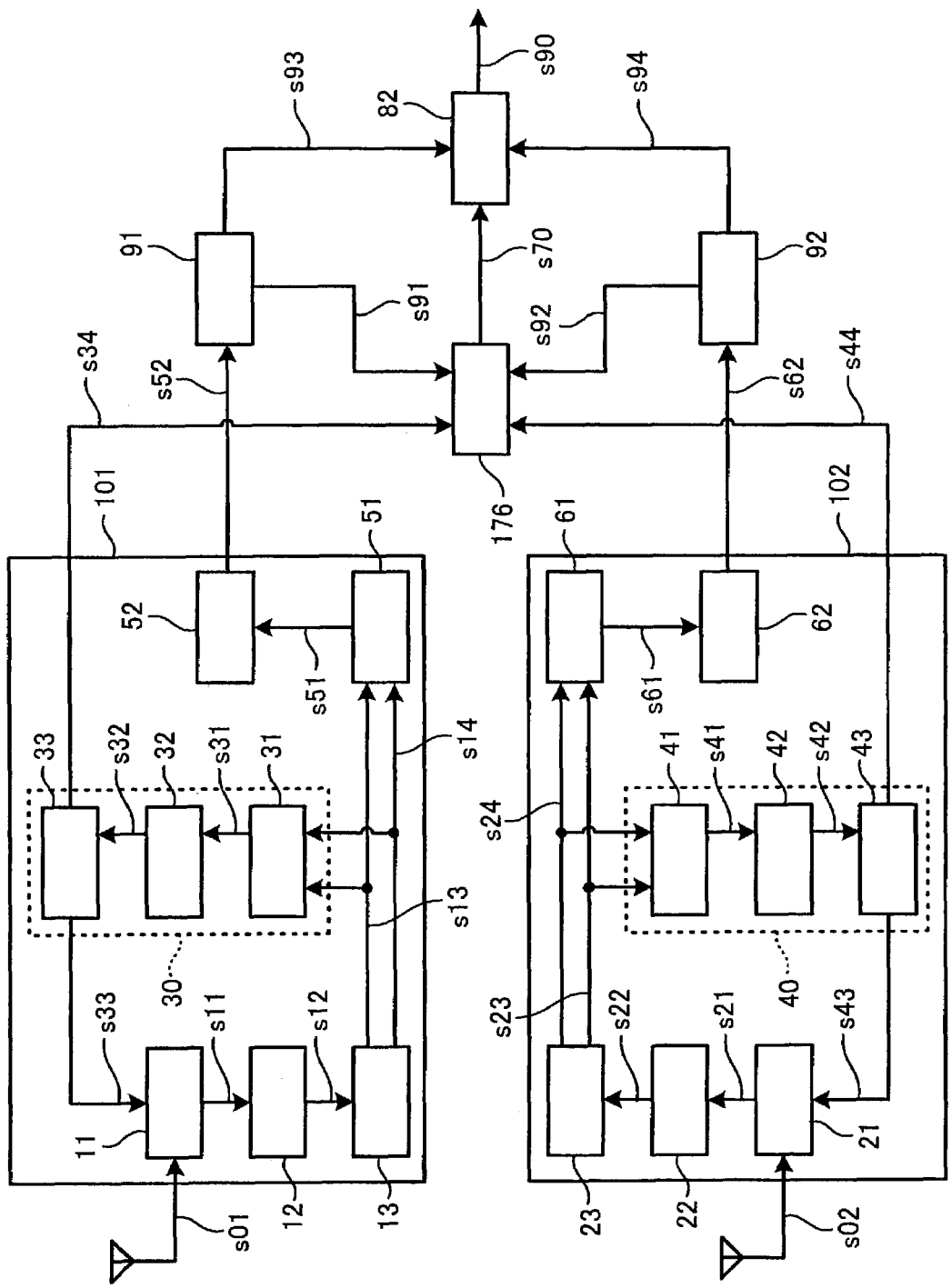
FIG. 9 is a block diagram of a sixth embodiment of the radio signal receiving apparatus according to the present invention.

The radio signal receiving apparatus 200 is shown in FIG. 9 as comprising first and second radio signal receiving circuits 101 and 102, first and second error detecting circuits 91 and 92, a base band signal selecting circuit 176, and an base band signal outputting circuit 82. Each of the first and second radio signal receiving circuits 101 and 102 is adapted to receive a radio signal having base band signal components from an antenna. Each of the first and second error detecting circuits 91 and 92 is adapted to detect and correct an error in one of the base band signals produced in the radio signal receiving circuits 101 and 102. The base band signal selecting circuit 176 is adapted to periodically select one of base band signals from among a plurality of base band signals produced in the radio signal receiving circuits 101 and 102 after judging whether or not the error is detected in the base band signal by the first and second error detecting circuits 91 and 92. The base band signal outputting circuit 82 is adapted to output the base band signal periodically selected by the base band signal selecting circuit 176.

The first and second error detecting circuits 91 and 92 collectively constitute the error detecting means and the error rate calculating means according to the present invention. The base band signal selecting circuit 176 constitutes the base band signal selecting means according to the present invention. The base band signal outputting circuit 82 constitutes the base band signal outputting means according to the present invention. In the following description, it is assumed that the base band signal selecting circuit 176 is adapted to receive the control signals s34 and s44 in association with the gains, and the signal levels of the smoothed signals s32 and s42 from the first and second radio signal receiving circuits 101 and 102.

The constitutional elements and the steps of the sixth embodiments of the radio signal receiving apparatus 200 entirely the same as those of the first embodiment of the radio signal receiving apparatus 100 will not be described but bear the same reference numerals and legends as those of the first embodiment of the radio signal receiving apparatus 100 in FIG. 1 to avoid tedious repetition. The first error detecting circuit 91 includes all the constructions and functions common to the second error detecting circuit 92. The description of the second error detecting circuit 92 will be thus omitted from the following description.

The first error detecting circuit 91 is adapted to receive the synchronized base band signal s52 outputted from the first radio signal receiving circuit 101, calculate an error rate of the synchronized base band signal s52 after judging whether or not the error is detected in the synchronized base band signal s52, produce an error rate signal s91 indicative of the error rate, and output the error rate signal s91 to the band signal selecting circuit 176.

Furthermore, the first error detecting circuit 91 is operative to correct the synchronized base band signal s52 in response to the error rate. The first error detecting circuit 91 is adapted to detect, calculate and correct the error in the base band signal in accordance with the error detecting and correcting method such as for example CRC check, Error Detecting/Correcting Code, or the like. The first error detecting circuit 91 is operative to output the corrected base band signal s90 to the base band signal outputting circuit 82.

The base band signal selecting circuit 176 is operative to receive the error rate signals s91 and s92 respectively produced and outputted by the first and second error detecting circuits 91 and 92, and judge whether or not errors are detected in the synchronized base band signals s52 and s62 by the first and second error detecting circuits 91 and 92. The base band signal selecting circuit 176 is operative to select one of the synchronized base band signals s52 and s62 from among the synchronized base band signals s52 and s62 under the condition that the errors are not detected in the synchronized base band signals s52 and s62 by the first and second detecting circuits 91 and 92. The base band signal selecting circuit 176 is operative to select one of the synchronized base band signals s52 and s62 from among the synchronized base band signals s52 and s62 under the condition that the error is not detected in the one of the synchronized base band signals s52 and s62, and the error is detected in the other one of the synchronized base band signals s52 and s62. One of the first and second error detecting circuit 91 and 92, for example, the first error detecting circuit 91 detects an error in the synchronized base band signal s52, and the other of the first and second error detecting circuit 91 and 92, i.e., the second error detecting circuit 92 does not detect an error in the synchronized base band signal s62, the base band signal selecting circuit 176 is operative to select the synchronized base band signal s62, output a switching signal s70 in association with the selected radio signal receiving circuit, i.e., the second radio signal receiving circuit 102.

The base band signal selecting circuit 176 is operative to receive the control signal s33 and the gain information signal s34 from the gain control value calculator 33 forming part of the first radio signal receiving circuit 101, and the control signal s43 the gain information signal s44 from the gain control value calculator 43 forming part of the second radio signal receiving circuit 102. The base band signal selecting circuit 176 has a storage section, not shown, having signal level range information storage therein. The signal level range information shows relationship between signal level values or gain control values with signal ranges respectively associated with groups. Preferably, the base band signal selecting circuit 176 may have an operator input the signal level range information therein.

The base band signal selecting circuit 176 is operative to classify the first and second radio signal receiving circuits 101 and 102 into groups in association with the signal level of the radio signal to be amplified by the radio signal amplifier 11. The groups include at least two different groups consisting of first and second groups. The base band signal selecting circuit 176 is operative to select one of the first and second radio signal receiving circuits 101 and 102 classified into the first group from among the first and second radio signal receiving circuits 101 and 102 under the condition that both of the first and second radio signal receiving circuits 101 and 102 are classified in the first group. The base band signal selecting circuit 176 is operative to select one of the first and second radio signal receiving circuits 101 and 102 classified into the first group from among the first and second radio signal receiving circuits 101 and 102 under the condition that one of the first and second radio signal receiving circuits 101 and 102 is classified in the first group, and the other of the first and second radio signal receiving circuits 101 and 102 is classified in the second group. The base band signal selecting circuit 176 is operative to select one of the first and second radio signal receiving circuits 101 and 102 classified into the second group from among the first and second radio signal receiving circuits 101 and 102 under the condition that none of the first and second radio signal receiving circuits 101 and 102 is classified in the first group, but both of the first and second radio signal receiving circuits 101 and 102 are classified in the second group. The base band signal selecting circuit 176 is operative to produce a switching signal s70 in association with the selected radio signal receiving circuit, and output the switching signal s70 to the base band signal outputting circuit 82.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal.

The base band signal selecting circuit 176 is operative to classify the radio signal receiving circuit into the first group G1 under the condition that the gain control value is within the range shown by the arrow pointed out by the legend G1. The base band signal selecting circuit 176 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 176 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 176 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 176 is operative to select the radio signal receiving circuit classified into the first group from among the radio signal receiving circuits under the condition that at least two radio signal receiving circuits are classified into the first group. On the other hand, the base band signal selecting circuit 176 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 176 is operative to produce a switching signal s70 in association with the selected radio signal receiving circuit, and output the switching signal s70 to the base band signal outputting circuit 82.

The base band signal selecting circuit 176 is operative to judge whether or not the difference between the first absolute value |Vta−Va| and the second absolute value |Vtb−Vb| is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 176 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 176 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 176 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 176 is operative to have the base band signal outputting circuit 82 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 176 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 176 is operative to have the base band signal outputting circuit 82 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 176 on whether each of the first absolute value |Vta−Va| and the second absolute value |Vtb−Vb| is continuously decreased or increased based on results periodically calculated by each of the gain control value calculators 33 and 43.

The base band signal selecting circuit 176 is operative to select the base band signal the same as the base band signal outputted by the base band signal outputting circuit 82 to the exterior device in the preceding frame prior to the current frame after judging as each of the first absolute value |Vta−Va| and the second absolute value |Vtb−Vb| being decreased along the time axis.

The base band signal outputting circuit 82 is operative to receive the switching signal s70 from the base band signal selecting circuit 176, the corrected base band signals s93 and s94 from the first and second error detecting circuits 891 and 892, and output the corrected base band signal s93 or s94 selected by the base band signal selecting circuit 176 to the exterior device.

Figure 11:
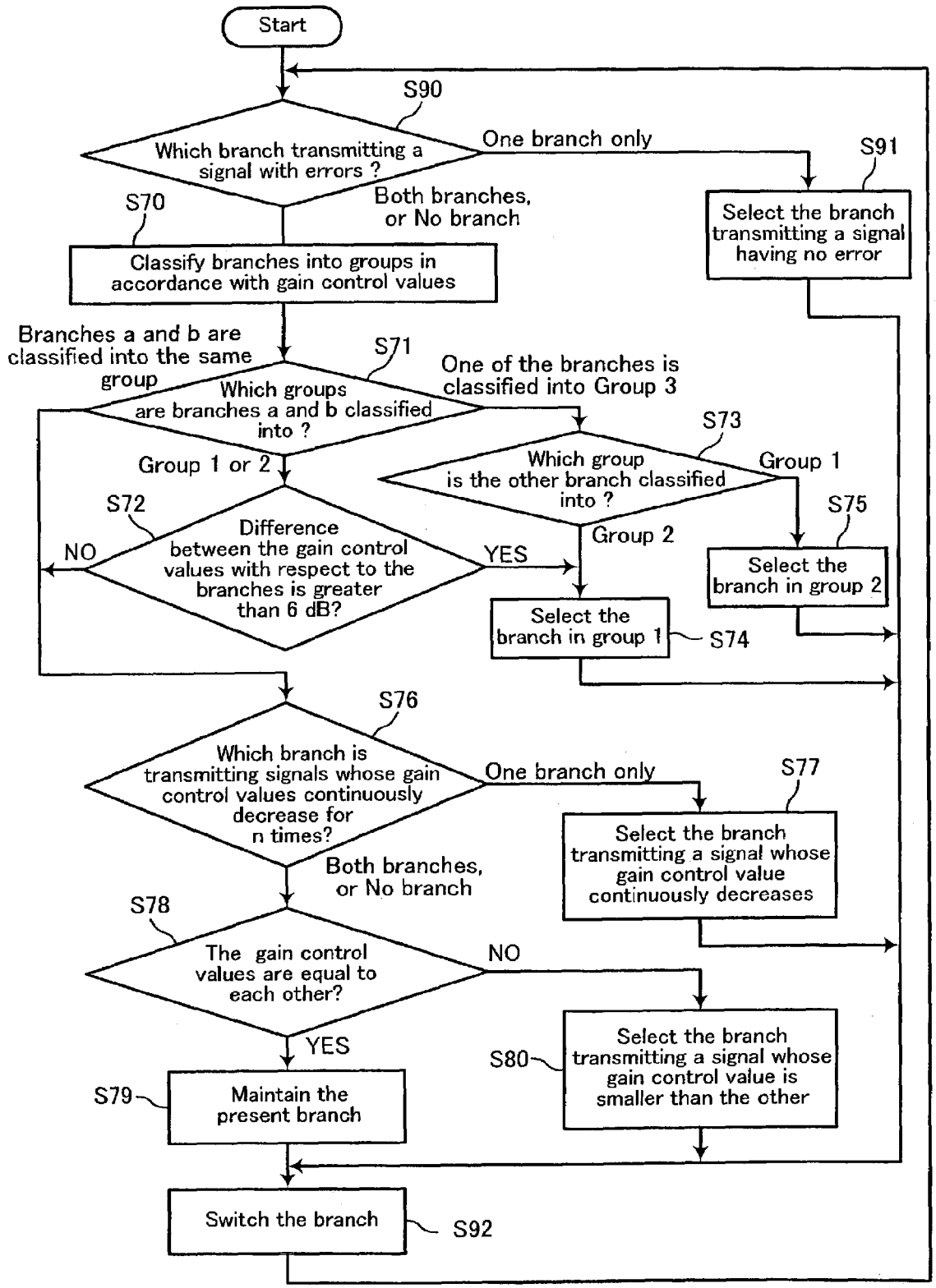
FIG. 11 is a flow chart showing a process to be performed by the sixth embodiment of the radio signal receiving apparatus according to the present invention.

The following description will now be directed to the process to be performed by the sixth embodiment of the radio signal receiving apparatus 200 according to the present invention with reference to the flowchart shown in FIG. 11. The term "branches" are intended to indicate the radio signal receiving circuits.

The steps of the sixth embodiment of the radio signal receiving apparatus 200 different from those of the fifth embodiment of the radio signal receiving apparatus will now be described in detail hereinafter. The steps of the sixth embodiment of the radio signal receiving apparatus 200 entirely the same as those of the fifth embodiment of the radio signal receiving apparatus will not be described but bear the same reference numerals and legends as those of the fifth embodiment of the radio signal receiving apparatus shown in FIG. 8 to avoid tedious repetition.

The error rate signal s91 outputted by the error detecting circuit 91 and the error rate signal s92 outputted by the error detecting circuit 92 are firstly received by the base band signal selecting circuit 176. It is judged by the base band signal selecting circuit 176 whether or not an error is detected in each of the base band signals s52 and s62 in response to the error rate signal s91 received from the error detecting circuit 91 and the error rate signal s92 received from the error detecting circuit 92 in the step S90.

The judgment is then made by the base band signal selecting circuit 176 whether or not the error is detected in each of the base band signals s52 and s62 based on each of the error rate signal s91 received from the error detecting circuit 91 and the error rate signal s92 received from the error detecting circuit 92 in the step S90. When the answer in the step S90 is in the affirmative "YES", i.e., the error is detected in each of the base band signals s52 and s62, the step S90 proceeds to the step S70. When, on the other hand, the answer in the step S90 is in the negative "NO" i.e., the error is not detected in either of the base band signals s52 and s62, the step S90 proceeds to the step S70. When the error is detected on only one of the base band signals s52 and s62 in the step S90, the step S90 proceeds to the step S91. In the step S91, the error is detected only in the base band signal s52, and the error is not detected in the base band signal s62, the second radio signal receiving circuit 102 is selected. In the step S91, the error is detected only in the base band signal s62, and the error is not detected in the base band signal s52, the first radio signal receiving circuit 101 is selected.

In the step S91, the first radio signal receiving circuit 101 is selected by the base band signal selecting circuit 176 under the condition that the error is not detected in the base band signals s52, the error being detected in the base band signals s62 in the step S90. In the step S91, the second radio signal receiving circuit 102 is selected by the base band signal selecting circuit 176 under the condition that the error is detected in the base band signals s52, the error being not detected in the base band signals s62 in the step S90. The base band signal selected by the base band signal selecting circuit 176 in the step S91, the step S74, the step S75, the step S77, the step S79, and the step S80 is outputted to the exterior device as an output signal s80 in the step S114.

Figure 10:
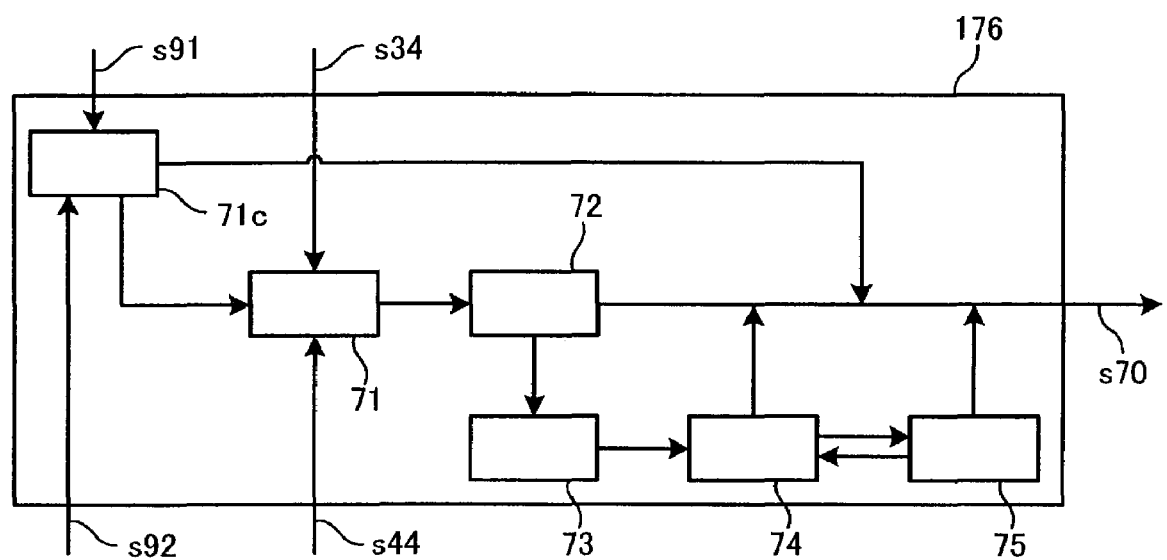
FIG. 10 is a block diagram showing a base band signal selecting circuit forming part of the sixth embodiment of the radio signal receiving apparatus according to the present invention.

The following description will now be directed to the base band signal selecting circuit 176 forming part of the sixth embodiment of the radio signal receiving apparatus 200 according to the present invention with reference to the drawings shown in FIG. 10.

The base band signal selecting circuit 176 includes: an error signal judging section 71c, a signal level judging section 71, a candidate signal selecting section 72, a signal level difference calculating section 73, a first judging section 74, and a second judging section 75. The signal level judging section 71, the candidate signal selecting section 72, the signal level difference calculating section 73, the first judging section 74, and the second judging section 75 have been already described in the previous embodiments. The description of the signal level judging section 71, the candidate signal selecting section 72, the signal level difference calculating section 73, the first judging section 74, and the second judging section 75 will be thus omitted to avoid tedious repetition.

The error signal judging section 71c is adapted to judge whether or not the error is detected by the error detecting circuits 91 and 92 in each of the base band signals produced by the base band signal producing circuits 51 and 61.

In the step S70, the error signal judging section 71c is operated to judge whether or not the error is detected by the error detecting circuits 91 and 92 in each of the base band signals produced by the base band signal producing circuits 51 and 61. The base band signal selecting circuit 176 is operative to select one of the base band signals from among the base band signals produced by the base band signal producing circuits 51 and 61 based on results judged by the error signal judging section 71c in the step S71.

From the above detail description, it will be understood that the radio signal receiving apparatus according to the sixth embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having low error rates, thereby ensuring reliable communications between a far-end speaker and a near-end speaker.

The seventh embodiment of the radio signal receiving apparatus will be described with reference to the drawings shown in FIGS. 9, 12, and 13.

The constitutional elements of the seventh embodiments of the radio signal receiving apparatus are the same as those of the sixth embodiment of the radio signal receiving apparatus 200, however, the operation of the base band signal selecting circuit 177 forming part the seventh embodiment of the radio signal receiving apparatus according to the present invention is different from the operation of the base band signal selecting circuit 177 forming part of the sixth embodiment of the radio signal receiving apparatus 200 according to the present invention.

Therefore, only the constitutional elements and steps of the seventh embodiment of the radio signal receiving apparatus different from those of the sixth embodiment of the radio signal receiving apparatus 200 will be described hereinlater. The constitutional elements and the steps of the seventh embodiment of the radio signal receiving apparatus entirely the same as those of the sixth embodiment of the radio signal receiving apparatus 200 will not be described but bear the same reference numerals and legends as those of the sixth embodiment of the radio signal receiving apparatus 200 as shown in FIG. 9.

The base band signal selecting circuit 177 is operative to receive the control signals s34 and s44 in association with the gains, and the signal levels of the smoothed signals s32 and s42 from the first and second radio signal receiving circuits 101, 102. The base band signal selecting circuit 177 is operative to classify the first and second radio signal receiving circuits 101 and 102 into error-rate groups in association with the error rates indicated by the error rate signals s91 and s92 outputted by the first and second error detecting circuits 91 and 92. The error-rate groups include at least three different error-rate groups consisting of first to third error-rate groups in association with the error rates indicated by the error rate signals s91 and s92.

The base band signal selecting circuit 177 is operative to judge whether or not errors are detected in the synchronized base band signals s52 and s62 with reference to the error rate signals s91 outputted from the first error detecting circuit 91 and s92 outputted from the second error detecting circuit 92. If the base band signal selecting circuit 177 judges that no error is detected in the synchronized base band signal, for example, the synchronized base band signal s52, the base band signal selecting circuit 177 is operative to classify the first radio signal receiving circuit 101 outputting the synchronized base band signal s52 into the first error-rate group. If, on the other hand, the base band signal selecting circuit 177 judges that an error is detected in the synchronized base band signal, for example, the synchronized base band signal s62, the base band signal selecting circuit 177 is operative to judge whether or not the error rate of the synchronized base band signal s62 calculated by the second error detecting circuit 92 is greater than a predetermined threshold or not. If it is judged that the error rate of the synchronized base band signal s62 calculated by the second error detecting circuit 92 is not greater than the predetermined threshold value, the base band signal selecting circuit 177 is operative to classify the second radio signal receiving circuit 102 outputting the synchronized base band signal s62 into the second error-rate group. If it is judged that the error rate of the synchronized base band signal s62 calculated by the second error detecting circuit 92 is greater than the predetermined threshold value, the base band signal selecting circuit 177 is operative to classify the second radio signal receiving circuit 102 outputting the synchronized base band signal s62 into the third error-rate group.

The base band signal to be outputted by the radio signal receiving circuit classified into the first error-rate group is more significant than the base band signal to be outputted by the radio signal receiving circuit classified into the second error-rate group, i.e., the first error-rate group takes priority over the second error-rate group when one of the base band signal is selected from among the base band signals respectively outputted by the radio signal receiving circuits. The base band signal to be outputted by the radio signal receiving circuit classified into the second error-rate group is more significant than the base band signal to be outputted by the radio signal receiving circuit classified into the third error-rate group, i.e., the second error-rate group takes priority over the third error-rate group when one of the base band signals is selected from among the base band signals respectively outputted by the radio signal receiving circuits. The first and second error-rate groups hereinlater will be referred to as "first error-free group" and "second error-free group", respectively.

The base band signal selecting circuit 177 is operative to select one of the first and second radio signal receiving circuits 101 and 102 classified into the first error-free group from among the first and second radio signal receiving circuits 101 and 102 under the condition that the one of the first and second radio signal receiving circuits 101 and 102 is classified into the first error-free group and the other one of the first and second radio signal receiving circuits 101 and 102 is classified into the second error-free group. The base band signal selecting circuit 177 is operative to produce a switching signal s70 in association with the selected radio signal receiving circuit, and output the switching signal s70 to the base band signal outputting circuit 82.

Furthermore, the base band signal selecting circuit 177 is operative to select one of the first and second radio signal receiving circuits 101 and 102 classified into the second error-free group from among the first and second radio signal receiving circuits 101 and 102 under the condition that the one of the first and second radio signal receiving circuits 101 and 102 is classified into the second error-free group and the other one of the first and second radio signal receiving circuits 101 and 102 is classified into the second error-free group. The base band signal selecting circuit 177 is operative to produce a switching signal s70 in association with the selected radio signal receiving circuit, and output the switching signal s70 to the base band signal outputting circuit 82. The base band signal selecting circuit 177, on the other hand, is operative to select one of the first and second radio signal receiving circuits 101 and 102 classified into the first error-free group from among the first and second radio signal receiving circuits 101 and 102 under the condition that both the first and second radio signal receiving circuits 101 and 102 are classified into the first error-free group.

The base band signal selecting circuit 177 is operative to classify the first and second radio signal receiving circuits 101 and 102 into groups in response to the control signals s33 and s43 in association with the gain or gain information signal s34, s44 in association with the signal level and select one radio signal receiving circuit in a manner as described in the above under the condition that both the first and second radio signal receiving circuits 101 and 102 are classified into the same error-free group or that no error is detected in the base band signals s52 and s62 transmitted from the first and second radio signal receiving circuits 101 and 102. The base band signal selecting circuit 177 is operative to produce a switching signal s70 in association with the selected radio signal receiving circuit, and output the switching signal s70 to the base band signal outputting circuit 82.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal.

The base band signal selecting circuit 177 is operative to classify the radio signal receiving circuit into the first group G1 under the condition that the gain control value is within the range shown by the arrow pointed out by the legend G1. The base band signal selecting circuit 177 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 177 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 177 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 177 is operative to select the radio signal receiving circuit classified into the first group from among the radio signal receiving circuits under the condition that at least two radio signal receiving circuits are classified into the first group. On the other hand, the base band signal selecting circuit 177 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 177 is operative to produce a switching signal s70 in association with the selected radio signal receiving circuit, and output the switching signal s70 to the base band signal outputting circuit 82.

The base band signal selecting circuit 177 is operative to judge whether or not the difference between the first absolute value $|Vta-Va|$ and the second absolute value $|Vtb-Vb|$ is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 177 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 177 is operative to judge whether one of the first absolute value $|Vta-Va|$ of the gain information signal s34 and the second absolute value $|Vtb-Vb|$ of the gain information signal s44 is continuously decreased along the time axis, and the other of the first absolute value $|Vta-Va|$ of the gain information signal s34 and the second absolute value $|Vtb-Vb|$ of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 177 is operative to select the first radio signal receiving circuit 101 from the first and second radio signal receiving circuit 102 under the condition that the first absolute value $|Vta-Va|$ is continuously decreased along the time axis, and the second absolute value $|Vtb-Vb|$ is not continuously decreased along the time axis. The base band signal selecting circuit 177 is operative to have the base band signal outputting circuit 82 output the base band signal outputted by the first radio signal receiving circuit 101 under the condition that the first absolute value $|Vta-Va|$ is continuously decreased along the time axis, and the second absolute value $|Vtb-Vb|$ is not continuously decreased along the time axis.

On the other hand, the base band signal selecting circuit 177 is operative to select the second radio signal receiving circuit 102 from the first and second radio signal receiving circuit 102 under the condition that the first absolute value $|Vta-Va|$ is not continuously decreased along the time axis, and the second absolute value $|Vtb-Vb|$ is continuously decreased along the time axis. The base band signal selecting circuit 177 is operative to have the base band signal outputting circuit 82 output the base band signal outputted by the second radio signal receiving circuit 102 under the condition that the first absolute value $|Vta-Va|$ is not continuously decreased along the time axis, and the second absolute value $|Vtb-Vb|$ is continuously decreased along the time axis.

Here, each of the first absolute value $|Vta-Va|$ and the second absolute value $|Vtb-Vb|$ is periodically calculated by each of the gain control value calculators 33 and 43 along a time axis for n times before the judgment is made by the base band signal selecting circuit 177 on whether each of the first absolute value $|Vta-Va|$ and the second absolute value $|Vtb-$ Vb| is continuously decreased or increased based on results periodically calculated by each of the gain control value calculators 33 and 43.

The base band signal selecting circuit 177 is operative to select the base band signal the same as the base band signal outputted by the base band signal outputting circuit 82 to the exterior device in the preceding frame prior to the current frame after judging as both of the first absolute value |Vta−Va| and the second absolute value |Vtb−Vb| being decreased or increased along the time axis.

Figure 13:
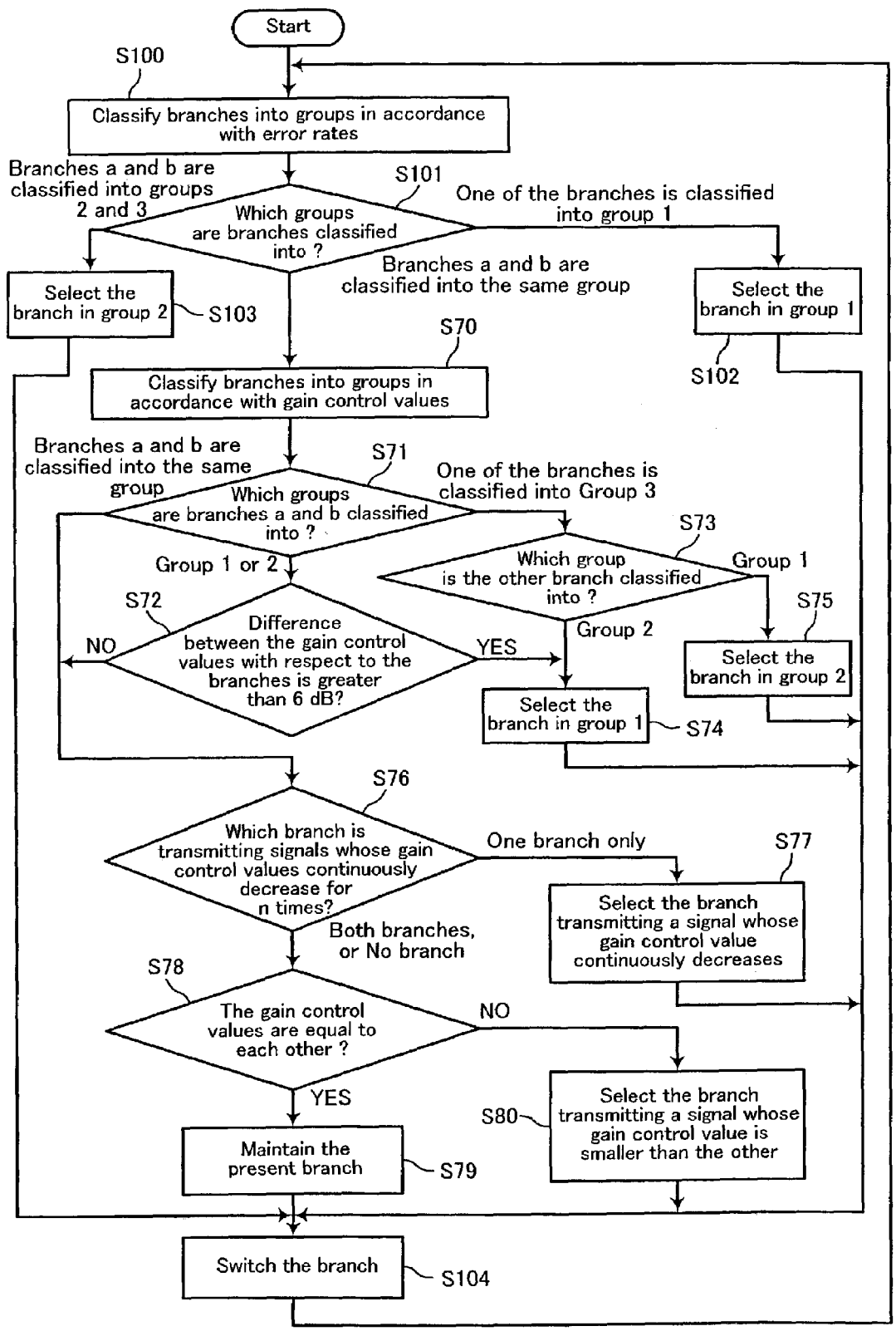
FIG. 13 is a flow chart showing a process to be performed by the seventh embodiment of the radio signal receiving apparatus according to the present invention.

The following description will now be directed to the process to be performed by the seventh embodiment of the radio signal receiving apparatus according to the present invention with reference to the flowchart shown in FIG. 13. The term "branches" is intended to indicate the radio signal receiving circuits.

The steps of the seventh embodiment of the radio signal receiving apparatus different from those of the fifth embodiment of the radio signal receiving apparatus will now be described in detail hereinafter. The steps of the seventh embodiment of the radio signal receiving apparatus entirely the same as those of the fifth embodiment of the radio signal receiving apparatus will not be described but bear the same reference numerals and legends as those of the fifth embodiment of the radio signal receiving apparatus shown in FIG. 8 to avoid tedious repetition.

The error rate signal s91 outputted by the error detecting circuit 91 and the error rate signal s92 outputted by the error detecting circuit 92 are firstly received by the base band signal selecting circuit 177. Each of the first and second radio signal receiving circuits 101 and 102 is classified by the base band signal selecting circuit 177 into the error-rate groups in response to the error rate signal s91 received from the error detecting circuit 91 and the error rate signal s92 received from the error detecting circuit 92 in the step S100.

The judgment is then made by the base band signal selecting circuit 177 on whether or not both the first and second radio signal receiving circuits 101 and 102 are classified into the same error-rate group in the step S101. When the answer in the step S101 is in the affirmative "YES", i.e., both the first and second radio signal receiving circuits 101 and 102 are classified into the same error-rate group, the step S101 proceeds to the step S70.

When, on the other hand, the answer in the step S101 is in the negative "NO", i.e., both the first and second radio signal receiving circuits 101 and 102 are not classified into the same error-rate group, the judgment is made by the base band signal selecting circuit 177 on whether or not the first and second radio signal receiving circuits 101 and 102 are separately classified into the second and third error-rate groups in the step S101. When the answer in the step S101 is in the affirmative "YES", i.e., the first and second radio signal receiving circuits 101 and 102 are separately classified into the second and third error-rate groups, the step S101 proceeds to the step S103. When, on the other hand, the answer in the step S101 is in the negative "NO", i.e., one of the first and second radio signal receiving circuits 101 and 102 is classified into the first and second error-rate groups, the step S101 proceeds to the step S102.

The first radio signal receiving circuit 101 is then selected by the base band signal selecting circuit 177 under the condition that the first radio signal receiving circuit 101 is classified into the first error-rate group by the base band signal selecting circuit 177 in the step S101. On the other hand, the second radio signal receiving circuit 102 is then selected by the base band signal selecting circuit 177 under the condition that the second radio signal receiving circuit 102 is classified into the first group by the base band signal selecting circuit 177 in the step S102.

The first radio signal receiving circuit 101 is then selected by the base band signal selecting circuit 177 under the condition that the first radio signal receiving circuit 101 is classified into the second group by the base band signal selecting circuit 177, the second radio signal receiving circuit 102 being classified into the third group by the base band signal selecting circuit 177 in the step S103. On the other hand, the second radio signal receiving circuit 102 is then selected by the base band signal selecting circuit 177 under the condition that the first radio signal receiving circuit 101 is classified into the third group by the base band signal selecting circuit 177, the second radio signal receiving circuit 102 being classified into the second group by the base band signal selecting circuit 177 in the step S103.

Alternatively, the base band signal selecting circuit 177 may calculate an error rate difference between the error rate of the base band signal s52 indicated by the error rate signal s91 and the error rate of the base band signal s62 indicated by the error rate signal s92, and judge whether or not the error rate difference he error rate of the base band signal s52 indicated by the error rate signal s91 and the error rate of the base band signal s62 indicated by the error rate signal s92 is larger than a predetermined error rate threshold value in the step S101. When it is judged that the error rate difference between the error rate of the base band signal s52 indicated by the error rate signal s91 and the error rate of the base band signal s62 indicated by the error rate signal s92 is larger than a predetermined error rate threshold value, one the base band signals s52 and s62, whichever the error rate is smaller, is selected by the base band signal selecting circuit 177. When it is, on the other hand, judged that the error rate difference between the first error rate of the first base band signal and the second error rate of the second base band signal is equal to or smaller than the predetermined error rate threshold value, the step S101 goes forward to the step S70, in which the base band signal selecting circuit 177 is operated to select one of the first and second base band signal from among the base band signals produced by the base band signal producing circuits 51 and 61 in response to the gain control values calculated by the gain control value calculators 33 and 43.

The base band signal selected by the base band signal selecting circuit 177 in the step S102, the step S103, the step S74, the step S75, the step S77, the step S79, and the step S80 is outputted to the exterior device as an output signal s80 in the step S104.

Figure 12:
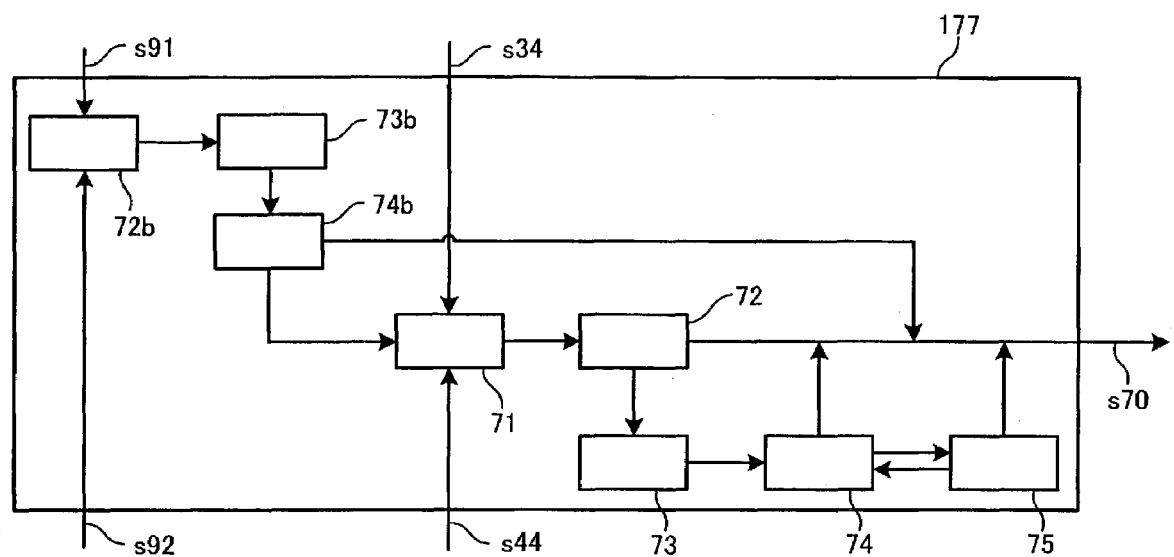
FIG. 12 is a block diagram showing a base band signal selecting circuit forming part of a seventh embodiment of the radio signal receiving apparatus according to the present invention.

The following description will now be directed to the base band signal selecting circuit 177 forming part of the seventh embodiment of the radio signal receiving apparatus according to the present invention with reference to the drawings shown in FIG. 12.

The base band signal selecting circuit 177 includes: a candidate signal selecting section 72b, an error rate difference calculating section 73b, an error rate difference judging section 74b, a signal level judging section 71, a candidate signal selecting section 72, a signal level difference calculating section 73, a first judging section 74, and a second judging section 75. The signal level judging section 71, the candidate signal selecting section 72, the signal level difference calculating section 73, the first judging section 74, and the second judging section 75 have been already described in the previous embodiments. The description of the error signal judging section 71c, the signal level judging section 71, the candidate. signal selecting section 72, the signal level difference calculating section 73, the first judging section 74, and the second judging section 75 will be thus omitted to avoid tedious repetition.

The error rate detecting circuits 91 and 92 is operative to calculate an error rate of each of the base band signals after judging whether or not an error is detected in each of the base band signals. The base band signals including first and second base band signals respectively having first and second signal levels and first and second error rates.

The candidate signal selecting section 72b is adapted to select the first and second base band signals from among the base band signals produced by two or more base band signal producing circuits after deciding that the first error rate of the first base band signal is less than the error rate of each of the base band signals, and the second error rate of the second base band signal is less than the error rate of each of the base band signals except for the first base band signal. The candidate signal selecting section 72b is operated to select the first and second base band signals from among the base band signals produced by two or more base band signal producing circuits after deciding that the first error rate of the first base band signal is less than the error rate of each of the base band signals, and the second error rate of the second base band signal is less than the error rate of each of the base band signals except for the first base band signal in the step S100.

The error rate difference calculating section 73b is adapted to calculate an error rate difference between the first error rate of the first base band signal selected by the candidate signal selecting unit 72b and the second error rate of the second base band signal selected by the candidate signal selecting unit 72b. The error rate difference calculating section 73b is operated to calculate an error rate difference between the first error rate of the first base band signal and the second error rate of the second base band signal in the step S101.

The error rate difference judging section 74b is adapted to judge whether or not the error rate difference between the first error rate of the first base band signal and the second error rate of the second base band signal calculated by the error rate difference calculating section 73b is larger than a predetermined error rate threshold value. In the step S101, the base band signal selecting circuit 177 may judge whether or not whether or not the error rate difference between the first error rate of the first base band signal and the second error rate of the second base band signal calculated by the error rate difference calculating section 73b is larger than a predetermined error rate threshold value. This means that the error rate difference judging section 74b is operated to judge whether or not the error rate difference between the first error rate of the first base band signal and the second error rate of the second base band signal calculated by the error rate difference calculating section 73b is larger than a predetermined error rate threshold value in the step S101.

The base band signal selecting circuit 177 is operated to select the first base band signal from among the base band signals produced by the base band signal producing circuits in the step S102 or S103 when the judgment is made by the error rate difference judging section 74b as the error rate difference between the first error rate of the first base band signal and the second error rate of the second base band signal calculated by the error rate difference calculating section 73b being larger than a predetermined error rate threshold value in the step S101.

The base band signal selecting circuit 177 is operated to select one of the first and second base band signal from among the base band signals produced by the base band signal producing circuits 51 and 61 in response to the gain control values calculated by the gain control value calculator 33 in the step S70 when the judgment is made by the error rate difference judging section 74b as the error rate difference between the first error rate of the first base band signal and the second error rate of the second base band signal calculated by the error rate difference calculating section 73b being equal to or smaller than the predetermined error rate threshold value in the step S101.

From the above detail description, it will be understood that the radio signal receiving apparatus according to the seventh embodiment of the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having low error rates, thereby ensuring reliable communications between a far-end speaker and a near-end speaker.

The constitution of the eighth embodiment of the radio signal receiving apparatus 400 according to the present invention will firstly be described hereinafter with reference to FIG. 14.

Figure 14:
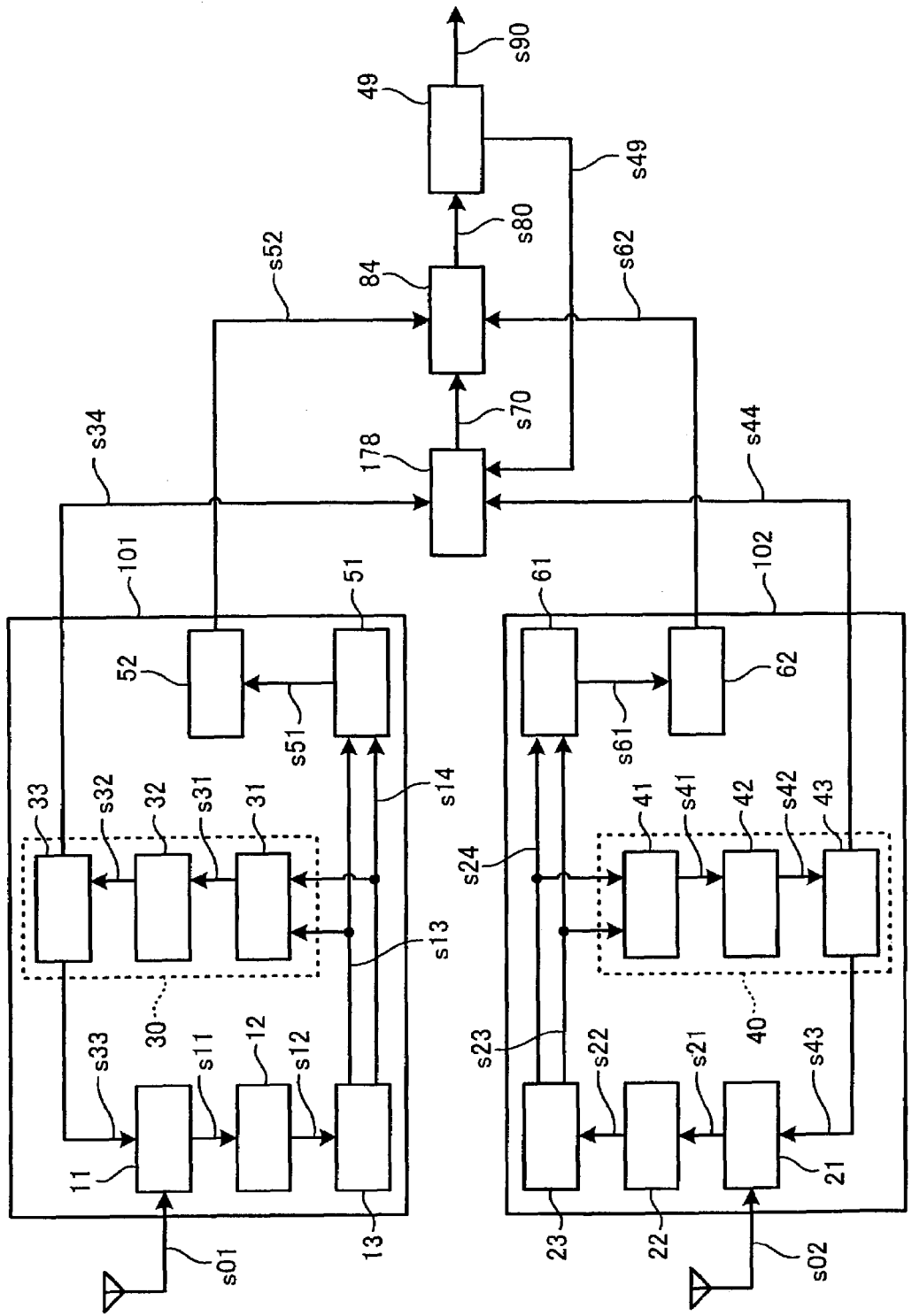
FIG. 14 is a block diagram of an eighth embodiment of the radio signal receiving apparatus according to the present invention.

The radio signal receiving apparatus 400 is shown in FIG. 14 as comprising first and second radio signal receiving circuits 101 and 102, a base band signal selecting circuit 178, an base band signal outputting circuit 84, and an error detecting circuit 49. Each of the first and second radio signal receiving circuits 101 and 102 is adapted to receive a radio signal having base band signal components from an antenna. The base band signal selecting circuit 178 is adapted to periodically select one of base band signals from among a plurality of base band signals produced in the radio signal receiving circuits 101 and 102 after judging whether or not the signal level of one of the base band signals is larger than the signal level of each of the others of the base band signals. The base band signal outputting circuit 84 is adapted to output the base band signal periodically selected by the base band signal selecting circuit 178 to the error detecting circuit 49. The error detecting circuit 49 is adapted to detect and correct an error in the selected base band signal outputted by the base band signal outputting circuit 84.

The base band signal selecting circuit 178 constitutes the base band signal selecting means according to the present invention. The base band signal outputting circuit 84 constitutes the base band signal outputting means according to the present invention.

The constitutional elements and the steps of the eighth embodiments of the radio signal receiving apparatus 400 entirely the same as those of the first embodiment of the radio signal receiving apparatus 100 will not be described but bear the same reference numerals and legends as those of the first embodiment of the radio signal receiving apparatus 100 in FIG. 1 to avoid tedious repetition.

The error detecting circuit 49 is adapted to receive the selected base band signal s80 outputted from the base band signal outputting circuit 84, calculate an error rate of the selected base band signal s80 after judging whether or not the error is detected in the selected base band signal s80, produce an error rate signal s91 indicative of the error rate, and output the error rate signal s91 to the base band signal selecting circuit 178.

Furthermore, the error detecting circuit 49 is adapted to correct the selected base band signal s80 in response to the error rate. The error detecting circuit 49 is adapted to detect, calculate and correct the error in the selected base band signal s80 in accordance with the error detecting and correcting method such as for example CRC check, Error Detecting/Correcting Code, or the like.

The error detecting circuit 49 is adapted to output the corrected base band signal s90 to the exterior device, not shown.

The base band signal selecting circuit 178 is operative to receive the control signals s34 and s44 in association with the gains, and the signal levels of the smoothed signals s32 and s42 from the first and second radio signal receiving circuits 101 and 102. The base band signal selecting circuit 178 has a storage section, not shown, having signal level range information storage therein. The signal level range information shows relationship between signal level values or gain control values with signal ranges respectively associated with groups. Preferably, the base band signal selecting circuit 178 may have an operator input the signal level range information therein. Furthermore, the base band signal selecting circuit 178 is adapted to receive the error rate signal s49 produced and outputted by the error detecting circuit 49, and classify the radio signal receiving circuit outputting the selected base band signal s80, hereinlater referred to as "selected radio signal receiving circuit" into one of groups in association with the error rates indicated by the error rate signals s49 outputted by the error detecting circuit 49. The groups include at least two different error-free groups consisting of a first error-free group and a second error-free group and a third error-rate group.

The base band signal selecting circuit 178 is operative to judge whether or not errors are detected in the selected base band signal s80. The base band signal selecting circuit 178 is operative to classify the selected radio signal receiving circuit into the first error-free group under the condition that no error is detected in the selected base band signal s80. The base band signal selecting circuit 178 is operative to judge whether or not the error rate of the selected base band signal s80 calculated by the error detecting circuit 49 is greater than a predetermined threshold under the condition that an error is detected in the selected base band signal s80. The base band signal selecting circuit 178 is operative to classify the selected radio signal receiving circuit into the second error-free group under the condition that the error rate of the selected base band signal s80 calculated by the error detecting circuit 49 is not greater than the predetermined threshold value. The base band signal selecting circuit 178 is operative to classify the selected radio signal receiving circuit into the third group under the condition that the error rate of the selected base band signal s80 calculated by the error detecting circuit 49 is greater than the predetermined threshold value.

The base band signal selecting circuit 178 is operative to judge whether or not the gain control value, i.e., the absolute value of |Vta Va| indicated in the gain control signal transmitted from the selected radio signal receiving circuit is continuously decreased for a predetermined time period under the condition that the selected radio signal receiving circuit is classified into the third group. The base band signal selecting circuit 178 is operative to select another radio signal receiving circuit if it is judged that the absolute value of |Vta Va| indicated in the gain control signal transmitted from the selected radio signal receiving circuit is not continuously decreased for a predetermined time period and that the selected radio signal receiving circuit is classified into the third group. The base band signal selecting circuit 178 is operative to produce a switching signal s70 in association with the selected radio signal receiving circuit, and output the switching signal s70 to the base band signal outputting circuit 84.

Here, each of the absolute value of |Vta Va| is periodically calculated by each of the gain control value calculator 33 and 43 along a time axis for the predetermined time period for n times before the judgment is made by the base band signal selecting circuit 178 on whether the absolute value of |Vta Va| indicated in the gain control signal transmitted from the selected radio signal receiving circuit is continuously decreased.

The base band signal selecting circuit 178 is operative to receive the control signals s33 and s43 in association with the absolute value of |Vta Va| or the gain information signals s34 and s44 in association with the logarithmic value "Va", if it is judged that the selected radio signal receiving circuit is classified into the third group and the absolute value of |Vta Va| indicated in the gain control signal transmitted from the selected radio signal receiving circuit is not continuously decreased for the predetermined time period. The signal level range information stored in the storage section of the base band signal selecting circuit 178 indicates relationship between signal level values or gain control values with signal ranges respectively associated with groups.

The base band signal selecting circuit 178 is operative to classify the first and second radio signal receiving circuits 101 and 102 into groups in response to the control signals s33 and s43 in association with the gain or gain information signal s34, s44 in association with the signal level and select one radio signal receiving circuit in a manner as described in the above under the condition that both the first and second radio signal receiving circuits 101 and 102 are classified into the same error-free group or that no error is detected in the base band signals s52 and s62 transmitted from the first and second radio signal receiving circuits 101 and 102. The base band signal selecting circuit 178 is operative to produce a switching signal s70 in association with the selected radio signal receiving circuit, and output the switching signal s70 to the base band signal outputting circuit 82.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal.

The base band signal selecting circuit 178 is operative to classify the radio signal receiving circuit into the first group G1 under the condition that the gain control value is within the range shown by the arrow pointed out by the legend G1. The base band signal selecting circuit 178 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 178 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 178 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 178 is operative to select the radio signal receiving circuit classified into the first group from among the radio signal receiving circuits under the condition that at least two radio signal receiving circuits are classified into the first group. On the other hand, the base band signal selecting circuit 178 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 178 is operative to produce a switching signal s70 in association with the selected radio signal receiving circuit, and output the switching signal s70 to the base band signal outputting circuit 84.

The base band signal selecting circuit 178 is operative to judge whether or not the difference between the first absolute value |Vta−Va| and the second absolute value |Vtb−Vb| is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 178 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 178 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 178 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 178 is operative to have the base band signal outputting circuit 84 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 178 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 178 is operative to have the base band signal outputting circuit 84 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 178 on whether each of the first absolute value |Vta−Va| and the second absolute value |Vtb−Vb| is continuously decreased or increased based on results periodically calculated by each of the gain control value calculators 33 and 43.

The base band signal selecting circuit 178 is operative to select one of the radio signal receiving circuits from among the radio signal receiving circuits in response to the gain control value in a manner as described in the first embodiment when it is judged that both of the first absolute value |Vta−Va| of the gain information signal s34 and the second absolute value |Vtb−Vb| of the gain information signal s44 are continuously decreased or increased along the time axis.

The base band signal outputting circuit 84 is operative to receive a switching signal s70 from the base band signal selecting circuit 178, the synchronized base band signal s52 from the first radio signal receiving circuit 101, the synchronized base band signal s62 from the second radio signal receiving circuit 102, and selectively output the synchronized base band signal s52 or s62 selected by the base band signal selecting circuit 178 to the exterior device.

Figure 16:
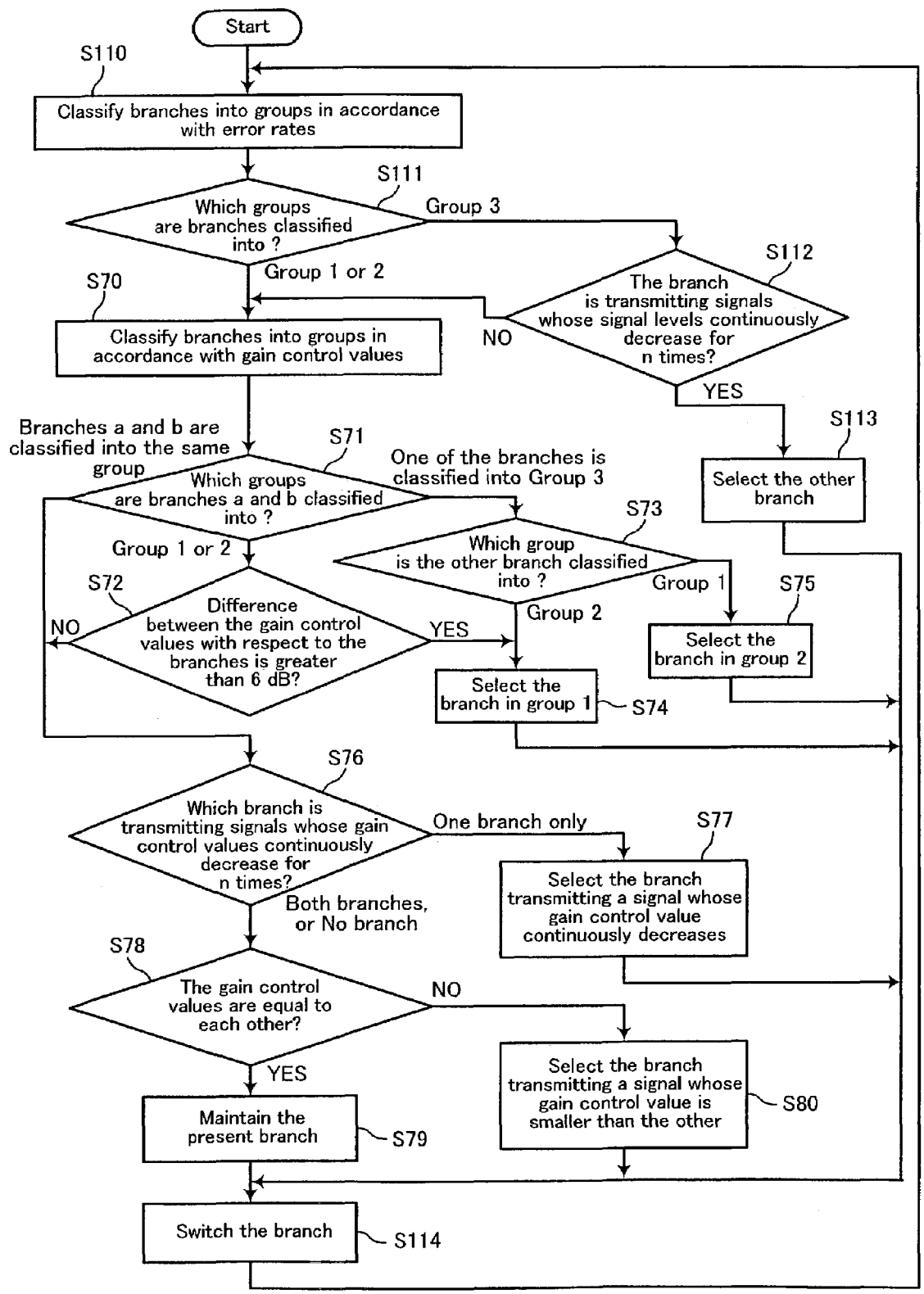
FIG. 16 is a flow chart showing a process to be performed by the eighth embodiment of the radio signal receiving apparatus according to the present invention.

The following description will now be directed to the process to be performed by the eighth embodiment of the radio signal receiving apparatus 400 according to the present invention with reference to the drawings shown in FIG. 16. The term "branches" are intended to indicate the radio signal receiving circuits.

The steps of the eighth embodiment of the radio signal receiving apparatus 400 different from those of the fifth embodiment of the radio signal receiving apparatus will now be described in detail hereinafter. The steps of the eighth embodiment of the radio signal receiving apparatus 400 entirely the same as those of the fifth embodiment of the radio signal receiving apparatus will not be described but bear the same reference numerals and legends as those of the fifth embodiment of the radio signal receiving apparatus shown in FIG. 8 to avoid tedious repetition.

The error rate signal s49 outputted by the error detecting circuit 49 is firstly received by the base band signal selecting circuit 178. The selected radio signal receiving circuit, i.e., one of the first and second radio signal receiving circuits 101 and 102 is classified by the base band signal selecting circuit 178 into the error-rate group in response to the error rate signal received from the error detecting circuit 49 in the step S110.

The selected radio signal receiving circuit, i.e., the one of the first and second radio signal receiving circuits 101 and 102 is then classified by the base band signal selecting circuit 178 into the group in the step S110. The judgment is then made by the base band signal selecting circuit 178 on whether or not the selected radio signal receiving circuit is classified into any one of the first and second groups in the step S111. When the answer in the step S111 is in the affirmative "YES", i.e., the selected radio signal receiving circuit is classified into one of the first and second groups, the step S111 proceeds to the step S70. When, on the other hand, the answer in the step S111 is in the negative "NO", i.e., at least one of the selected radio signal receiving circuits 101 and 102 is classified into the third group, the step S111 proceeds to the step S112.

The judgment is then made by the base band signal selecting circuit 178 whether or not the signal level of the base band signal selected by the base band signal selecting circuit 178 is continuously decreased in the predetermined period in the step S112. When the answer in the step S112 is in the affirmative "YES", i.e., the signal level of the base band signal selected by the base band signal selecting circuit 178 is continuously decreased in the predetermined period, the step S112 proceeds to the step S113. When, on the other hand, the answer in the step S112 is in the negative "NO", i.e., the signal level of the base band signal selected by the base band signal selecting circuit 178 is not continuously decreased in the predetermined period, the step S112 proceeds to the step S70.

The base band signal outputted by one of the first and second radio signal receiving circuits 101 and 102 is then selected by the base band signal selecting circuit 178 under the condition that the base band signal outputted by the other of the first and second radio signal receiving circuits 101 and 102 outputted by the base band signal outputting circuit 84 to the exterior device in the step S113. The base band signal outputting circuit 84 is then controlled by the base band signal selecting circuit 178 to have the base band signal outputting circuit 84 switch to the one of the first and second radio signal receiving circuits 101 and 102 from the other of the first and second radio signal receiving circuits 101 and 102.

The base band signal selected by the base band signal selecting circuit 178 in the step S113, the step S74, the step S75, the step S77, the step S79, and the step S80 is outputted to the exterior device as an output signal s80 in the step S114.

Figure 15:
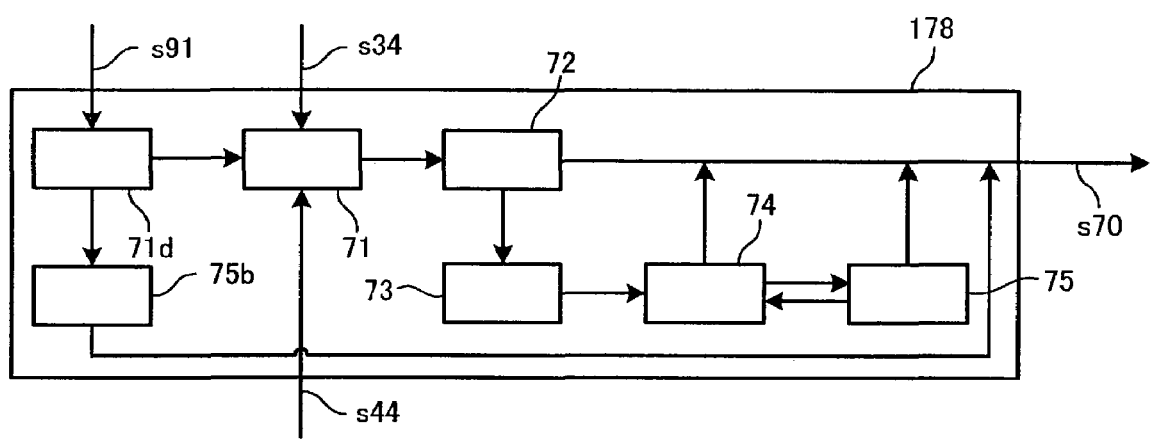
FIG. 15 is a block diagram showing a base band signal selecting circuit forming part of the eighth embodiment of the radio signal receiving apparatus according to the present invention.

The following description will now be directed to the base band signal selecting circuit 178 forming part of the eighth embodiment of the radio signal receiving apparatus 400 according to the present invention with reference to the drawings shown in FIG. 15.

The base band signal selecting circuit 178 includes: an error-signal judging section 71*d*, a third judging section 75*b*, a signal level judging section 71, a candidate signal selecting section 72, a signal level difference calculating section 73, a first judging section 74, and a second judging section 75. The signal level judging section 71, the candidate signal selecting section 72, the signal level difference calculating section 73, the first judging section 74, and the second judging section 75 have been already described in the previous embodiments. The description of the signal level judging section 71, the candidate signal selecting section 72, the signal level difference calculating section 73, the first judging section 74, and the second judging section 75 will be thus omitted to avoid tedious repetition.

The error-signal judging section 71*d* is adapted to judge whether or not the error is detected in the base band signal selected by the base band signal selecting circuit 178. The error-signal judging section 71*d* is operated to judge whether or not the error is detected in the base band signal selected by the base band signal selecting circuit 178 in the steps S110 and S112. The base band signal selecting circuit 178 is then operated to select one of the base band signals from among the base band signals based on results judged by the error-signal judging section 71*c* in the subsequent steps. It is needless to mention that the base band signal selecting circuit 178 may further include the candidate signal selecting section 72*b*, the error rate difference calculating section 73*b*, and the error rate difference judging section 74*b* as previously mentioned.

The base band signals include first and second base band signals respectively having first and second signal levels. The signal level values include first and second signal level values respectively indicative of the first and second signal levels of the first and second base band signals produced by the base band signal producing circuits. The first and second base band signals are produced in, for example, the radio signal receiving circuits 101 and 102.

The third judging section 75*b* is adapted to judge whether or not the signal levels of the base band signal periodically calculated by the signal level calculating unit are decreased after judging whether or not the signal levels of the base band signal periodically calculated by the signal level calculating unit are decreased at predetermined time intervals for a predetermined time period. The base band signal selecting circuit 178 is operative to periodically select one of the first base band signal and the second base band signal from among the base band signals produced by the base band signal producing circuits 51 and 61 based on results judged by the third judging section 75*b*. The third judging section 75*b* is operative to judge whether or not the signal levels of the base band signal periodically calculated by the signal level calculating unit are decreased after judging whether or not the signal levels of the base band signal periodically calculated by the signal level calculating unit are decreased at predetermined time intervals for a predetermined time period in the step S112. The base band signal selecting circuit 178 is operative to periodically select one of the first base band signal and the second base band signal from among the base band signals produced by the base band signal producing circuits 51 and 61 based on results judged by the third judging section 75*b*.

From the above detail description, it will be understood that the radio signal receiving apparatus according to the eighth embodiment of the present invention selectively receive radio signals each including a base band signal component through the antennas, produce a plurality of base band signals each indicative of the base band signal component, and output one base band signal highest in quality from among the base band signals wherein the selected base band signal has a low error rate, thereby ensuring reliable communications between a far-end speaker and a near-end speaker.

The ninth embodiment of the radio signal receiving apparatus 500 according to the present invention will firstly be described hereinafter with reference to FIG. 17.

Figure 17:
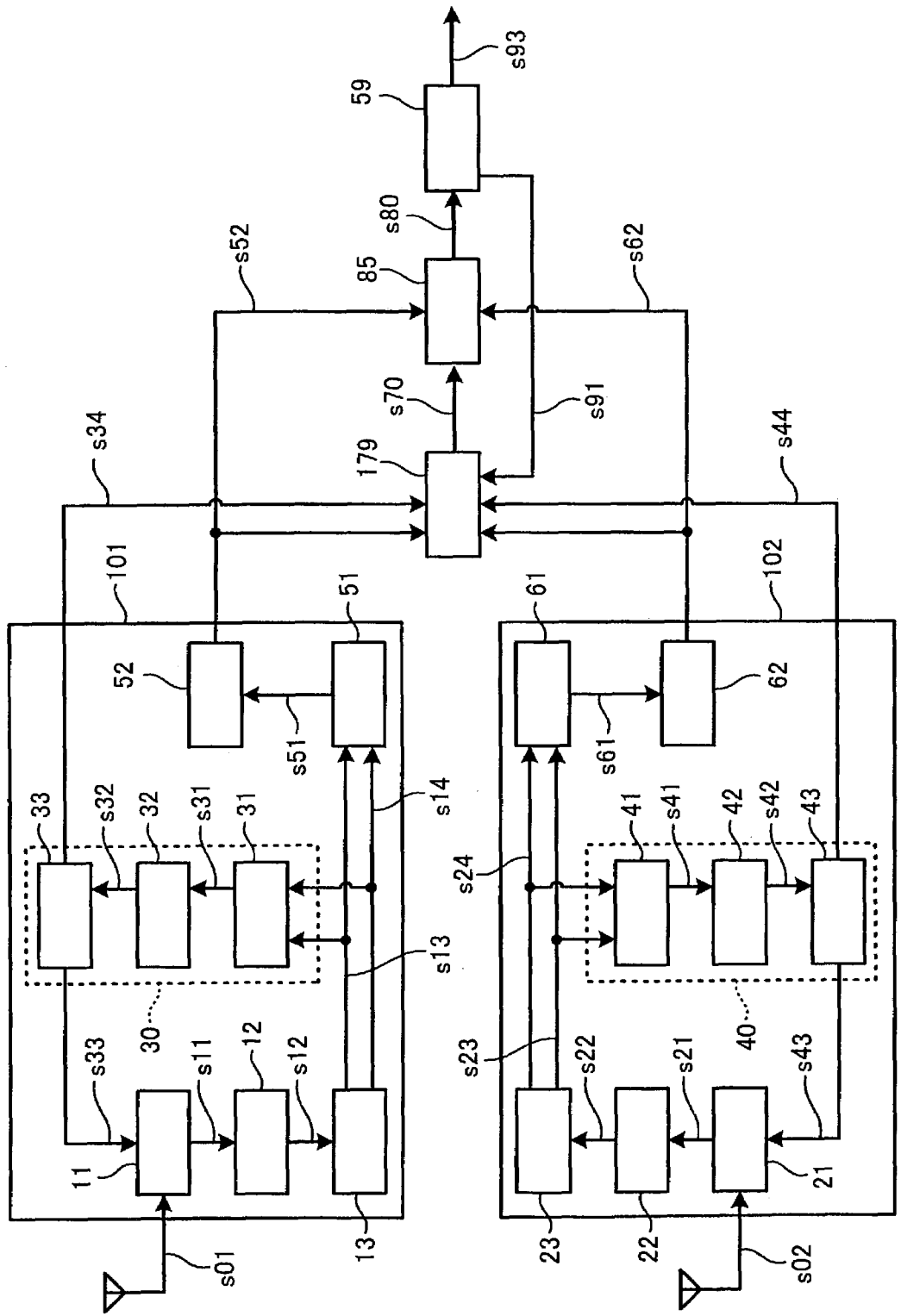
FIG. 17 is a block diagram of a ninth embodiment of the radio signal receiving apparatus according to the present invention.

The radio signal receiving apparatus 500 is shown in FIG. 17 as comprising first and second radio signal receiving circuits 101 and 102, a base band signal selecting circuit 179, an base band signal outputting circuit 85, and an error detecting circuit 59. Each of the first and second radio signal receiving circuits 101 and 102 is adapted to receive a radio signal having base band signal components from an antenna. The base band signal selecting circuit 179 is adapted to periodically select one of base band signals from among a plurality of base band signals produced in the radio signal receiving circuits 101 and 102 after judging whether or not the signal level of one of the base band signals is larger than the signal level of each of the others of the base band signals. The base band signal outputting circuit 85 is adapted to output the base band signal periodically selected by the base band signal selecting circuit 179 to the error detecting circuit 59. The error detecting circuit 59 is adapted to detect and correct an error in the selected base band signal outputted by the base band signal outputting circuit 85.

The base band signal selecting circuit 179 constitutes the base band signal selecting means according to the present invention. The base band signal outputting circuit 85 constitutes the base band signal outputting means according to the present invention.

The constitutional elements and the steps of the ninth embodiments of the radio signal receiving apparatus 500 entirely the same as those of the first embodiment of the radio signal receiving apparatus 100 will not be described but bear the same reference numerals and legends as those of the first embodiment of the radio signal receiving apparatus 100 in FIG. 1 to avoid tedious repetition.

The error detecting circuit 59 is adapted to selectively receive the synchronized base band signal s52 and the synchronized base band signal s62 outputted from the base band signal outputting circuit 85, calculate an error rate of the one of the synchronized base band signals s52 and s62 after judging whether or not the error is detected in the one of the synchronized base band signals s52 and s62, produce an error rate signal s91 indicative of the error rate, and output the error rate signal s91 to the base band signal selecting circuit 179.

Furthermore, the error detecting circuit 59 is adapted to correct the one of the synchronized base band signals s52 and s62 in response to the error rate. The error detecting circuit 59 is adapted to detect, calculate and correct the error in the base band signal in accordance with the error detecting and correcting method such as for example CRC check, Error Detecting/Correcting Code, or the like.

The error detecting circuit 59 is adapted to output the corrected base band signal s93 to the exterior device.

The base band signal selecting circuit 179 is adapted to receive the control signals s34 and s44 in association with the gains, and the signal levels of the smoothed signals s32 and s42 from the first and second radio signal receiving circuits 101 and 102. Furthermore, the base band signal selecting circuit 179 is adapted to receive the error rate signal s91 produced and outputted by the error detecting circuit 49, and classify the radio signal receiving circuit outputting the selected base band signal s80 into one of the error-rate groups in association with the error rates indicated by the error rate signals s91 outputted by error detecting circuit 59. The groups include at least two different error-free groups consisting of a first error-free group and a second error-free group and a third error-rate group.

The base band signal selecting circuit 179 is operative to judge whether or not errors are detected in the selected base band signal s80. If the base band signal selecting circuit 179 judges that no error is detected in the selected base band signal s80, the base band signal selecting circuit 179 is operative to classify the radio signal receiving circuit outputting the selected base band signal s80 into the first error-free group. If, on the other hand, the base band signal selecting circuit 179 judges that an error is detected in the selected base band signal s80, the base band signal selecting circuit 179 is operative to judge whether or not the error rate of the selected base band signal s80 calculated by the error detecting circuit 49 is greater than a predetermined threshold. If it is judged that the error rate of the selected base band signal s80 calculated by the error detecting circuit 49 is not greater than the predetermined threshold value, the base band signal selecting circuit 179 is operative to classify the radio signal receiving circuit outputting the selected base band signal s80 into the second error-free group. If it is judged that the error rate of the selected base band signal s80 calculated by the error detecting circuit 49 is greater than the predetermined threshold value, the base band signal selecting circuit 179 is operative to classify the radio signal receiving circuit outputting the selected base band signal s80 into the third error-rate group.

Further, the base band signal selecting circuit 179 is operative to receive the base band signals s52 and s62 from the first and second radio signal receiving circuits 101 and 102 and judge whether or not the base band signals s52 and s62 are synchronized with the base band signal selecting circuit 179. Each of the base band signal has a synchronization component, and each of the synchronization circuits 52 and 62 is operative to acquire synchronization with the base band signal selecting circuit in accordance with the synchronization component. This means that the base band signal selecting circuit 179 is operative to synchronize with each of the base band signals in response to the synchronization component. The fact that that the base band signal selecting circuit 179 detects no synchronization component in the base band signal leads to the fact that the base band signal selecting circuit 179 fails to be synchronized with the base band signal. The fact that the base band signal selecting circuit 179 detects a synchronization component in the base band signal leads to the fact that the base band signal selecting circuit 179 is synchronized with the base band signal.

Figure 18:
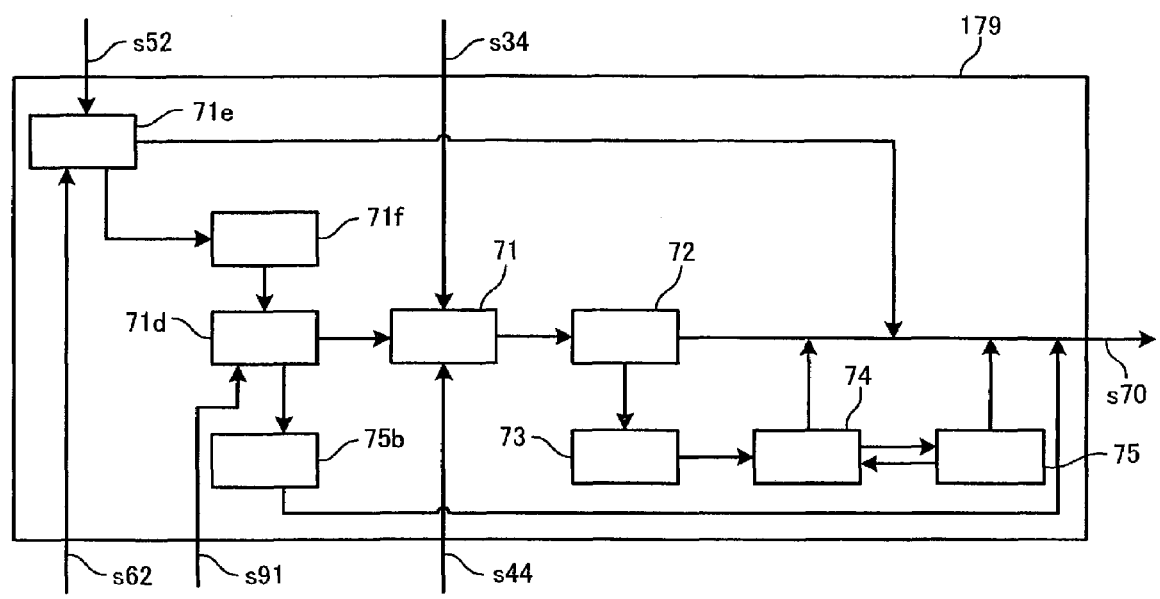
FIG. 18 is a block diagram showing a base band signal selecting circuit forming part of the ninth embodiment of the radio signal receiving apparatus according to the present invention.

As shown in FIG. 18, the base band signal selecting circuit 179 includes a synchronization component detecting section 71*e* for detecting the synchronization component of each of the base band signals s52 and s62 produced by the base band signal producing circuits 51 and 61, a synchronization information judging section 71*f* for judging whether or not the synchronization component of each of the base band signals produced by the base band signal producing circuits 51 and 61 is detected by the synchronization component detecting section 71*e*. The base band signal selecting circuit 179 is operative to select one of the base band signals from among the base band signals produced by the base band signal producing circuits 51 and 61 based on results judged by the synchronization information judging section 71*f*. Preferably, the synchronization component should be indicative of a unique word signal.

If it is judged that one of the base band signals s52 and s62 is not synchronized with the base band signal selecting circuit 179 but the other one of the base band signals 352 and 362 is synchronized with the base band signal selecting circuit 179, the base band signal selecting circuit 179 is operative to select the radio signal receiving circuit transmitting the base band signal, which is synchronized with the base band signal selecting circuit 179, as the selected radio signal receiving circuit, and output a switching signal s70 in association with the selected radio signal receiving circuit to the base band signal outputting circuit 85.

If it is judged that none of the base band signals s52 and s62 is synchronized with the base band signal selecting circuit 179, or if it is judged that both of the base band signals s52 and s62 are synchronized with the base band signal selecting circuit 179, the base band signal selecting circuit 179 is operative to receive the error rate signal s91 from the error detecting circuit 59, and classify the radio signal receiving circuit into one of the error-rate groups in association with the error rates indicated by the error rate signal s91 outputted by the error detecting circuit 59.

The base band signal selecting circuit 179 is operative to judge whether or not an error is detected in the base band signal s80. If the base band signal selecting circuit 179 judges that no error is detected in the base band signal s80, the base band signal selecting circuit 179 is operative to classify the radio signal receiving circuit outputting the base band signal s80 into the first error-rate group. If, on the other hand, the base band signal selecting circuit 179 judges that an error is detected in the base band signal s80, the base band signal selecting circuit 179 is operative to judge whether or not the error rate of the base band signal calculated by the error detecting circuit 59 is greater than a predetermined threshold or not. If it is judged that the error rate of the base band signal s80 calculated by the error detecting circuit 59 is not greater than the predetermined threshold value, the base band signal selecting circuit 179 is operative to classify the radio signal receiving circuit outputting the base band signal s80 into the second error-rate group. If it is judged that the error rate of the base band signal s80 calculated by the error detecting circuit 59 is greater than the predetermined threshold value, the base band signal selecting circuit 179 is operative to classify the radio signal receiving circuit outputting the base band signal s80 into the third error-rate group.

As described in the above, the first and second error-rate groups are referred to as first and second error-free ranges, respectively.

The base band signal selecting circuit 179 is operative to judge whether or not the gain control value, i.e., the absolute value of |Vta Va| indicated in the gain control signal transmitted from the selected radio signal receiving circuit is continuously decreased for a predetermined time period under the condition that the selected radio signal receiving circuit is classified into the third error-rate group. The base band signal selecting circuit 179 is operative to select another radio signal receiving circuit under the condition that the absolute value of |Vta Va| indicated in the gain control signal transmitted from the selected radio signal receiving circuit is not continuously decreased for a predetermined time period and that the selected radio signal receiving circuit is classified into the third error-rate group. The base band signal selecting circuit 179 is operative to produce a switching signal s70 in association with the selected radio signal receiving circuit, and output the switching signal s70 to the base band signal outputting circuit 85.

Here, each of the absolute value of |Vta Va| is periodically calculated by each of the gain control value calculator 33 and 43 along a time axis for the predetermined time period for n times before the judgment is made by the base band signal selecting circuit 179 on whether the absolute value of |Vta Va| indicated in the gain control signal transmitted from the selected radio signal receiving circuit is continuously decreased.

The base band signal selecting circuit 179 is operative to receive the control signals s33 and s43 in association with the absolute value of |Vta Va| or the gain information signals s34 and s44 in association with the logarithmic value "Va" under the condition that the selected radio signal receiving circuit is classified into the third error-rate group and the absolute value of |Vta Va| indicated in the gain control signal transmitted from the selected radio signal receiving circuit is not continuously decreased for the predetermined time period. The signal level range information stored in the storage section of the base band signal selecting circuit 179 indicates relationship between signal level values or gain control values with signal ranges respectively associated with groups.

The base band signal selecting circuit 179 is operative to classify the first and second radio signal receiving circuits 101 and 102 into groups in response to the control signals s33 and s43 in association with the gain or gain information signal s34, s44 in association with the signal level and select one radio signal receiving circuit in a manner as described in the above. The base band signal selecting circuit 179 is operative to produce a switching signal s70 in association with the selected radio signal receiving circuit, and output the switching signal s70 to the base band signal outputting circuit 85.

As shown in FIG. 3, the groups are partially constituted by at least three different groups consisting of first to third groups into which the radio signal receiving circuits are classified on the basis of the absolute value of the difference between the predetermined signal level and the logarithmic value in association with the signal level of the smoothed signal.

The base band signal selecting circuit 179 is operative to classify the radio signal receiving circuit into the first group G1 under the condition that the gain control value is within the range shown by the arrow pointed out by the legend G1. The base band signal selecting circuit 179 is operative to classify the radio signal receiving circuit into the second group G2 under the condition that the gain control value is beyond the range shown by the arrow pointed out by the legend G1 but within the range shown by the arrow pointed out by the legend G2. The base band signal selecting circuit 179 is operative to classify the radio signal receiving circuit into the third group G3 under the condition that the gain control value is beyond the range shown by the arrow pointed out by the legend G2 but within the range shown by the arrow pointed out by legend G3.

Although the groups are partially constituted by at least three different groups consisting of first to third groups in association with the signal level of the radio signal to be received by each of the first and second radio signal receiving circuits 101 and 102, the groups may be partially constituted by at least two different groups consisting of first and second groups G1 and G2.

The base band signal to be outputted by the radio signal receiving circuit classified into the first group is more significant than the base band signal to be outputted by the radio signal receiving circuit classified into the second group, i.e., the first group takes priority over the second group when one of the base band signals is selected from among the base band signals respectively outputted by the radio signal receiving circuits. The base band signal to be outputted by the radio signal receiving circuit classified into the second group is more significant than the base band signal to be outputted by the radio signal receiving circuit classified into the third group, i.e., the second group takes priority over the third group when one of the base band signals is selected from among the base band signals respectively outputted by the radio signal receiving circuits.

The base band signal selecting circuit 179 is operative to classify the first and second radio signal receiving circuits 101 and 102 into the groups based on the gain information signal s34 received from the gain control value calculator 33 forming part of the first radio signal receiving circuit 101, and the gain information signal s44 received from the gain control value calculator 43 forming part of the second radio signal receiving circuit 102, before selecting at least one of the classified groups from among the classified groups.

The base band signal selecting circuit 179 is operative to select the radio signal receiving circuit classified into the first group from among the radio signal receiving circuits under the condition that at least two radio signal receiving circuits are classified into the first group. On the other hand, the base band signal selecting circuit 179 is operative to select both the radio signal receiving circuit classified into the first group and the radio signal receiving circuit classified into the second group from among the radio signal receiving circuits under the condition that only one radio signal receiving circuit is classified into the first group.

The base band signal selecting circuit 179 is operative to produce a switching signal s70 in association with the selected radio signal receiving circuit, and output the switching signal s70 to the base band signal outputting circuit 85.

The base band signal selecting circuit 179 is operative to judge whether or not the difference between the first absolute value |Vta−Va| and the second absolute value |Vtb−Vb| is larger than 6 [dB] under the condition that one of the first and second radio signal receiving circuits 101 and 102 is classified into the first group, and the other of the first and second radio signal receiving circuits 101 and 102 is classified into the second group. The base band signal selecting circuit 178 is operative to select one of the first and second radio signal receiving circuits 101 and 102 classified into the first group from among the first and second radio signal receiving circuits 101 and 102 under the condition that one of the first and second radio signal receiving circuits 101 and 102 is classified into the first group, and the other of the first and second radio signal receiving circuits 101 and 102 is classified into the second group.

The base band signal selecting circuit 179 is operative to judge whether one of the first absolute value |Vta−Va| of the gain information signal s34 and the second absolute value |Vtb−Vb| of the gain information signal s44 is continuously decreased along the time axis, and the other of the first absolute value |Vta−Va| of the gain information signal s34 and the second absolute value |Vtb−Vb| of the gain information signal s44 is not continuously decreased along the time axis under the condition that neither the first radio signal receiving circuit 101 nor the second radio signal receiving circuit 102 is classified into the first group, and both first radio signal receiving circuit 101 and the second radio signal receiving circuit 102 is classified into the second group.

The base band signal selecting circuit 179 is operative to select the first radio signal receiving circuit 101 from the first and second radio signal receiving circuit 102 under the condition that the first absolute value |Vta−Va| is continuously decreased along the time axis, and the second absolute value |Vtb−Vb| is not continuously decreased along the time axis. The base band signal selecting circuit 179 is operative to have the base band signal outputting circuit 85 output the base band signal outputted by the first radio signal receiving circuit 101 under the condition that the first absolute value |Vta−Va| is continuously decreased along the time axis, and the second absolute value |Vtb−Vb| is not continuously decreased along the time axis.

On the other hand, the base band signal selecting circuit 179 is operative to select the second radio signal receiving circuit 102 from the first and second radio signal receiving circuit 102 under the condition that the first absolute value |Vta−Va| is not continuously decreased along the time axis, and the second absolute value |Vtb−Vb| is continuously decreased along the time axis. The base band signal selecting circuit 179 is operative to have the base band signal outputting circuit 85 output the base band signal outputted by the second radio signal receiving circuit 102 under the condition that the first absolute value |Vta−Va| is not continuously decreased along the time axis, and the second absolute value |Vtb−Vb| is continuously decreased along the time axis.

Here, each of the first absolute value |Vta−Va| and the second absolute value |Vtb−Vb| is periodically calculated by each of the gain control value calculators 33 and 43 along a time axis for n times before the judgment is made by the base band signal selecting circuit 179 on whether each of the first absolute value |Vta−Va| and the second absolute value |Vtb−Vb| is continuously decreased or increased based on results periodically calculated by each of the gain control value calculators 33 and 43.

The base band signal selecting circuit 179 is operative to select one of the radio signal receiving circuits from among the radio signal receiving circuits in response to the gain control value in a manner as described in the first embodiment when it is judged that both of the first absolute value |Vta−Va| of the gain information signal s34 and the second absolute value |Vtb−Vb| of the gain information signal s44 are continuously decreased or increased along the time axis.

The base band signal outputting circuit 85 is operative to receive a switching signal s70 from the base band signal selecting circuit 179, the synchronized base band signal s52 from the first radio signal receiving circuit 101, the synchronized base band signal s62 from the second radio signal receiving circuit 102, and selectively output the synchronized base band signal s52 or s62 selected by the base band signal selecting circuit 179.

Figure 19:
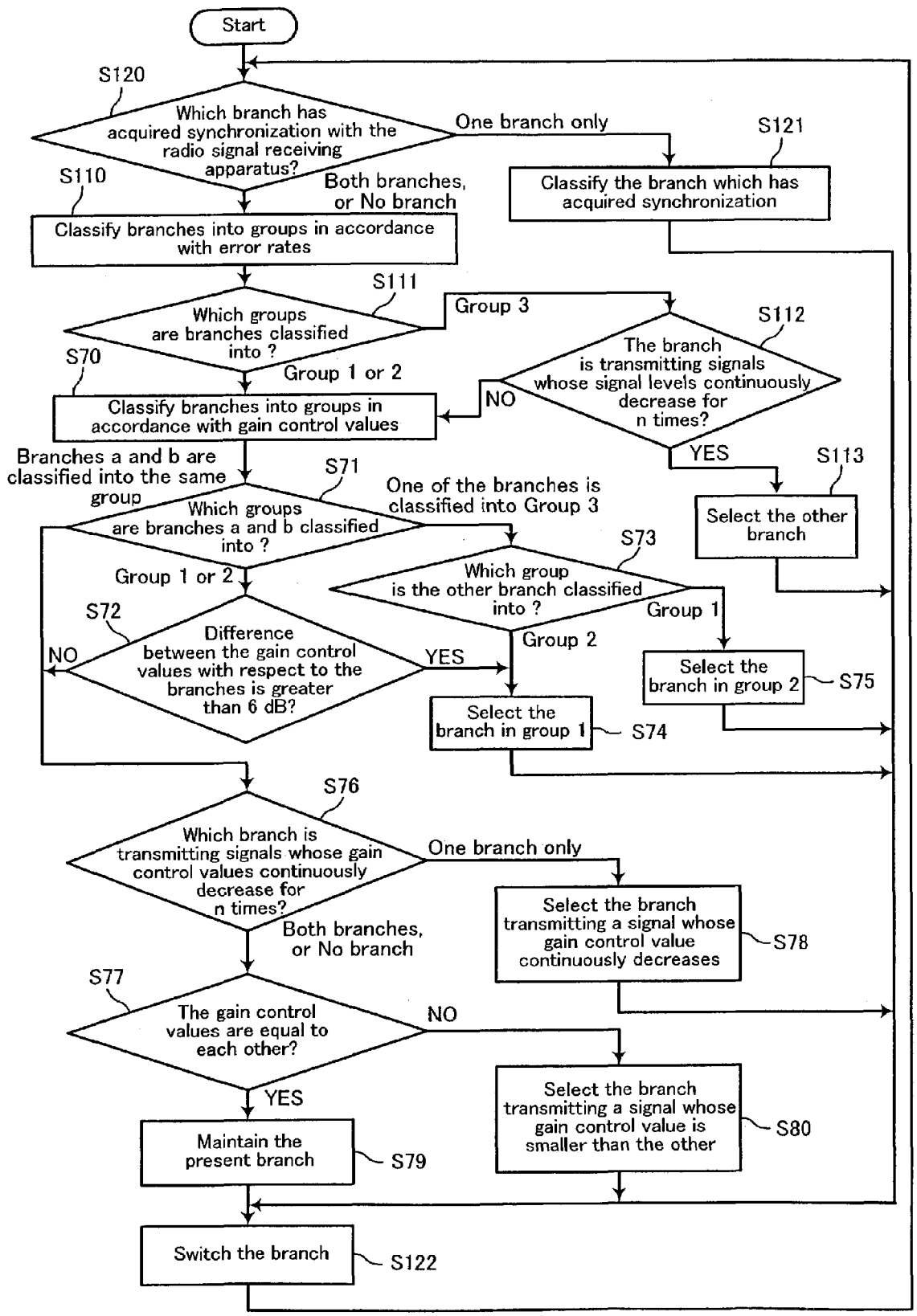
FIG. 19 is a flow chart showing a process to be performed by the ninth embodiment of the radio signal receiving apparatus according to the present invention.
Figure 20:
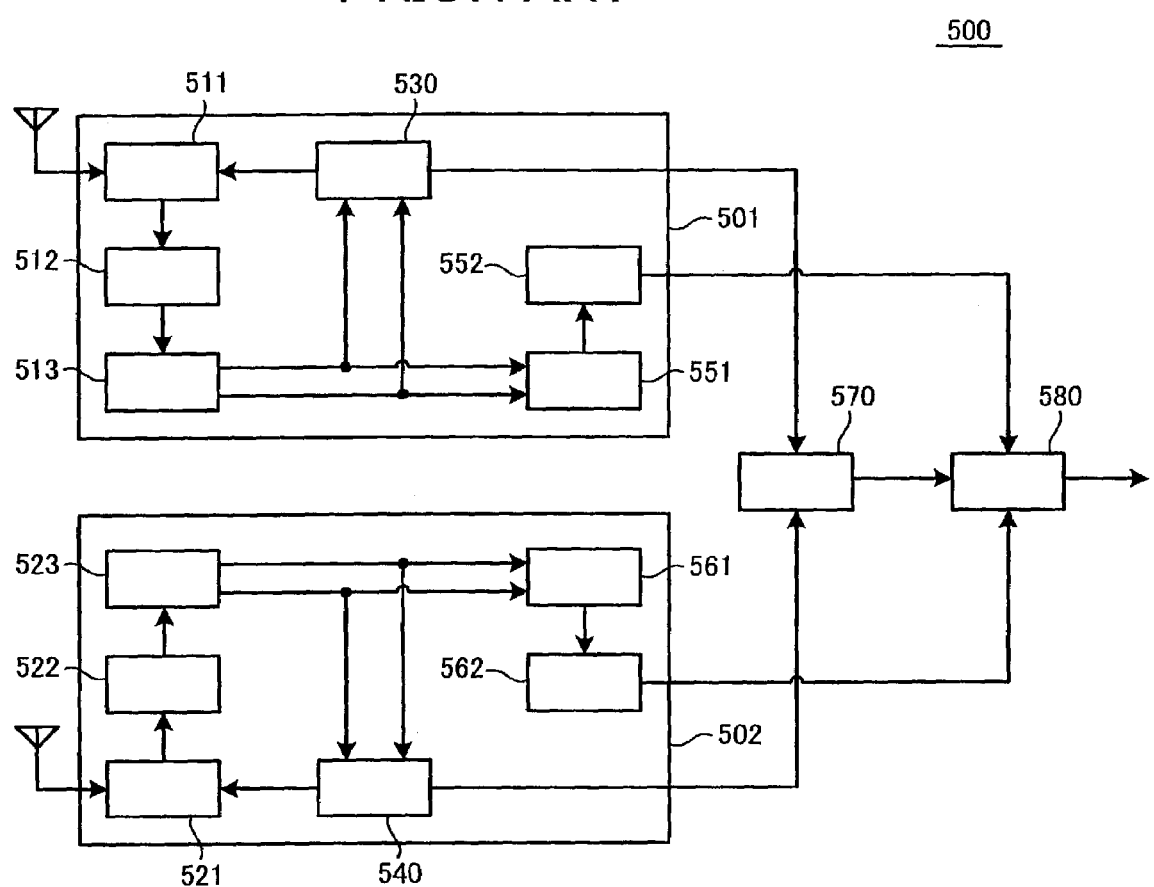
FIG. 20 is a block diagram of the conventional radio signal receiving apparatus.

The following description will now be directed to the process to be performed by the ninth embodiment of the radio signal receiving apparatus 500 according to the present invention with reference to the flow chart shown in FIG. 19. The term "branches" is intended to indicate the radio signal receiving circuits.

The steps of the ninth embodiment of the radio signal receiving apparatus 500 different from those of the fifth embodiment of the radio signal receiving apparatus will now be described in detail hereinafter. The steps of the ninth embodiment of the radio signal receiving apparatus 500 entirely the same as those of the fifth embodiment of the radio signal receiving apparatus will not be described but bear the same reference numerals and legends as those of the fifth embodiment of the radio signal receiving apparatus shown in FIG. 8 to avoid tedious repetition.

The judgment is then made by the base band signal selecting circuit 179 whether or not each of the base band signal s52 outputted by the first radio signal receiving circuit 101 and the base band signal s62 outputted by the second radio signal receiving circuit 102 is synchronized with the radio signal receiving apparatus in the step S120.

When the answer in the step S120 is in the affirmative "YES", i.e., each of the base band signal s52 outputted by the first radio signal receiving circuit 101 and the base band signal s62 outputted by the second radio signal receiving circuit 102 is synchronized with the radio signal receiving apparatus, the step S120 proceeds to the step S110. When, on the other hand, the answer in the step S120 is in the negative "NO", i.e., the judgment is then made by the base band signal selecting circuit 179 whether or not one of the base band signal s52 outputted by the first radio signal receiving circuit 101 and the base band signal s62 outputted by the second radio signal receiving circuit 102 is synchronized with the radio signal receiving apparatus, and the other of the base band signal s52 outputted by the first radio signal receiving circuit 101 and the base band signal s62 outputted by the second radio signal receiving circuit 102 is not synchronized with the radio signal receiving apparatus in the step S120.

When the answer in the step S120 is in the affirmative "YES", i.e., one of the base band signal s52 outputted by the first radio signal receiving circuit 101 and the base band signal s62 outputted by the second radio signal receiving circuit 102 is synchronized with the synchronization signal, and the other of the base band signal s52 outputted by the first radio signal receiving circuit 101 and the base band signal s62 outputted by the second radio signal receiving circuit 102 is not synchronized with the radio signal receiving apparatus, the step S120 proceeds to the step S121. When, on the other hand, the answer in the step S120 is in the negative "NO", i.e., each the base band signal s52 outputted by the first radio signal receiving circuit 101 and the base band signal s62 outputted by the second radio signal receiving circuit 102 is not synchronized with the radio signal receiving apparatus, the step S120 proceeds to the step S110.

The base band signal selected by the base band signal selecting circuit 179 in the step S121, the step S113, the step S74, the step S75, the step S77, the step S79, and the step S80 is outputted to the exterior device as an output signal s80 in the step S122.

The following description will now be directed to the base band signal selecting circuit 179 forming part of the ninth embodiment of the radio signal receiving apparatus according to the present invention with reference to the drawings shown in FIG. 18.

The base band signal selecting circuit 179 includes: a synchronization component detecting section 71e, a synchronization information judging section 71f, an error-signal judging section 71d, a signal level judging section 71, a candidate signal selecting section 72, a signal level difference calculating section 73, a first judging section 74, a second judging section 75, and a third judging section 75b. The error-signal judging section 71d, the signal level judging section 71, the candidate signal selecting section 72, the signal level difference calculating section 73, the first judging section 74, and the second judging section 75 have been already described in the previous embodiments. The description of the error-signal judging section 71d, the signal level judging section 71, the candidate signal selecting section 72, the signal level difference calculating section 73, the first judging section 74, the second judging section 75, and the third judging section 75b will be thus omitted to avoid tedious repetition.

The synchronization component detecting section 71e is adapted to detect the synchronization component of each of the base band signals s52 and s62 produced by the base band signal producing circuits 51 and 61. The synchronization information judging section 71f is adapted to judge whether or not the synchronization component of each of the base band signals produced by the base band signal producing circuits 51 and 61 is detected by the synchronization component detecting section 71e.

The synchronization component detecting section 71e is operated to detect the synchronization component of each of the base band signals s52 and s62 produced by the base band signal producing circuits 51 and 61 in the step S120. The synchronization information judging section 71f is then operated to judge whether or not the synchronization component of each of the base band signals produced by the base band signal producing circuits 51 and 61 is detected by the synchronization component detecting section 71e in the step S120. The base band signal selecting circuit 179 is operated to select one of the base band signals from among the base band signals produced by the base band signal producing circuits 51 and 61 based on results judged by the synchronization information judging section 71f in steps S110 and S121.

Although it is described in the previous embodiments that the base band signal selecting circuit is operative to periodically select one of base band signals from among a plurality of base band signals produced in the radio signal receiving circuits after judging whether or not the signal level of one of the base band signals is larger than the signal level of each of the others of the base band signals, it is needless to mention that the base band signal selecting circuit may periodically select one of base band signals from among a plurality of base band signals produced in the radio signal receiving circuits after judging whether or not the gain control value corresponding to the one of the base band signals is smaller than the gain control value corresponding to each of the others of the base band signals.

Although the radio signal receiving apparatus comprises first and second radio signal receiving circuits 101 and 102 for respectively receiving radio signals s01 and s02 each having a base band signal component in the previous embodiments, the radio signal receiving apparatus according to the present invention may comprise three or more radio signal receiving circuits for respectively receiving radio signals each having a base band signal component.

From the above detail description, it will be understood that the radio signal receiving apparatus according to the ninth embodiment of the present invention selectively receive radio signals each including a base band signal component through the antennas, produce a plurality of base band signals each indicative of the base band signal component, and output one base band signal highest in quality from among the base band signals wherein the selected base band signal has a low error rate, thereby ensuring reliable communications between a far-end speaker and a near-end speaker.

As will be seen from the above description, the radio signal receiving apparatus according to the present invention can selectively receive radio signals each including a base band signal component through the antennas, produce a plurality of base band signals each indicative of the base band signal component, and periodically select one base band signal highest in quality from among the base band signals, thereby enabling to consistently output the selected base band signals respectively having low error rates, thereby ensuring reliable communications between a far-end speaker and a near-end speaker.

While the subject invention has been described with relation to the embodiments, various modifications and adaptations thereof will now be apparent to those skilled in the art as far as such modifications and adaptations fall within the scope of the appended claims intended to be covered thereby.

What is claimed is:

1. A radio signal receiving apparatus for receiving radio signals each having a base band signal component, comprising:

radio signal amplifying means for amplifying said radio signals each having a signal level;

base band signal producing means for producing base band signals respectively indicative of said base band signal components of said radio signals amplified by said radio signal amplifying means, said base band signals each having a signal level;

controlling means for controlling said radio signal amplifying means to have said radio signal amplifying means amplify said radio signals in response to said signal level of each of said base band signals to be produced by said base band signal producing means;

base band signal selecting means for periodically selecting one of said base band signals from among said base band signals produced by said base band signal producing means in response to said signal level of each of said radio signals; and base band signal outputting means for outputting said base band signal periodically selected by said base band signal selecting means to an exterior device, wherein said controlling means includes a signal level calculating unit for calculating a signal level value indicative of said signal level of each of said base band signals to be produced by said base band signal producing means, and a signal level difference calculating unit for calculating a signal level difference between said signal level value of each of said base band signals calculated by said signal level calculating unit and a target value before calculating a gain control value indicative of an absolute value of said signal level difference between said signal level value of each of said base band signals and said target value, said controlling means is operative to control said radio signal amplifying means to have said radio signal amplifying means amplify said radio signals in response to said gain control value calculated by said signal level difference calculating unit, said base band signal selecting means includes: a signal level judging unit for judging whether or not each of said gain control values calculated by said signal level difference calculating unit in association with each of said base band signals is smaller than a predetermined signal level; and said base band signal selecting means is operative to select one of said base band signals from among said base band signals produced by the base band signal producing means after judging whether or not said gain control value calculated by said signal level difference calculating unit in association with each of said base band signals is smaller than said predetermined signal level based on results judged by the signal level judging unit, said base band signals including first and second base band signals respectively having first and second signal levels, said gain control values including first and second gain control values respectively indicative of the absolute value of said signal level difference between said first signal level of said first base band signal and said predetermined target signal level and the absolute value of said signal level difference between said second signal level of said second base band signal and said predetermined target signal level, said first and second gain control values varied in response to a time axis, and respectively having first and second fluctuations, said first and second gain control values respectively in association with said first and second base band signals, said base band signal selecting means includes:

candidate signal selecting means for selecting said first and second base band signals from among said base band signals produced by said base band signal producing means after deciding that said first gain control value in association with said first base band signal is smaller than said gain control value in association with each of said base band signals, and said second gain control value in association with said second base band signal is smaller than said gain control value in association with each of said base band signals except for said first base band signal;

gain control value difference calculating means for calculating a gain control value difference between said first gain control value in association with said first base band signal selected by said candidate signal selecting means and said second gain control value in association with said second base band signal selected by said candidate signal selecting means;

first judging means for judging whether or not said gain control value difference between said first gain control value and said second gain control value calculated by said gain control value difference calculating means is larger than a predetermined threshold value; and second judging means for judging whether or not said fluctuation of said first gain control value in association with said first base band signal is larger than said fluctuation of said second gain control value in association with said second base band signal, said base band signal selecting means is operative to periodically select said first base band signal from among said base band signals produced by said base band signal producing means when the judgment is made by said first judging means as said gain control value difference between said first gain control value and said second gain control value calculated by said gain control value difference calculating means being larger than said predetermined threshold value, and select one of said first and second base band signals from among said base band signals produced by said base band signal producing means based on results judged by said second judging means when the judgment is made by said first judging means as said gain control value difference between said first gain control value and said second gain control value calculated by said gain control value difference calculating means being equal to or smaller than a predetermined threshold value.

2. A radio signal receiving apparatus as set forth in claim 1, in which said second judging means is operative to judge whether or not said fluctuation of said first gain control value in association with said first base band signal is larger than said fluctuation of said second gain control value in association with said second base band signal after judging said fluctuation of said first gain control values periodically calculated by said signal level difference calculating unit in association with said first base band signal and said fluctuation of said second gain control values periodically calculated by said signal level difference calculating unit in association with said second base band signal at predetermined time intervals for a predetermined time period.

3. A radio signal receiving apparatus for receiving radio signals each having a base band signal component, comprising:

radio signal amplifying means for amplifying said radio signals each having a signal level;

base band signal producing means for producing base band signals respectively indicative of said base band signal components of said radio signals amplified by said radio signal amplifying means, said base band signals each having a signal level;

controlling means for controlling said radio signal amplifying means to have said radio signal amplifying means amplify said radio signals in response to said signal level of each of said base band signals to be produced by said base band signal producing means;

base band signal selecting means for periodically selecting one of said base band signals from among said base band signals produced by said base band signal producing means in response to said signal level of each of said radio signals;

base band signal outputting means for outputting said base band signal periodically selected by said base band signal selecting means to an exterior device; and error rate calculating means for calculating an error rate of each of said base band signals after judging whether or not an error is detected in each of said base band signals, said base band signals including first and second base band signals respectively having first and second signal levels and first and second error rates wherein said base band signal selecting means includes a candidate signal selecting unit for selecting said first and second base band signals from among said base band signals produced by said base band signal producing means after deciding that said first error rate of said first base band signal is less than said error rate of each of said base band signals, and said second error rate of said second base band signal is less than said error rate of each of said base band signals except for said first base band signal;

an error rate difference calculating unit for calculating an error rate difference between said first error rate of said first base band signal selected by said candidate signal selecting unit and said second error rate of said second base band signal selected by said candidate signal selecting unit; and an error rate difference judging unit for judging whether or not said error rate difference between said first error rate of said first base band signal and said second error rate of said second base band signal calculated by said error rate difference calculating unit is larger than a predetermined error rate threshold value;

said base band signal selecting means is operative to select said first base band signal from among said base band signals produced by said base band signal producing means when the judgment is made by said error rate difference judging unit as said error rate difference between said first error rate of said first base band signal and said second error rate of said second base band signal calculatedby said error rate difference calculating unit being larger than a predetermined error rate threshold value; and to select one of said first and second base band signals from among said base band signals produced by said base band signal producing means in response to said gain control values calculated by said signal level difference calculating unit in association with each of said base band signals when the judgment is made by said error rate difference judging unit as said error rate difference between said first error rate of said first base band signal and said second error rate of said second base band signal calculated by said error rate difference calculating unit being equal to or smaller than said predetermined error rate threshold value.

* * * * *